United States Patent
Pedapati

(10) Patent No.: US 11,514,236 B1
(45) Date of Patent: Nov. 29, 2022

(54) INDEXING IN A SPREADSHEET BASED DATA STORE USING HYBRID DATATYPES

(71) Applicant: Amazon Technologies, Inc., Seattle, WA (US)

(72) Inventor: Venkata Rao Pedapati, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 17/039,898

(22) Filed: Sep. 30, 2020

(51) Int. Cl.
- *G06F 40/18* (2020.01)
- *G06F 16/22* (2019.01)
- *G06F 40/205* (2020.01)
- *G06F 16/245* (2019.01)
- *G06F 16/23* (2019.01)

(52) U.S. Cl.
CPC ............ *G06F 40/18* (2020.01); *G06F 16/221* (2019.01); *G06F 16/2282* (2019.01); *G06F 16/2379* (2019.01); *G06F 16/245* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 8,516,008 B1 | 8/2013 | Marquardt | |
| 8,682,925 B1 | 3/2014 | Marquardt | |
| 9,619,210 B2 | 4/2017 | Kent | |
| 10,546,001 B1 | 1/2020 | Nguyen | |
| 10,705,805 B1 | 7/2020 | Bosworth et al. | |
| 10,901,990 B1 | 1/2021 | Vogelsgesang | |
| 10,977,211 B2 | 4/2021 | Nag | |
| 11,249,974 B1 * | 2/2022 | Fuchs | G06F 16/93 |
| 2004/0088650 A1 | 5/2004 | Killen | |
| 2005/0187897 A1 * | 8/2005 | Pawar | G06F 16/2282 |
| 2005/0256835 A1 * | 11/2005 | Jenkins, Jr. | G06F 16/24542 |
| 2006/0101391 A1 | 5/2006 | Ulke et al. | |
| 2006/0112123 A1 | 5/2006 | Clark et al. | |
| 2006/0212469 A1 * | 9/2006 | Babanov | G06F 40/18 |
| | | | 707/999.102 |
| 2007/0255512 A1 | 11/2007 | Delenstarr | |

(Continued)

OTHER PUBLICATIONS

U.S. Appl. No. 17/118,383, Application Development Based on Stored Data, filed Dec. 10, 2020.

(Continued)

*Primary Examiner* — Howard Cortes
(74) *Attorney, Agent, or Firm* — Knobbe, Martens, Olson & Bear, LLP

(57) ABSTRACT

Aspects described relate to implementing indexing on spreadsheets and/or unstructured data stores. A first aspect comprises a system for implementing an indexing scheme to respond to a query on a spreadsheet of a workbook. The system comprises a data store, a user interface, and a processors configured to identify columns for tables in the spreadsheet, generate an index for at least one column of the identified columns, wherein the index has a hybrid datatype and equates datatypes that form the hybrid datatype, identify a formula in the query having at least one operand, at least one operator, and a key value, and identify a value in an identified column from the operand in response to the query based on the key and the corresponding index to the identified column.

19 Claims, 17 Drawing Sheets

(56) References Cited

U.S. PATENT DOCUMENTS

| | | |
|---|---|---|
| 2008/0162426 A1 | 7/2008 | Haug |
| 2008/0256432 A1 | 10/2008 | Sambandam et al. |
| 2009/0012974 A1 | 1/2009 | Cassidy |
| 2010/0106734 A1* | 4/2010 | Calder .................. G06F 16/40 707/E17.014 |
| 2011/0113048 A1 | 5/2011 | Njemanze |
| 2011/0167056 A1 | 7/2011 | Khanolkar et al. |
| 2012/0008401 A1 | 1/2012 | Katz et al. |
| 2013/0086064 A1 | 4/2013 | Salch et al. |
| 2013/0262974 A1* | 10/2013 | Anstis .................... G06F 40/18 715/217 |
| 2014/0279962 A1 | 9/2014 | Schreter et al. |
| 2015/0120748 A1* | 4/2015 | Kraynak ............. G06F 16/2228 707/741 |
| 2015/0199378 A1 | 7/2015 | Reyntjens |
| 2015/0363725 A1 | 12/2015 | Andersson |
| 2017/0140000 A1 | 5/2017 | Mielenhausen |
| 2017/0228460 A1 | 8/2017 | Amel |
| 2017/0315979 A1 | 11/2017 | Boucher et al. |
| 2018/0157468 A1 | 6/2018 | Stachura |
| 2018/0203924 A1 | 7/2018 | Agrawal |
| 2018/0375805 A1 | 12/2018 | Sethi |
| 2019/0146998 A1 | 5/2019 | Jin |
| 2019/0147031 A1* | 5/2019 | Dvorak .................. G06F 40/18 715/219 |
| 2019/0384762 A1 | 12/2019 | Hill |
| 2020/0057819 A1* | 2/2020 | Mathur ............... G06F 16/2379 |
| 2020/0250166 A1* | 8/2020 | Mathur ................. G06F 16/221 |
| 2021/0089537 A1* | 3/2021 | Hanson ................. G06F 16/221 |
| 2021/0157812 A1 | 5/2021 | Rumiantsau |
| 2021/0304146 A1* | 9/2021 | Helft ...................... G06F 40/18 |

OTHER PUBLICATIONS

U.S. Appl. No. 17/039,912, Data Driven Indexing in a Spreadsheet Based Data Store, filed Sep. 30, 2020.

U.S. Appl. No. 17/039,986, Usage Driven Indexing in a Spreadsheet Based Data Store, filed Sep. 30, 2020.

U.S. Appl. No. 17/039,967, Multi-Table Indexing in a Spreadsheet Based Data Store, filed Sep. 30, 2020.

* cited by examiner

INDEXING IN A SPREADSHEET BASED DATA STORE USING HYBRID DATATYPES

BACKGROUND

Computing devices can utilize applications ("apps") to view, update, and/or exchange data, for example via a communication network. Applications are usually created by software developers, who utilize coding languages to create the application. A variety of types of applications exist. For example, a desktop application can include code executable by a traditional fully-fledged operating system (e.g., a desktop or a laptop), a mobile application can include code executable on a mobile device, and a web application can include code executable in a web browser (which itself is an application executing on a device). As the amounts of data associated with one or more apps increases, so do relationships between the data, thereby increasing complexities managing data in data stores associated with the apps.

BRIEF DESCRIPTION OF THE DRAWINGS

FIGS. 8A and 8B show representations of tables in the spreadsheet data store of the workbook in FIG. 1.

DETAILED DESCRIPTION

Figure 1:
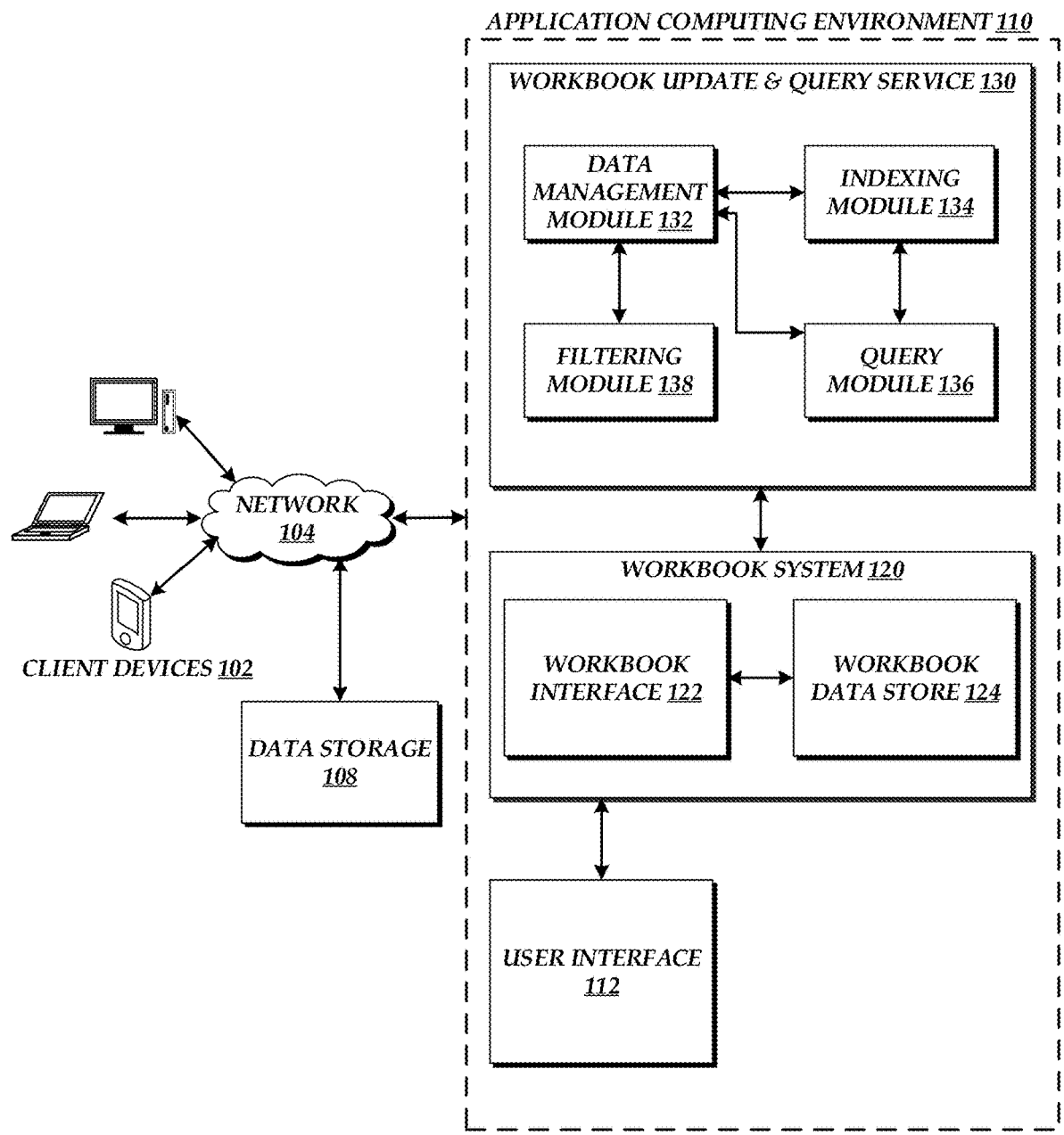
FIG. 1 is a block diagram depicting an illustrative environment in which a user may interact with an application computing environment.

Generally described, aspects of the present disclosure relate to systems and methods for improving query times and processing data in a dataset of a workbook storing the data in a spreadsheet or an unstructured data store (hereinafter referred to as spreadsheet). The systems and methods may involve receiving a query to extract particular data from the dataset, where as a size of the dataset increases, such extraction can take increasingly long times to the point of user frustration. Indexing of the spreadsheet may help maintain acceptable data extraction times as dataset continue to increase in size, but generally require that columns in the dataset maintain particular constraints (for example, on datatype of individual rows). Embodiments described herein enable the benefits of indexing in spreadsheets and similar unstructured data stores where column constraints do not generally exist.

Workbook systems and methods may employ a spreadsheet) engine having a spreadsheet like interface and that stores the workbook dataset as a spreadsheet. The teachings herein, however, may apply to any one or more of spreadsheets, databases, data sets, and/or data stores. A workbook may comprise one or more spreadsheets or sheet in which data is stored and/or organized; in some instances, metadata for the spreadsheets, data, and/or workbook is also stored and/or organized in the workbook. The workbook may enable customers (for example, owners) to store their data and build applications on top of the stored data while working with a recognizable spreadsheet interface. In many instances, the spreadsheet engine stores the data in the spreadsheet organized as tables, where each table can have any number of rows and/or columns.

The applications built by the customers may use a "what you see is what you get" (WYSIWYG) interface on top of the spreadsheet data. End users may use the applications to view, manage, or modify data in the workbook. These applications may be tightly coupled with the spreadsheet and/or workbook itself; for example, they may be bundled and/or stored together. A spreadsheet for a particular workbook, and the applications built on top of the spreadsheet, can have formulas that reference and/or are based on data in the spreadsheet. Some of these formulas can query the table data of the spreadsheet. Alternatively, queries to the table data can exist in the applications and/or screens of an interface or received from an end user. If the tables of data in the spreadsheet are big (for example, hundreds of thousands or millions of rows), then such queries can be very slow to execute by sequential scans through the table data itself. Spreadsheet users using the workbook systems and methods described herein generally lack technical expertise to concern themselves with improving query performance.

In traditional database engines, developers create indices based on marked primary key columns or specific attributes. However, spreadsheets engines and data stores lack certain controls and/or constraints as compared to typical databases. For example, columns in typical databases can be established to include data of a particular or defined type. However, data in spreadsheet columns can often be heterogenous, meaning that data in any given column of the spreadsheet may not be of the same datatype in different cells of the column. A "Points Remaining" column in a "Tasks" table, which usually identifies a number of points remaining as a numeric value, may include some rows that have a blank value, a string value, or "N/A" instead of the numerical value. Similarly, a column named "Is Included in Release" may usually have Boolean values "TRUE" and "FALSE", but in some instances may have integer values of "1" and "0" instead. Such discrepancies in consistent datatypes in a single column may result from multiple users having access to the same data and potentially inserting different values into the cells of the tables. Therefore, the spreadsheet lacks data integrity that typical databases inherently maintain because particular columns in the database can only have information of particular datatypes stored therein. The spreadsheet, in some instances, lacks a concept of datatypes or (if such a concept exists) often does not strictly constrain data to a particular type. This lack of data integrity and consistent datatypes in columns makes implementing indexing strategies for columns as seen in traditional database indexing techniques ineffective in spreadsheets because the traditional indexing techniques generally require data conforming to one or more schemas or constraints that do not exist in spreadsheets. Furthermore, spreadsheets lack defined relationships between and/or within columns and the like, which makes indexing using typical strategies difficult or impossible.

The systems and methods described herein provide an indexing scheme or mechanism for spreadsheets. The indexing scheme may create and maintain, in memory (for example, a storage memory in which the workbook is stored, a working memory, or the like), an index structure for each column or a subset of columns in the spreadsheet. These index data structures may be specifically constructed to quickly retrieve rows that match the specified criterion (for example, provided by the user (one of the owner or end user) or embedded as part of the application or user interface. The index data structures provide performance gains in retrieving query responses while requiring additional memory for storage of the index data structures.

One challenge of implementing the indexing scheme or mechanism is to identify what kind of index to create for a particular column. Different kinds of indices can have widely varying performance impacts on different kinds of queries. Where the spreadsheet may face ever changing types of queries that cannot be easily accurately and/or consistently predicted, a general purpose indexing strategy that will help address most common query patterns in a given spreadsheet is desired. The implemented indices and indexing scheme or mechanism can help to significantly improve speeds of the workbook system when solving queries on spreadsheets, for example faster by one or more orders of magnitude, and removes, or improves limitations on number of rows that can be supported. The efficient query mechanism introduced herein not only helps improve performance of explicit search queries issued by users, but also improves the overall performance and throughput of the workbook system.

As applications associated with the workbook are used, the corresponding dataset may accept ever increasing amounts of data, where the size of the data and corresponding data models increases with time, sometimes rapidly. However, processing of the data within the workbook should not increase beyond certain thresholds (for example, time or responsiveness thresholds), regardless of the size of the dataset, to maintain user experience with and operability of the corresponding workbook applications. In some embodiments, the applications and/or corresponding screens may include or be represented by queries. For example, as a number of cells in the workbook increases, an amount of time required to perform queries of the dataset may generally increase because there is more data to be processed in response to each query, which erodes user appreciation and desire to use corresponding applications. However, indexing, as introduced by the systems and methods herein, can improve the responsiveness of the applications that reference or rely on even the largest datasets. Generally, an index enables a query to efficiently retrieve data from a dataset, where the index is related to particular data in the dataset (for example, a particular column in a table). In some instances, the index relates the particular data in the column of the table to corresponding terms of interest (for example, a key or corresponding term in a query), where the terms of interest are found in the particular data. In the tables example, an index can be made based on the column of the table relating to terms of interest that are values in the column of the table being indexed. The index enables identification of rows within a column that have a particular value without requiring examination of each row in the column. Therefore, the query regarding one of the terms of interest can thus execute more efficiently because, instead of searching the entire table for the terms of interest, the index can be searched, reducing an amount of time required to complete the query because parsing the index is quicker than parsing the entire column. Thus, implementing indexing in relation to the dataset for the workbook can improve speeds of queries requested by users.

Without such indexing mechanisms in spreadsheet datasets, query execution latencies can frustrate users with unacceptable delays. The execution latencies can increase proportionally as the size of the dataset and/or database or spreadsheet increases. The mechanisms herein, when implemented, can result in the workbook executing the same queries within 100-200 microseconds, even for datasets or spreadsheets containing millions of rows, providing immediate, real-world benefits.

A user of a workbook, for example via one or more client computing devices, may submit a request for information or data from a table in the workbook (for example, a query to identify whether a particular value exists in a cell or multiple cells of the table, and so forth) via an application affiliated with the workbook. When the table does not have columns that are indexed, a processor associated with the workbook may search all rows of a corresponding column for the particular value, which can be a time intensive endeavor, especially when the table has a large number of rows (for example, thousands, hundreds of thousands, or millions of rows). When the table columns do have indices, the processor need only to search the index of the column of interest to determine whether the table includes the particular value. By reducing the search field for the query, the index improves efficiency and speed of the processor associated with the workbook and, thus, improves the user experience of the user with the application when working with table data.

Thus, indexing of the table data in the workbook can help improve response times for queries on tables in the workbook dataset and makes it possible to provide and support applications that require large data sets. However, like all other database type systems, the extra speed of indexing in response to queries initially requires creation and maintenance of indices in memory. Such creation of indices can be resource expensive, for example requiring additional memory as compared to just the table data, and time to populate the indices when changes are made to the table data. Memory can be a major process driver in data storage systems, so effective use of memory is crucial in database type systems to achieve and maintain working constraints. In addition, a number and size of indices created in a particular workbook have a direct impact on de-serialization latency, which is crucial for predictability of performance of the applications in association with the workbook. So balancing the resource costs with the efficiency gains is important.

The de-serialization latency refers to time taken for taking a file from storage external to the workbook and creating an in-memory (in the workbook) representation of it. The workbooks described herein do not live in active memory indefinitely. For example, when hosts crash, when software is deployed, or after periods of inactivity, workbooks can be unloaded from memory. But workbooks unloaded from memory may later be reloaded into memory, for example, when a request arrives for that workbook. To assist with such reloads, checkpoints are periodically created for the entire workbook state and stored in an external storage system (e.g., a cloud-based object storage service). When the workbook is reloaded into memory, this file is obtained and the workbook is related into memory. The process of converting an in-memory state of the workbook to a file in the external storage system is called serialization and the reverse process of converting a file in the external storage to an in-memory representation of the workbook is called de-serialization. Because data is not stored inside indexes within the file in the external storage system, indices are re-created when the workbook is loaded from the external storage system, as part of de-serialization. Accordingly, the number of indices that exists affects the de-serialization latency. As more indices exist and are maintained, the greater the de-serialization latency is because the indices need to be recreated when de-serializing.

The systems and methods herein employ indexing in spreadsheets and similar unstructured data stores. In some instances, these systems and methods focus on efficiency gains, while others balance the efficiency gains with associated costs, for example using particular index creation and memory usage strategies that minimize index sizes and enable query evaluation on respective tables within threshold latency bounds and performance predictability thresholds. The threshold latency bounds and performance predictability thresholds may be defined by various metrics, which may control and/or be monitored by the application of the systems and methods described herein. Various example metrics are set forth below.

Different approaches can be used to coordinate indexing in the workbook, which may improve responsiveness and reduce resource consumption as compared to the general indexing. For example, the systems and methods described herein may implement one or more of data driven indexing, usage based indexing, and administrative application programming interfaces (APIs) for manual index maintenance.

In the data driven indexing, the systems and methods analyze cell formulas and expressions defined in the cells of the workbook to identify which table columns should be indexed and the types of indices to maintain. The data driven indexing strategy parses formulas embedded inside the cells and expressions of the workbook because these formulas and expressions generally account for a large majority of filters that queries presented via an application, etc., will request and/or reference for execution on the workbook. Thus, the data driven indexing identifies which columns to generate indices for based on identifying those table columns that are referenced in a formula or expression within the workbook. Creating indices in this manner may ensure that indices are created on indicated use based on analysis of formulas and expressions, thereby reducing memory overhead as compared to standard index creation. Furthermore, since indices are only created for those columns referenced in formulas or expressions, performance of corresponding systems and methods is improved over an approach that does not have such indexing. Further details of the data driven indexing model are provided below.

In the usage driven indexing, the systems and methods analyze and predict usage of the applications and the data in the workbook to generate indices based on observances of previous queries and predictions of future queries based on the previous queries. The systems and methods may monitor existing queries for an existing data set and workbook, identifying queries presented and determining what indices would improve response to the received queries. When the table and/or workbook is updated, the systems and methods may determine whether to create one or more new indices based on prior and/or expected usage and queries, and create indices for the updated tables and/or workgroup accordingly. The usage driven indexing approach therefore attempts to track usage statistics about indices and creates/deletes indices as required based on the usage statistics. Creating indices in this manner may ensure that indices are created on observed and/or predicted use based on analysis of previous observations and use. Thus, the usage driven indexing may reduce both indexing time and/or requirements and query response times as compared to data driven indexing. This is because any ad hoc queries (queries that are not based on formulas or expressions in the workbook) issued by owners and end users in the data driven indexing approach will be slower because there are no indices for such queries unless they overlap by chance with an index generated based on a formula or expression. Additionally, under the data driven indexing approach, more indices than needed may be generated because the workbook cells can contain filter formulas and expressions embedded therein that are rarely or not at all used for queries. Such indices may occupy memory and consume computational power without adding value. Furthermore, since indices are only created based on observed and expected queries and not for all formulas or expressions in the workbook, the usage driven indexing approach can improve performance of corresponding systems and methods over the data driven indexing approach. Further details of the usage driven indexing model are provided below.

In the administrative APIs for manual index maintenance approach, the systems and methods create internal APIs to create and delete indices on a specific column.

The administrative API invocation, is effectively an intervention by an operator or administrator, hereinafter referred to collectively as operator. This API may not be accessible to an ordinary user. The administrative API can be viewed as an operational tool to help optimize queries that may not be able to be optimized automatically using the adaptive indexing mechanisms mentioned above. For example, certain kinds of formulas may not be able to be parsed and an operator or administrator may manually create indices for a specific column when the adaptive indexing is unable to create appropriate indices to mitigate the impact and enable a user's use of the application without running into delays or timeouts.

Accordingly, the operator may pick the columns on which to create indices based on a specific user's use case. An example process flow might take the following form: an adaptive indexing system, such as that described elsewhere herein, is unable generate appropriate indices for various queries performed by the user causing the user to experience an unreasonable, or at least unwanted, delay. Subsequently, the user can submit a concern regarding the performance of the queries. The operator analyzes the queries and determines that the adaptive indexing system is not performing as desired. The operator can then manually create an index using these administrative APIs that is able to address the user's issue and is able to more expediently process the queries.

The administrative APIs may operate alongside the data driven indexing approach. This internal API may be used to allow manual creation of indices when conditions exceed operational thresholds (for example, a customer is having a negative performance impact and support manually creates corresponding indices manually for the customers). Such APIs may persist preferences into the workbook via an indexing manifest. For example, when operators use these administrative APIs to create indices on specific columns, the system can remember such an override setting even if the workbook is unloaded and reloaded onto a different host. Thus, the override setting may be persisted with the workbook, for example an indexing manifest, which can be included in, or otherwise associated with, the workbook snapshot.

Accordingly, some indices will be automatically created when loading the workbook from a storage checkpoint or member. In some embodiments, these indices are unaffected by an adaptive indexing strategy. For example, when the operator or user overrides the indices that are created for the table, but the system continues to manage indices on that table, the system may end up deleting the indices created using the override because the system is not able to detect the user override. Thus, the system should be prevented from ignoring or overriding the user override. This may be accomplished by giving the operator overrides a higher priority than system detected overrides (for example, based on metrics, etc.).

Below are example API structures that (1) create an index of an identified type (HASH or NAVIGABLE) for an identified column (TableColumnId) in an identified workbook (WorkbookRN) and indicates whether column indicates row-link data and (2) deletes an index for an identified type (HASH or NAVIGABLE) for an identified column (TableColumnId) in an identified workbook (WorkbookRN) and indicates whether column indicates row-link data
CreateTableColumnIndex
Input:
{
 workbookRN: WorkbookRN,
 tableColumnId: TableColumnId,
 indexType: [Choice of: HASH, NAVIGABLE],
 isRowLinkData: Boolean
}
DeleteTableColumnIndex
Input:
{
 workbookRN: WorkbookRN,
 tableColumnId: TableColumnId,
 indexType: [Choice of: HASH, NAVIGABLE],
 isRowLinkData: Boolean
}

Each of these indexing approaches herein provide improvements over general spreadsheet indexing approaches, in which workbook systems and models may generate indices for all table columns in the workbook. While such an approach may provide improved responses to queries when the queries are received, it also involves increased storage and computational costs when creating the indices and/or updating the indices. The adaptive indexing approaches described herein provide advantages over the general spreadsheet querying approaches as well as provide spreadsheet indexing options, even when corresponding tables in the spreadsheets can have millions of rows and/or hundreds or thousands of columns.

In some embodiments, improvements to formula parsing and/or evaluation can provide performance gains in workbooks, and specifically to query response times. For example, evaluation of a formula may comprise two phases—formula parsing and formula evaluation—and both phases can be applied to each row to which the formula applies. For example, for a formula or expression of Filter that applies to a column, evaluating the formula Filter first comprises parsing the Filter formula and evaluating the parsed Filter formula for each row of the column. While such processing can be simplified when the formula includes constant values, when the formula includes variable values (such as references or other complex expressions), the systems and methods herein may create an intermediate parsed representation of the formula and reuse it for each row being evaluated instead of parsing the formula again and again. This may save evaluation overhead and improve query response times at a cost of minimal memory overhead while executing the query.

In prior systems and methods, indexing of columns in tables in the data in a workbook or data store is a process that, with regards to processing resources required and resulting latency, is proportional to the size of the workbook (for example, the number of cells in the workbook). For example, in the prior systems and methods where indexing systems do not exist in spreadsheet and/or unstructured data stores, query processing can be a time and resource expensive operation. As the workbook size increases, response times to such queries can exceed desired thresholds, making the applications and workbooks unusable. This can result in user frustrations and reduce use of the workbooks and corresponding applications. Thus, such prior systems and methods experience increased latency as the size of the workbook increases and can make applications that use or work in conjunction with the workbook unusable. The systems and methods disclosed herein implement indexing strategies for spreadsheets and/or unstructured data stores by introducing hybrid, amalgamated, custom, or combination datatypes (referred to herein as "hybrid" datatypes) including scripts to equate and/or compare individual datatypes that form the hybrid datatypes. Furthermore, the systems and methods herein may perform the indexing according to different approaches. Generally, indexing can comprise generating an index for each column in the spreadsheet or workbook. Such an approach ensures that all (or any selected, random, or subset of) of the columns are indexed, but such an approach to selecting columns may result in columns that are never queried being indexed, which can be a waste of the time required to generate the index and the memory required to store the index. Another approach generates indices for only columns that are referenced in a formula and/or expression within a cell of the workbook. Such an approach may reduce a number of columns indexed such that only those columns on which operators are applied are indexed. In this way, memory and processing time can be saved to only expend on columns that are referenced by the formula and/or expression. However, this may result in indexing of columns that are only rarely accessed or accessed only once. An additional option for indexing is to index based on previous or expected usage. For example, columns that are referenced above a threshold number of times or that were referenced within a threshold period of time may be indexed such that the most often or recently used columns are indexed. This may result in an improved memory utilization as compared to the general and data driven approaches but may result in index misses, where a column is referenced in a query but no corresponding index exists. Such misses may result in increased resource utilization as the corresponding index can be created in response to the index miss (or based on usage statistics), or the result to the query can be generated without indexing and with analysis of the referenced column(s) itself. By implementing indexing approaches on the spreadsheet based workbook, query response and latency times can be reduced to acceptable levels regardless of a size of the workbook. Thus the systems and methods herein improve calculation efficiencies, reduce latency, and make applications using the data in the workbook usable by customers.

The foregoing aspects and many of the attendant advantages of this disclosure will become more readily appreciated as the same become better understood by reference to the following description, when taken in conjunction with the accompanying drawings.

FIG. 1 is a block diagram depicting an illustrative environment in which a user may interact with an application computing environment 110 (hereinafter "computing environment 110"). The user (for example, the workbook owner or end user) may use one of the client devices 102 to interact with and/or update data of a workbook system 120 via a user interface 112. By way of illustration, various example client devices 102 are shown in communication with the computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, smartwatch, and the like. The computing environment 110 may provide the client devices 102 with one or more user interfaces 112, which may comprise command-line interfaces (CLIs), application programing interfaces (APIs), and/or other programmatic interfaces for utilizing services provided by the computing environment 110, including a workbook system 120 and/or a workbook update and query service 130. Although one or more embodiments may be described herein as using the user interface 112, it should be appreciated that such embodiments may, additionally or alternatively, use any CLIs, APIs, or other programmatic or similar interfaces. Moreover, while end users may operate client devices 102, client devices 102 may also include non-end-user devices, such as servers, or other devices that access respective services provided by the computing environment 110 or provide services (for example, data storage and the like) to the computing environment 110. The users operating the client devices 102 may be one or more of owners (for example, the owner of the workbook or the application) of applications or data stored in a workbook or users of applications that result in data stored in the workbook.

The client devices 102 and computing environment 110 may communicate via the network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing environment 110 as depicted in FIG. 1 may operate in a distributed computing environment including several computer systems that are interconnected using one or more computer networks (not shown in FIG. 1), which systems operate to provide the workbook system 120 and the workbook update and query service 130. Illustratively, the computing environment 110 includes a number of rapidly provisioned and released computing resources configured to provide the workbook system 120 and workbook update and query service 130. The computing environment 110 may also be referred to as a "cloud computing environment." Each of the workbook system 120 and the workbook update and query service 130 could also operate within a computing environment having a fewer or greater number of devices than are illustrated in FIG. 1. Thus, the depiction of the workbook system 120 and the workbook update and query service 130 in FIG. 1 should be taken as illustrative and not limiting to the present disclosure. For example, the elements of the computing environment 110 or various constituents thereof could implement various Web services components and/or peer to peer network configurations to implement at least a portion of the processes described herein. In some instances, the workbook system 120 and the workbook update and query service 130 may be combined into a single service. Each of the workbook system 120 and the workbook update and query service 130 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

The workbook system 120 can provide, for the benefit of owners/operators/administrators (each of which are and can be used interchangeably herein) or users and for access by client devices 102, an interface (for example, the user interface 112) by which the owner generates web or mobile applications or users interact with the web or mobile applications. Within the computing environment 110, the workbook system 120 may provide workbook management services (for example, that include application building services or data updating services) to any client device 102 via the network 104. In some embodiments, while labeled as a system, the workbook system 120 may represent one or more services provided by an online services provider. The workbook system 120 enables owners and users to create, modify, access, or use web and/or mobile applications to create, modify, query, or access data in the workbook (for example, stored as one or more cells in one or more tables of the spreadsheet, for example stored in a spreadsheet format) via the client devices 102. The workbook system 120 may provide the owner or user access to a workbook interface 122, through which the owner or user may selectively create, access, modify, query, or use data stored in the workbook. For example, the workbook interface 122 allows the owner to create or the user to use the application to create, modify, or query data stored in the workbook. Illustratively, the workbook interface 122 may provide a spreadsheet like interface to the user. The workbook interface 122 may provide user access to the data organized as tables, where each table can have millions of rows and hundreds or thousands of columns. The workbook system 120 may store applications, corresponding workbooks, data and/or tables for the workbooks and applications, and/or indices for the data and/or tables in a workbook data store 124, which may comprise a data storage or similar device that stores data in a data structure, for example a graph database, a spreadsheet, one or more tables, or any other database type structure. In some embodiments, the workbook and/or the workbook data store 124 includes all relationships and data associated with the corresponding application, including application data (including all corresponding dependencies, etc.), application navigation policies, restrictions on accessibility, cross-references, associated files, data indices, and any other features or details of the application. The workbook data store 124 may store data organized as tables, where each table can have millions of rows and hundreds or thousands of columns, creating a corresponding number of cells. The workbook (including all corresponding application data, spreadsheets, data, and so forth) may be stored in the workbook data store 124 to simplify access to and management of any associated applications and the corresponding data.

The workbook data store 124 may work with the data management module 132 to maintain information regarding the data in the workbook data store 124, of the workbook, in the corresponding spreadsheet structure and can provide the applications that allow the users to use formulas in conjunction with the data in the workbook data store 124. For example, the workbook data store 124 may update the cell information in the spreadsheet structure based on changes identified and/or received by and from the data management module 132 (for example, from the user interface 112). The workbook data store 124 may extract or retrieve data from the data structure based on commands received from the data management module 132, for example via the workbook interface 122. Furthermore, the workbook data store 124 may store or save data into the data structure based on commands received from the data management module 132, for example via the workbook interface 122. For example, the data management module 132 identifies a change to apply to one or more cells (for example, to a formula or expression in the one or more cells), tables (addition/deletion/modification of rows and/or columns, or tables), or sheets in an existing workbook based on owner or user input (for example, via the user interface 112). The data management module 132 may send a request to the workbook data store 124 to extract the identified cells, tables, or sheets for change, to which the workbook data store 124 may provide a response including the identified cells, tables, or sheets. Furthermore, once the change is completed, the data management module 132 may send a request to the workbook data store 124 to store the updated data in one or more cells, tables, or sheets in the data structure of the workbook data store 124.

In some embodiments, the workbook interface 122 is separate from the user interface 112 of the computing environment 110, for example as an embedded webpage or similar interface within the user interface 112. Alternatively, or additionally, the user interface 112 and the workbook interface 122 can be integrated into a single interface, for example where the user interface 112 is also used to interact with application workbooks.

As described above, the user interface 112 of the computing environment 110 and/or the workbook interface 122 may enable the users to access the workbook system 120 to create, edit, and/or manage applications to create, edit, and/or manage data in the workbook. The workbook system 120 enables the user to create, view, manipulate, and/or edit data in the workbook storage 124 via the corresponding application. The workbook system 120 may be integrated with the workbook update and query service 130. The workbook system 120 may activate, select, or utilize any interface that is executed by the workbook update and query service 130 to, create, manipulate, query, or edit data in the workbook. The workbook update and query service 130 may include various modules, including a data management module 132, an indexing module 134, and a query module 136 to enable the creation, editing, and querying of data in the workbook, as described in further detail below.

The data management module 132 comprises any component that manages data for the workbooks in or associated with the workbook data store 124. The workbook system 120, for example via interaction with the workbook interface 122 or a similar component, may create sheets, tables, columns, rows, or cells of data for new workbooks or edit existing sheets, tables, columns, rows, or cells of data for existing workbooks using the data management module 132. For example, the data management module 132 can create data in the workbook data store 124 in response to an owner request to create the new workbook. The data management module 132 may add, delete, update, or modify data in the workbook data store 124 when the workbook and corresponding data already exists in the workbook data store and in response to an owner or user request to modify the workbook. When creating new data for a new workbook, the data management module 132 may create the sheets, tables, columns, rows, and cells in which data for the workbook is stored. When modifying data in the workbook, the data management module 132 may modify existing data in cells, columns, rows, sheets, tables, etc. or add new data into the cells, columns, rows, sheets, tables, and so forth.

When creating the cells, the data management module 132 may also manage (for example, generate or update) cell information for each of the cells in the workbook. The cell information may include one or more of cell value, cell formula, cell type, a parsed formula tree for the cell, dependency information, and other relationship information (for example, information regarding what sheet column the cell belongs to, what sheet row the cell belongs to, what table column the cell belongs to, and what table row the cell belongs to), as introduced above. In some embodiments, the data management module 132 works in conjunction with one or more other modules, for example, the indexing module 134, the workbook interface 122, or the workbook data store 124, to manage the cell information. When the data management module 132 is updating, modifying, or querying existing workbooks, then the data management module 132 may update, modify, or query one or more of the cell values, cell formulas, table structures, and so forth.

The query module 136 may process queries received from or by the user interface 112 and/or the workbook interface 122. For example, the query module 136 may identify table columns referenced in a received query and determine whether an index exists, for example, in the workbook data store 124 or similar storage. Additionally, or alternatively, the query module 136 may maintain a list of table columns referenced in previous queries and may append the list of table columns when a query that references a table column that is not in the list of table columns is received and/or processed by the query module 136 and/or the data management module 132. The query module 136 may work with the data management module 132, the indexing module 134, and/or the workbook data store 124 to respond to and/or receive queries and identify table columns referenced in the received queries to enable use of the appropriate index, if available.

The indexing module 134 may work with the data management module 130 to generate an index for one or more tables or table columns in the workbook for use in responding to queries handled by the query module 136 and/or the data management module 132. In some embodiments, the indexing module 134 may generate one or more indices or utilize one or more indices that already exist, for example in response to a query. As described herein, the indexing module 134 may generate indices for all tables and/or table columns (or a subset of tables and/or columns) in the workbook or selectively generate indices for particular tables and/or table columns in the workbook. For example, under the adaptive indexing approaches described herein, the indexing module 134 indexes particular tables and/or table columns based on the data driven or based approach, the usage driven or based approach, and/or the administrative APIs for manual index maintenance and creation approach described herein. In the data driven approach, indices are created and/or maintained based on the formulas and expressions that exist in the workbook. For example, the data management module 132 and/or the indexing module 134 may analyze all cells in the workbook data store 124 and identify in those cells the formulas and/or expressions that reference tables, table columns, and/or cells in the workspace. Based on the identified formulas and/or expressions and the referenced tables, table columns, and/or cells, the indexing module 134 and/or the data management module 132 may generate indices for the corresponding table columns. For example, the indexing module 134 and/or the data management module 132 may generate and/or update indices for the workbook (which may be stored in the workbook data store 124). The generated and/or updated indices may index columns of corresponding tables (for example, the table tables, columns, and/or cells referenced in the formulas and/or expressions of the workbook). Thus, the indices are generated and/or maintained based on the data (i.e., the formulas and expressions) of the workbook so that only table columns having cross-referenced use in the workbook are indexed. Under the usage driven approach, the indexing module 134 and/or the data management module 132 monitors queries (for example, by the query module 136, as described above) received via the user interface 112 and/or workbook interface 122 to identify what table columns have indices generated for it. For example, when the query module 136 generates the list of table columns referenced in previously received queries, the usage driving approach may use the indexing module 134 to generate indices for those table columns identified or referenced in the list of table columns referenced in the previously received queries. In some embodiments, the query module 136 may predict table columns that may be referenced in a future query based on an analysis of the previously received queries and corresponding table columns. For example, if the indexing module 134 or the query module 136 determines that all but a subset of table columns have been referenced in previously received or processed queries (for example, one at a time at a regular interval), the indexing module 134 and/or the query module 136 may predict that the remaining table columns of the subset of table columns will be referenced in one or more subsequent queries and add the subset of table columns to the list of table columns for which indices are created. Thus, the indexing module 134 and the query module 136 may work together to identify which table columns to generate indices for in the usage driven approach. Thus, the data management module 132 communicates with and utilizes the indexing module 134 to generate indices for table columns in the workbook data store 124. The data management module 132 may use the indexing module 134 to generate and/or update indices for relevant table columns when the workbook is created, when data is modified and/or appended in the workbook, when queries are received and processed, and so forth. When the data management module 132 is creating the workbook with initial data, the indexing module 134 may generate the indices for the table columns in the workbook, for example according to one or more of the adaptive indexing approaches described herein.

The filtering module 138 may process queries or functions that relate to filters of tables and corresponding data. In some embodiments, the filtering module 138 may perform various analysis and processing described herein. For example, when a received query relates to a dereferenced filter, the filtering module 138 may perform filtering according to one or more formulas, queries, and the like.

Figure 2:
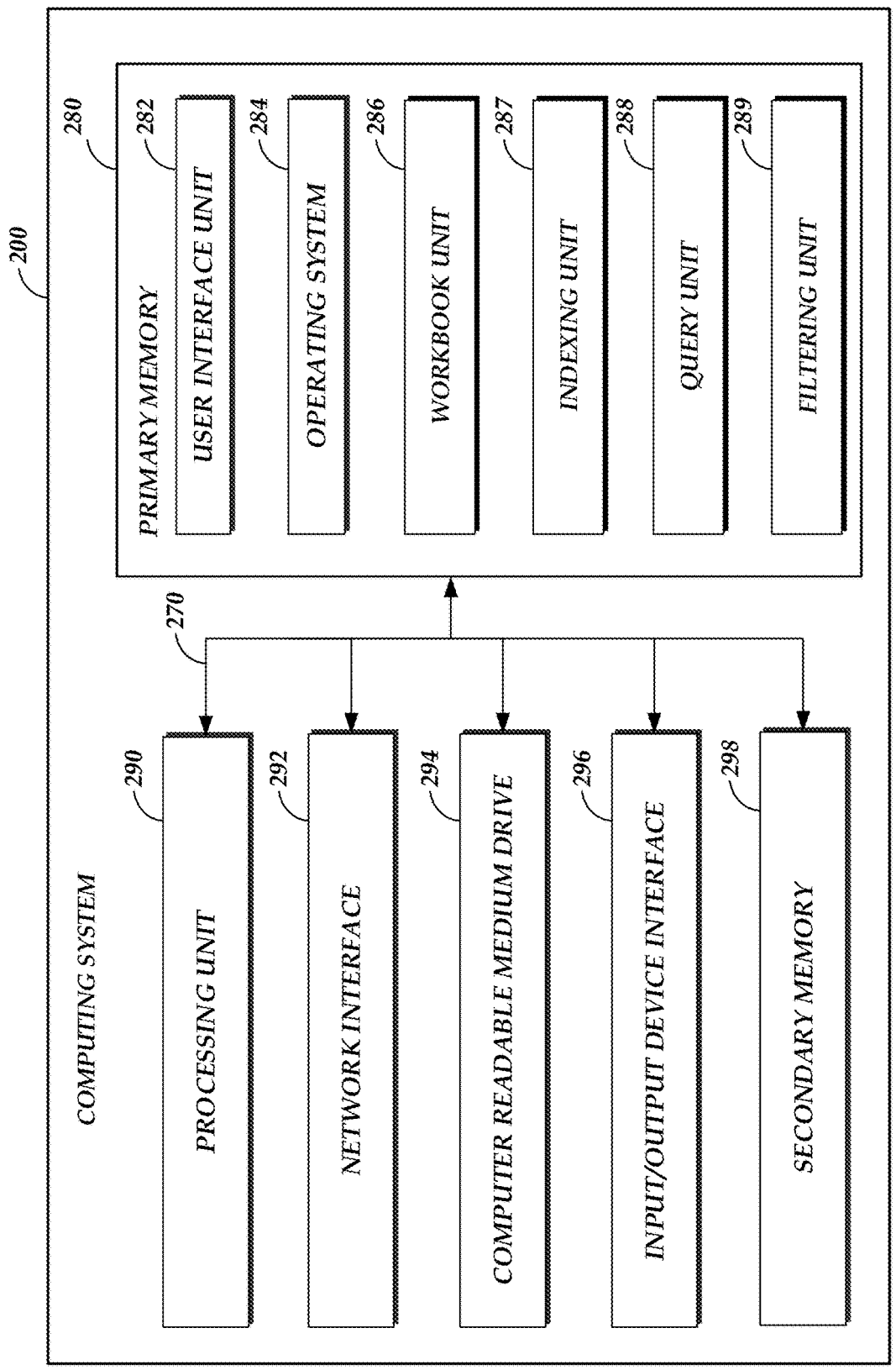
FIG. 2 depicts a general architecture of a computing system implementing one or more of the client devices and the application computing environment of FIG. 1.

FIG. 2 depicts a general architecture of a computing system 200 implementing one or more of the client devices 102 and the application computing environment 110 of FIG. 1. The general architecture of the computing system 200 depicted in FIG. 2 includes an arrangement of computer hardware and software that may be used to implement aspects of the present disclosure. The hardware may be implemented on physical electronic devices, as discussed in greater detail below. The software may be implemented by the hardware described herein. The computing system 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the computing system 200 includes a processing unit 290, a network interface 292, a computer readable medium drive 294, and an input/output device interface 296, all of which may communicate with one another by way of a communication bus 270. The network interface 292 may provide connectivity to one or more networks (for example, the network 104) or computing systems (for example, the client devices 102). The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, cloud storage objects or services (for example, Amazon's Simple Storage Service (S3), block and file services (for example, Amazon's Elastic Block Store (EBS) or Elastic File System (EFS), and the like. In some embodiments, all of the primary memory 280 or the secondary memory 298 may utilize one of the tiers of memory devices identified above. The primary memory 280 is assumed for the purposes of description to represent a main working memory of the computing system 200, with a higher speed but lower total capacity than secondary memory 298.

The primary memory 280 may store an operating system 284 that provides computer program instructions for use by the processing unit 290 in the general administration and operation of the computing system 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a web browser or software application installed on the computing device.

In addition to and/or in combination with the user interface unit 282, the memory 280 may include a workbook unit 286 that facilitates management of the workbook in conjunction with and for use with web and mobile applications. Illustratively, the workbook unit 286 may configure the computing system 200 to accept requests and/or commands to create, modify, access, or view data stored in or with respect to a workbook by one or more of the web or mobile applications or the owner or user thereof. The workbook unit 286 may implement those requests and/or commands (e.g., by instructing physical host devices implementing the workbook system 120 and the workbook updating service 130 to route network traffic and data in a manner corresponding to creation, management, and use of the data of the workbook. The indexing unit 287 facilitates creation, management, maintenance, and deletion of indices in conjunction with and for use with queries, query information, formulas, expressions, and the like in response to queries, formulas, expressions, and/or inputs from the user, the web, and/or mobile applications. Illustratively, the indexing unit 287 may configure the computing system 200 to accept requests and/or commands to or to automatically create, access, manage, maintain, or delete indices for columns of data stored in or with respect to a workbook. The indexing unit 287 may implement those requests and/or commands (e.g., by instructing physical host devices implementing the indexing module 134) to create, access, manage, maintain, delete, and/or otherwise work with indices for cells of the workbook. A query unit 288 facilitates responding to queries received via a communication circuit, user interface, and the like. In some embodiments, the queries may exist in the workbook. Illustratively, the query unit 288 may configure the computing system 200 to accept queries, formulas, expressions, and/or inputs to automatically respond to and/or process the queries, formulas, expressions, and/or inputs based on data stored in or with respect to the workbook. The query unit 288 may implement those requests and/or commands (e.g., by instructing physical host devices implementing the query module 136) to work with the queries and the like. A filtering unit 289 facilitates responding to and/or working with filters on data in the workbook. In some embodiments, the filters may exist in the workbook or be received via a communication circuit and/or user interface. Illustratively, the filtering unit 289 may configure the computing system 200 to accept the filters and corresponding data to automatically respond to and/or process the filters and data stored in or with respect to the workbook. The filtering unit 289 may implement those requests and/or commands (e.g., by instructing physical host devices implementing the filtering module 138) to work with the filters and the like.

The computing system 200 of FIG. 2 is one illustrative configuration of such a device, of which others are possible. For example, while shown as a single device, the computing system 200 may, in some embodiments, be implemented as multiple physical host devices. In other embodiments, the computing system 200 may be implemented as one or more virtual devices executing on a physical computing device. While described in FIG. 2 as a computing system 200, similar components may be utilized in some embodiments to implement other devices shown in the environment 100 of FIG. 1.

Spreadsheet Indexing

Indexing, as introduced above, can improve responsiveness and efficiency of queries on tables while incurring resource overhead, both computational and memory. The computing environment 110 comprises one or more components (for example, of the workbook query and update service 130), that generates and maintains in-memory index data structures with or separate from the workbook. In some instances, the indices can exist for all columns in every table on every sheet of the workbook to help speed up any queries on the workbook. Alternatively, the indices can exist for a subset of random, selected, or various different columns in a number of the tables in the workbook (for example, all of the tables or any subset of the tables) on every sheet, or a subset of sheets, of the workbook to help speed up queries on the workbook. These index data structures are specifically constructed to quickly retrieve rows that match query specified criterion. In some embodiments, indexing can be selectively enabled and/or disabled in the workbook. For example, dynamic constraints may limit use of the indices at certain times, for example when resources are unavailable, allowing the owner or user to enable or disable indexing as appropriate.

Additionally, the systems and methods herein may enable selection of a kind of indexing to apply to the spreadsheets, from general indexing schemes to adaptive indexing schemes. Any of the indexing schemes described herein may apply to simple queries (for example, having simple formulas or expressions associated therewith), complex queries (for example, having complex formulas or expressions associated therewith), or compound queries (for example, being a query on multiple columns). Received queries may include formulas or expressions that are exact match or variable match.

Because columns in spreadsheets may include data of varying datatypes, the workbook query and update service 130 may utilize a hybrid datatype for indices on the columns. In some embodiments, the hybrid datatype may associate multiple primitive or standard (referred to herein as primitive) datatypes using one or more object comparisons. For example, the workbook query and update service 130 may employ an equality or a customized comparison function that maps the integer value 2, the real value 2.0, and the text string "2.0" to a single bucket, regardless of which datatype was used in the query. For example, when the hybrid datatype is initialized or created, the hybrid datatype may include scripting or definitions that associate or define relationships between values of different datatypes that form the hybrid datatype. With such a customized function to compare objects of different datatypes, the single index hybrid datatype can be applied to a column having cells or rows therein with different datatypes because these different datatypes can be compared using the customized function. To enable the hybrid datatypes, the customized function can ensure that each of the different datatypes can be compared and/or similarly evaluated. For example, the customized (or other) function applied should satisfy equals and/or hash( ) code contracts, such that values that would otherwise be determined by a user to be equal, hash to the same value when processed by the workbook query and update service 130. Accordingly, instances of the same value can be processed and indexed across different datatypes and/or representations.

Generating an index with the workbook query and update service 130 may further comprise determining what kind of index or indices to create for each table column, when and/or how to maintain the indices, when to delete indices, and so forth. When applying an indexing scheme, the workbook query and update service 130 may create and maintain many types of indices, where each type of index has different performance characteristics on different types of queries. Furthermore, the workbook query and update service 130 may apply indexing either eagerly or lazily, which relates to how aggressively indices are created and/or utilized. Furthermore, in systems where memory management and query performance is critical, the workbook query and update service 130 may make further considerations, including when to discard unused indices, how to maintain indices, and impacts of the indices on updates to the workbook and/or recalculation.

The workbook query and update service 130 may generate any of hash-based indices, tree-based indices, and prefix/suffix tree-based indices. The selection of which index to create for any given column may be based on a performance gain that can be expected from the index. For example, hash-based indices may not provide much of a performance gain for columns on which the comparison operators (for example, "<", "≤", ">", and "≥") are generally applied. The selection of which index to create can be based on a datatype of the index key (for example, the datatype that the index is being used to search for) and query patterns (for example, how is the column best optimized in view of typical queries on the column). More specifically, the workbook query and update service 130 may generate hash-based index types for exact match queries wherein the index key is an ordered list of row ranges. The hash-based index type may utilize a smallest amount of memory as compared to the tree-based and prefix/suffix tree-based index types, therefore providing a large performance gain to cost ratio. In some embodiments, the workbook query and update service 130 uses a hash tree map data structure to maintain hash-based indices. However, hash-based indices may be less useful when working with string values in the query.

The workbook query and update service 130 may generate tree-based indices for comparison operators because tree-based indices utilize ordering for date or numeric datatypes in keys. The tree-based indices can be more useful in comparison evaluation as opposed to exact match evaluations. The tree-based index may use a tree map structure, for example a basic B-tree structure. The workbook query and update service 130 may use a prefix/suffix tree index when working with textual data, where data may have prefixes and/or suffixes to evaluate.

While implementing indexing, the workbook query and update service 130 may employ eager indexing, where an index for a column is created when the table in which the column exists is created. Thus, under eager indexing, the workbook query and update service 130 may implement indexing (for example, create and/or update respective indices) synchronously with other operations on the workbook that impact indexing. For example, the workbook query and update service 130 may need to complete an index corresponding to an operation on the workbook before the operation that triggered the indexing completes. Thus, for write operations, the corresponding write operation that triggers an indexing operation might take unusually long because the indexing can occur synchronously with that write operation.

However, because all columns that are indexed (whether that be all columns or a subset of columns in the workbook) may not be queried, eager indexing can result in wasted resources where indices are created for columns that are never referenced. Accordingly, the workbook query and update service 130 may employ lazy indexing, where an index is only created in response to a query on a column (i.e., filtering or searching on a column) for the first time or updated in response to a query (for maintenance of existing indices). The lazy indexing may optimize memory consumption as compared to eager indexing but can result in reduced performance compared to eager indexing, at least for initial searches on a table. In some instances, the workbook query and update service 130 may provide the user with options to select between lazy and eager indexing. Alternatively, eager indexing may be provided as a default to provide immediate improvements with respect to search responses.

Furthermore, when considering memory and resource constraints, the workbook query and update service 130 may identify unused indices. An unused index may comprise an index that has not been accessed (for example, used to query a column) for a given period or threshold of time. The workbook query and update service 130 may track when indices are deleted with respect to when they may be recreated in the future to dynamically adjust the period or threshold of time or introduce other constraints to limit recreation and deletion of the same indices repeatedly. With respect to performance impacts, indexing in general may increase times for certain processes, such as cell updates and/or recalculations (where the updates result in updates to corresponding indices, increasing the time involved with such updates and/or recalculations). In some instances, such performance impacts can be mitigated through use of flags to indicate whether a column includes any formulas or expressions for recalculation processes, for example.

Once the workbook query and update service 130 creates and stores indices, the indices may need to be updated in corresponding with the data to which the indices apply. For example, the workbook query and update service 130 makes updates to indices when a value in a cell of the corresponding column is updated or otherwise changed (for example raw and/or formatted value changes). The workbook query and update service 130 may track which column an updated cell belongs to and update the index for that column.

Anytime a new row is added to or deleted from a table having an indexed column, the workbook query and update service 130 may update the corresponding index. Additionally, when the workbook query and update service 130 performs a recalculation and one of the cells in the indexed column has a formula in it, the index for that column will be updated. However, when the cell contains the formula, the workbook query and update service 130 may update indices when the value or formatted value of the corresponding column changes. If neither the value nor the formatted value of any cell in the column change, the index for that column does not need to be updated.

Because the workbooks can be loaded into and closed out of working memory, the workbook query and update service 130 may have to manage indices through such transitions of the workbook. For example, the workbook query and update service 130 may (1) persist the indices, along with corresponding actual data, and restore them when the workbook is restored into working memory or (2) rebuild the indices every time the workbook is reloaded into memory from a checkpoint. When persisting the indices, the workbook query and update service 130 may create and maintain serializable indices. Both persisting indices and rebuilding indices from scratch may be a rare occurrences, as the corresponding workbooks are generally expected to be maintained in memory. In some embodiments, the owner or end user may determine which approach to take for workbook reloads. Example interactions for creating of indices according to the indexing scheme described herein and utilizing the indices to generate a response to a query are provided in FIGS. 3 and 4.

Figure 3:
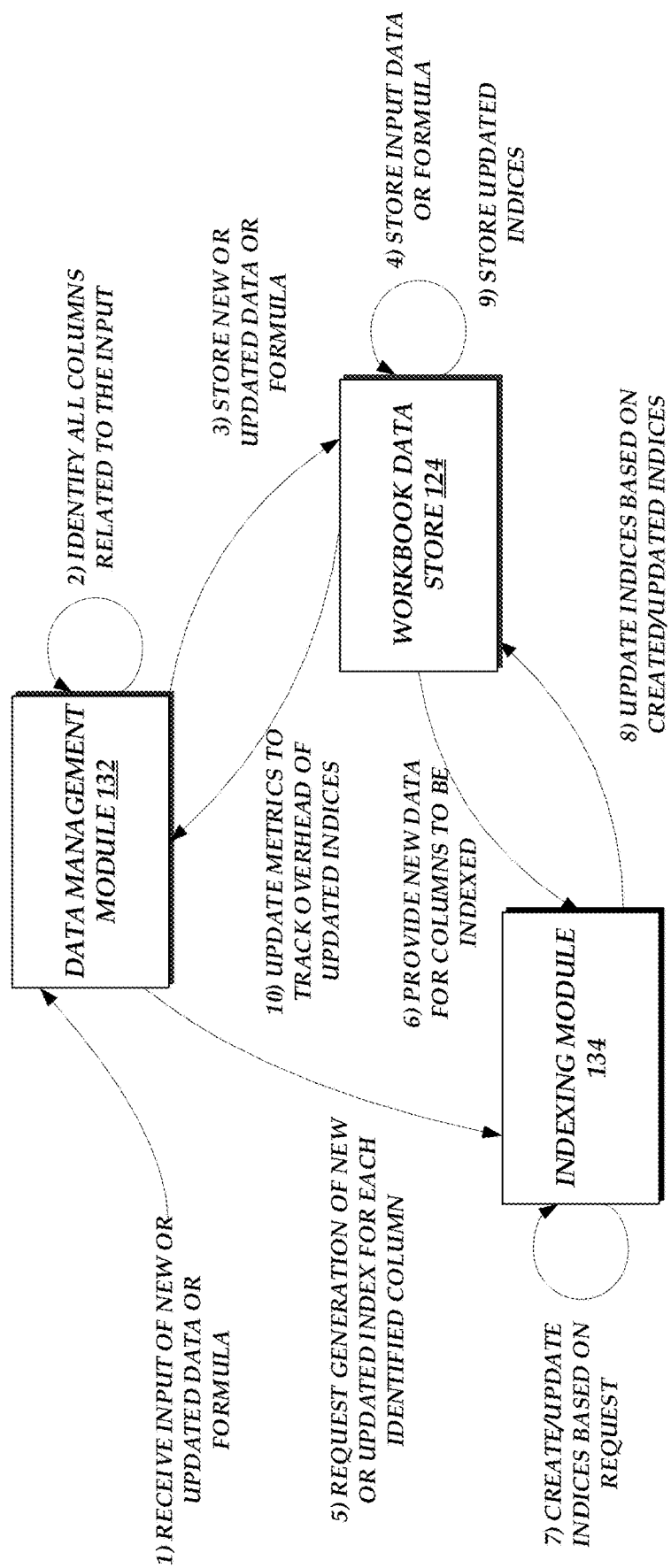
FIG. 3 is a flow diagram depicting illustrative interactions for automatically implementing an indexing scheme for a spreadsheet based workbook following receipt of an input enabling indexing in the workbook.

With reference to FIG. 3, illustrative interactions will be described for automatically implementing an indexing scheme for a spreadsheet based workbook following receipt of an input enabling indexing in the workbook. For purposes of FIG. 3, it is assumed that the owner has previously established or created a workbook and corresponding spreadsheet structured data store framework such that the workbook associated with a corresponding application already exists and is accessible by the owner and users. Effectively, by the time the interactions shown in FIG. 3 occur, the owner or user is accessing the workbook query and update service 130 associated, for example, with the application using one of the client devices 102 via the network 104. In some instances, at the time the interactions shown in FIG. 3 occur, the owner is initially populating the data store with data. In some embodiments, one or more of the modules shown in FIG. 3 can be replaced with or substituted by any other module of the computing environment 110 and/or workbook query and update service 130.

According to FIG. 3, at (1), the data management module 132 receives an input (for example, from the owner or user, of the application associated with the workbook or receives the owners initial input of data for the workbook. The application data may be entered into the workbook (for example, via the spreadsheet view described herein) directly by the owner or user via one of the client devices 102 or obtained/imported from a network accessible storage 108 of FIG. 1. Generally, the application data may include initial data being entered into the workbook, additional data being appended to existing data in the workbook (for example, that involves adding one or more columns or rows to a table in the workbook or changing one or formulas for cells in the workbook), deletion of data from the workbook (for example, that involves deleting one or more columns or rows from a table in the workbook), reformatting of data structures in the workbook, moving or renaming of data structures in the workbook, and so forth. For the purposes of FIG. 3, the application data received from the input is new data being added to the newly created or previously existing workbook. In some embodiments, though not shown, at (1) the data management module 132 may also receive an input enabling indexing in the workbook, for example from the owner or from a user wishing to improve responsiveness of the application.

At (2), the data management module 132 parses or otherwise examines the data received at (1) and identifies columns that are related to the received inputs. In some embodiments, identifying the columns at (2) involves parsing and/or evaluating formulas received in the input of (1). For example, when the input at (1) comprises the initial data for the workbook, the data management module 132 may parse all (or a subset) of the data of the workbook and identify all (or any subset) of the columns in the workbook that exist in the workbook (for example, that exist in any tables of the workbook). In some embodiments, the user may select which data or columns to parse. If the input received at (1) is new data being added to or updating existing data in the workbook (for which columns have already been identified), then the data management module 132 may only identify columns related to the input new data (for example, columns for which the new data is one or more new rows, changes values of one or more existing rows, changes or adds one or more new columns or new tables, and so forth). If the input at (1) is enabling indexing for an initial time, then the data management module 132 may identify all (or a subset of) columns in the workbook, whereas if the input at (1) is re-enabling the indexing, then the data management module 132 may identify columns related to any cells that changed or are new or have formulas that changed or are new since the indexing was disabled. Thus, at (2), the data management module 132 identifies columns that are related to or relevant to the input received at (1).

At (3), the data management module 132 passes the received new or updated data or formula to the workbook data store 124. In some embodiments, at (4), the workbook data store 124 stores the new or updated data or formula in the workbook data store.

At (5), the data management module 132 may generate and send a request to the indexing module 134 to generate a new or updated index for each column identified in (2). For example, if the input at (1) is populating the workbook or enabling indexing for an initial time, then the request at (5) will be for the indexing module 134 to generate or create new indices for each columns of the workbook. If the input at (1) is adding new data to or changing existing in the workbook or enabling indexing for a second (or additional) time, then the data management module 132 may request, at (5), that the indexing module 134 only generate indices for the columns related to the input data and/or formula or that are related to a change in the workbook that occurred since the indexing was turned off. At (6), the workbook data store 124 conveys the relevant to column data to the indexing module 134. For example, if the indexing module 134 receives a request to index a column called "Color" for a table called "Hair Dye", then the workbook data store 124 may convey, at (6), to the indexing module 134, the data in the column "Color". The indexing module 134 may use the data received at (6) to generate or update one or more indices based on the request at (5). Thus, at (7), the indexing module 134 generates column indices based on the request (5) and the data from (6). In some embodiments, generating the indices at (7) comprises generating indices of different types, for example the basic has indices, the basic tree based indices, and the prefix/suffix trees indices.

At (8), the indexing module 134 may convey the generated and/or updated indices to the workbook data store 124. In some embodiments, any created and/or updated index is stored in the workbook data store 124 for reference responding to a query or other use cases. In some embodiments, each index is stored in the workbook data store 124 (or another data store, not shown) with reference to the column to which the index is related. For example, a Column 1 may have a corresponding Index 1 or a column "Colors" for the table "Crayons" may have a corresponding index "Colors" for the table "Crayons", and so forth. At (9), the workbook data store 14 stores the updated indices in the workbook data store 124 for usage when responding to a query or other similar data or information requests.

At (10), the workbook data sore 124 provides updated metrics to the data management module 132 for tracking of efficiencies and efficacies of the stored indices. For example, the metrics (10) may comprise one or more of an overhead metric and/or memory metric as described herein. Typically, for the kind of indices created at (7), additional overhead for writes may be but may be tracking by one or more metrics. In some embodiments, the workbook data store 124 may use the metrics to automatically enable/disable the indexing for the workbook. In some instances, one or more of the interactions (1) through (10) can occur concurrently to enable the computing environment 110 to use the new or updated indices from (7) to respond to any query or request received with the input at (1). For example, the index update at (7) may occur synchronously to an event associated with the input at (1).

Figure 4:
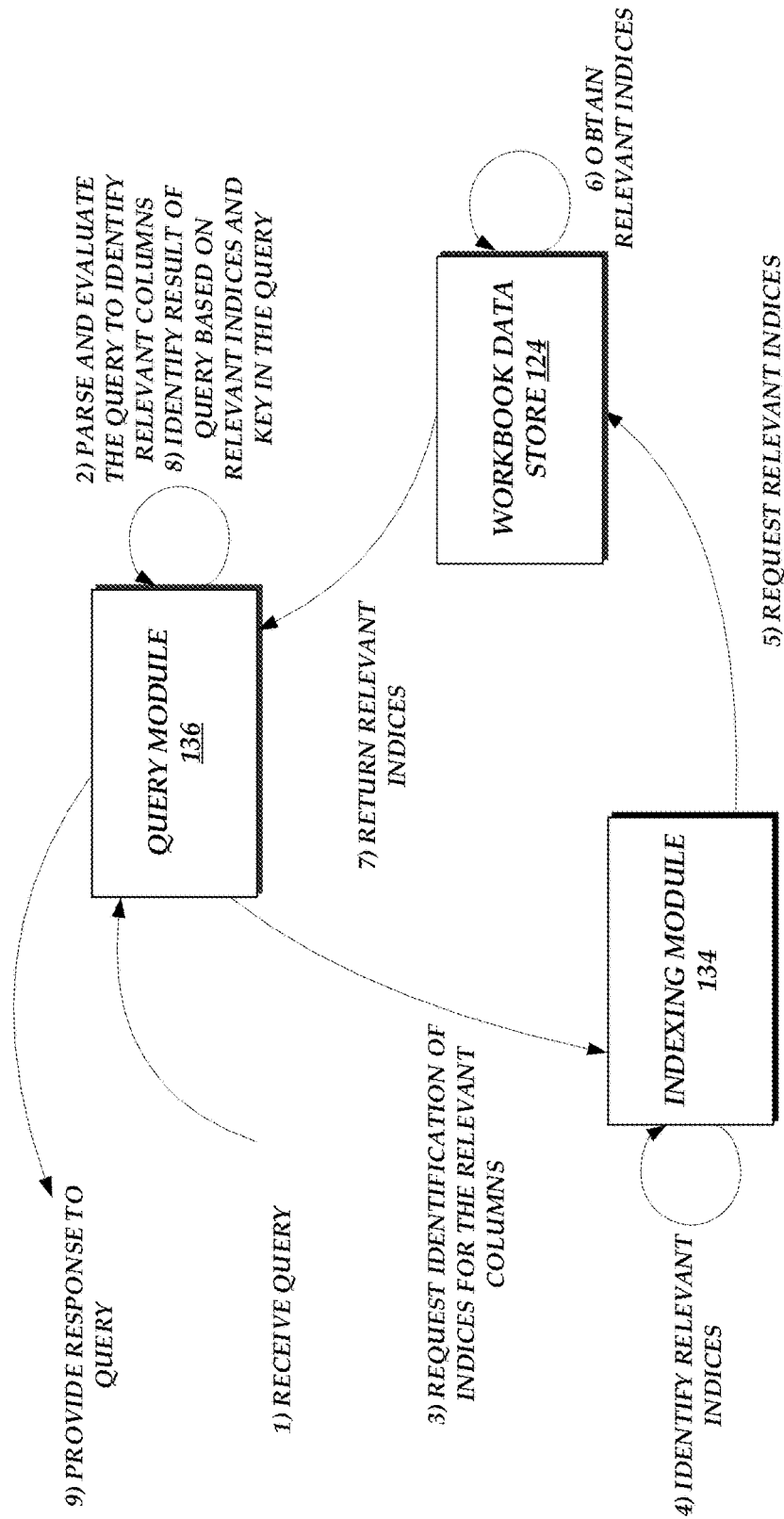
FIG. 4 is a flow diagram depicting illustrative interactions for automatically implementing receiving and processing a query on a spreadsheet based workbook using the indexing scheme of FIG. 3.

With reference to FIG. 4, illustrative interactions will be described for automatically implementing receiving and processing a query on a spreadsheet based workbook using the indexing scheme of FIG. 3. For purposes of FIG. 4, it is assumed that the owner has previously established or created a workbook and corresponding spreadsheet structured data store framework and column indices such that the workbook is ready to process received queries and is accessible by the owner and users. Effectively, by the time the interactions shown in FIG. 4 occur, the owner or user has generated all relevant indices for the workbook in the workbook query and update service 130 according to FIG. 3. In some instances, at the time the interactions shown in FIG. 4 occur, the owner is concurrently applying the interactions of FIG. 3, for example when the query is received concurrently with new data, and so forth, for the workbook. In some embodiments, one or more of the modules shown in FIG. 4 can be replaced with or substituted by any other module of the computing environment 110.

According to FIG. 4, at (1), the query module 136 receives a query. In some embodiments, the data management module 132 may receive the query at (1) and pass the query on to the query module 136, not shown in FIG. 4. In some embodiments, the query may be received from one of the owner or user of the workbook and/or associated application. In some embodiments, the query may be received from the user interface 112 (for example, may present information on the user interface 112 generated based on the query received at (1)).

At (2), the query module 136 parses and/or evaluates the received query from (1). For example, when the query from (1) comprises a formula or expression, the query module 136 parses the formula or expression to identify relevant columns related to the query from (1). In some embodiments, the query module 136 may have to evaluate the parsed formula or expression, for example when the formula comprises a complex operand, datatype, or operator. For example, when the formula or expression comprises a filter function, the query module 136 may first parse the filter function and then evaluate the filter function to identify which one or more columns are related to (for example, called by) the filter function.

Once the query module 136 identifies the relevant columns for the query at (2), the query module 136 generates a request (3) to the indexing module 134 for identification of indices for the relevant columns. For example, because all (or some subset of) columns in the workbook are indexed, as introduced with reference to FIG. 3, all relevant (or a subset of the relevant) columns as identified at (2) will have corresponding indices that enable quicker and more efficient generation of responses to queries received at (1) because the indices for relevant columns can be referenced for identification of a value based on the query as opposed to having to sequentially examine each row in the column if no index for the column exists. As more of the columns in the workbook are indexed, more indices will be available for use when responding to the query.

At (4), the indexing module 134 identifies the relevant indices for the identified relevant columns from (2) and (3). In some embodiments, each identified column from (2) and (3) has a corresponding index, as generated with reference to FIG. 3. In some embodiments, though not shown in FIG. 4, when the indices generated with reference to FIG. 3 are stored in the workbook data store 124, the query module 136 may direct the request for identification of the relevant columns to the workbook data store 124 instead of or along with the request to the indexing module 134, and the workbook data store 124 can identify the relevant indices based on the identified relevant columns from (2) based on them being stored with a corresponding reference. Alternatively, when the indices are stored in the workbook data store 124 with a reference that corresponds to the column for which the index is generated, the query module 136 (or the data management module 132) may identify the relevant indices for the identified relevant columns from (2) itself without involving the indexing module 134 or the workbook data store 124 in the identification of the indices. At (6), the workbook data store 124 obtains the relevant indices based on the request (5) (or a request from the query module 136 or data management module 132 or the identification of the relevant indices by the workbook data store 124 itself, not shown). The workbook data store 124 may then provide the relevant indices to the query module 136 at (7). Based on the relevant indices received from the workbook data store 124 (or similar data store) at (7), the query module 136 may, at (8), identify a response or result to the query received at (1) and provide the result or response to the query from (1) at (9). In some embodiments, the response or result to the query may comprise an identification of one or more rows that include a searched term or key as a value. For example, if the query is searching for the term "red" in a column of colors, then the result to the query may comprise a listing of the row(s) that have the term "red" as their value.

For example, the interactions of FIG. 3 may create indices for all (or a subset of) columns in a workbook. For example, if the workbook has three tables with five columns each, then the interactions of FIG. 3 may create up to fifteen indices for the workbook, though a fewer number of indices may be created, for example based on selection by the user, and so forth. Furthermore, though not described in detail in the interactions of either of FIGS. 3 and 4, the creation of each index can result in creation of an index of each type (hash, tree, and prefix/suffix tree), as introduced herein. Thus, under the general indexing scheme, the systems and methods herein may generate forty-five indices for the example workbook with three tables having five columns each. This number of indices may involve a large amount of overhead, as measured by one or more of the metrics described herein. The interactions of FIG. 4 may receive, at (1), a query on the workbook having the three tables with five columns each. The query may include a filter expression to identify all rows in a column "Crayon Color" that have the value "Red" therein. The query module 136 may parse and evaluate the filter expression to identify the "Crayon Color" column as being the relevant column, at (2). At (3), the query module 136 requests that the indexing module 134 identify the indices (each of the hash, tree, and prefix/suffix) for the column "Crayon Color", which the indexing module 134 does at (4), for example identifying the indices "Crayon Color". The indexing module 134 submits that identification to the workbook data store 124 at (5), which obtains the indices and submits the indices "Crayon Color" to the query module 136, which generates the relevant rows requested by the query from (1) using the index "Crayon Color" from (7) and outputs the relevant rows at (9) in response to the query.

Thus, FIGS. 3 and 4 indicate how the general indexing scheme can be applied to a spreadsheet or similar unstructured data store. For example, as shown in FIG. 3, contrary to traditional databases where relevant indices are identified by programmers that create the databases, the systems and methods described herein can generate indices for the spreadsheet or unstructured data store on demand or dynamically and for one or more (for example, all or a subset thereof) columns in the spreadsheet. Such creation of indices can greatly improve responsiveness to queries and similar processing demands and/or requests, as shown with respect to FIG. 4. As more columns of the workbook are identified and indexed, the more the response time of the query improves. However, the more columns that are identified and indexed, the more time and overhead will be expended on the processes of identifying and indexing. For example, because this general indexing scheme can result in creation of indices for all columns in the workbook, memory and/or computational overhead for creating and maintaining the indices may be high, as compared to adaptive indexing options introduced below.

Adaptive Indexing

The workbook systems and methods described herein employ adaptive indexing approaches for generating indices that examine formulas or expressions received via queries in the application(s) or embedded in the workbook itself (for example, in cells, relationships, etc.) to identify common query patterns and selectively create specific, in-memory indices for those particular columns identified in the examined formulas or expressions or received via queries. Such query generating approaches may improve spreadsheet query speeds significantly (for example, on the order of hundreds of times of improvement) and removes limitations on a maximum number of rows available in the table and/or spreadsheets. Each of the indexing approaches provide improvements over general indexing approaches, in which workbook systems and models generate indices for all table columns in the workbook or require identification of particular columns for which to create indices. Such a blanket approach of creating indices for all (or a potentially large number of) columns may provide improved responses times to queries when the queries are received but demand increased storage and computational costs when creating the indices and/or updating the indices.

Without the approaches of adaptive indexing described herein, query execution latencies could measure in the tens of seconds for tables having even as few as 100,000 rows. With these approaches of adaptive indexing implemented, the same queries executed within 100-200 microseconds on the same tables, and even for tables containing millions of rows.

The adaptive indexing described herein may track different query patterns used inside the workbook spreadsheet. Specifically, the workbook systems and methods and/or the spreadsheet engine may parse each formula or expression in a cell in the spreadsheet or parse each query that filters a table in the spreadsheet and recognize corresponding references to table columns and corresponding operands. For example, if the workbook systems and methods receive a query, for example via an application, such as FILTER (Tasks, "Tasks[Status]=% AND Tasks[Remaining Points] >%", "In-Progress", 200), the workbook systems and methods may recognize, by parsing this formula, that the query speed would be improved with a hash index on the Tasks [Status] column and a navigable index on the Tasks[Remaining Points] column. Based on this information, the workbook systems and methods may track a number of references to particular table columns using counters, for example stored in a manifest or list. After each write to the table (and/or workbook data set), as formulas and/or expressions are updated, the workbook systems and methods may update the counters to keep table column references fresh. If counts for a particular table column falls to 0, then the systems and methods may remove a corresponding index from memory, thereby removing its creation and update in response to future updates to the workbook spreadsheet. If a new table column reference is identified (for example, due to a new formula in one of the cells or in response to a new query), then the systems and methods herein may create a new index for the newly referenced table column on-the-fly.

Hence the indices in the workbook systems and methods may adapt to usage by following formulas used inside the spreadsheet. In some embodiments, some impromptu queries from end users may be tracked over time to identify index misses and/or stale indices. An index miss occurs when a query is executed and that query does not have a corresponding index that could have sped up the query response. Similarly an index becomes stale, when the index has not been used in a query for a certain period of time. By tracking index misses and stale indices, the workbook systems and methods can optimize more impromptu queries from end users even when they are not encoded as formulas in the application itself. Furthermore, such improvements to the adaptive indexing can provide minimal overhead in maintaining the corresponding indices.

Data Driven Adaptive Indexing

As introduced above, the data driven approach for adaptive indexing involves identifying (for example, by the query module 136, the indexing module 134, and/or the data management module 132), in the workbook, cells that include a formula or expression that reference a table, table column, or cell in the workbook. Based on the identified tables, table columns, and/or cells, the indexing module 134 and/or the data management module 132 may create an index for the corresponding table columns referenced in the formulas or cells within the workbook and store created indices in the workbook data store 124 or similar data store.

Application of the data driven adaptive indexing approach may be based on one or more assumptions, for example that the number of queries received referencing table columns, formulas, and/or expressions, not having a corresponding formula and/or expression already in the workbook is mal. This means that most queries received and/or processed by the workbook update and query service 130 involve known table columns, formulas, and/or expressions based on the analysis of the cells in the workbook, as described above. Thus, under the data drive approach, few, if any, queries are expected that will reference table columns that are not referenced by the formulas and/or expressions in one or more of the cells of the workbook. Furthermore, the adaptive indexing, and specifically the data drive approach, assume that most queries that will be received and processed by the data management module 132 and/or the query module 136 relate to a limited number of table columns (meaning a limited number of corresponding indices is employed), because much data inside of a table, and therefore the workbook, is informational and not computational.

In some embodiments, as described further below, the data driven approach may be used in conjunction with and/or updated with the usage driven approach of adaptive indexing. Alternatively, the data driven approach may use as a basis, at least in part or in conjunction with the analysis of formulas and expressions within the workbook, statistical analysis and/or machine learning to identify which table columns to index based on available data within the workbook and/or similar workbooks.

To efficiently and effectively employ the data driven adaptive indexing approach, the data management module 132 and/or the indexing module 134 may identify what data to index, what types of indices to create, and when to index the data identified to index.

Determining what data to index may be a resource intensive problem to solve. Generally speaking, the data management module 132 and/or the indexing module 134 may have two options for indexing any given table column in the workbook: not index the table column, or index the table column with one or more index types. Under the data driven approach, the data management module 132 and/or the indexing module 134 operate on the basis that the data inside the workbook reflects the patterns of interactions with or within the workbook. Thus, the data management module 132 and/or the indexing module 134 parse formulas and/or expressions of cells within the workbook to decide what table columns to index. In some embodiments, such parsing of formulas may be limited to identifying those references within formulas of a cell but have issues detecting references inside expressions and/or formulas with variables. In some embodiments, the usage driven approach may be added or used in conjunction with the data drive approach to capture such embedded or complex formulas and/or expressions.

In some embodiments, under the data driven approach, the data management module 132 and/or the indexing module 134 may preserve the reference information acquired by analyzing formulas (for example, filter and similar formulas) across workbook reloads, for example as part of workbook checkpoint information. By saving the reference information during or across workbook reloads, overhead can be reduced because the formulas and expressions within the workbook do not all need to be reanalyzed with every workload. Instead, only those cells, tables, etc., changed as part of the workbook reload may be reanalyzed to determine if the change to those corresponding portions resulted in a change to which table columns need to be indexed.

The analysis and/or decision regarding which table columns to index may account for various criteria.

For example, a first criteria may be number of references to a particular table column based on the analysis of the cell formulas and/or expressions in the workbook may be a factor in determining whether to index the table column. For example, generating a list of all table columns referenced within the formulas and/or expressions of the workbook for indexing may result in a large number of table columns to index. However, many of those listed table columns may only be referenced a few times, while some table columns (assumed to be a smaller number, as discussed above) on the list may be referenced many more times. The data management module 132 and/or the indexing module 134 applying the data driven approach may dynamically adjust indexing of the table columns in the workbook based on how often a particular table column is referenced. Thus, the list of table column references may also indicate how many times each table column on the list is referenced, and the data management module 132 and/or the indexing module 134 may establish or utilize a threshold to identify those table columns on the list for which to generate indices. Such references may represent express intent of the users (for example, the owner and/or end users) of relationships between data in the workbook. The data management module 132 and/or the indexing module 134 may operate on a basis that user access and/or query patterns will likely follow and/or be proportional to such identified relationships. In one example, the data management module 132 and/or the indexing module 134 index each table column of the workbook that has at least one reference to it in at least one formula cell or expression, therefore creating an index for all table columns identified on the list introduced above. Such an example may involve a largest possible memory usage for the corresponding indices and/or indexing compute time at workbook initialization, loading, and/or reloading.

As a second criteria, the data management module 132 and/or the indexing module 134 may determine whether a table is a standard table or part of a template. For example, certain tables in the workbook may be considered standard tables that are expected to exist in a large number, if not all, workbooks and/or be referenced in a large number of workbooks. For example, a table identifying all users or contacts for a table or workbook, for example a "Workbook Contacts" table and/or a "Workbook Groups" table, may exist for many if not all workbooks and may be commonly referenced and thus, may be determined and/or set as needing to be indexed. Similarly, some tables may be part of templates that are generally used by and referenced by a large number of use cases. Based on this knowledge or these assumptions, those table columns that are generally known to be in high demand and high reference (for example, used in tables that exist in a large number of workbooks or referenced or used in templates used by a large number of workbooks) can be automatically indexed under the data driven (and even the usage driven) adaptive indexing approach. In operation, the data management module 132 and/or the indexing module may mark or identify specific columns in specific tables to be indexed and/or further identify these columns to prevent index removal once the indices are created. In a similar type of analysis, the data management module 132 and/or the indexing module 134 may not index or prevent indexing of table columns that are not often referenced or used, for example table columns including workflow logs and the like. For example, if a particular table is consistently used as an append-only table and never queried or very rarely queried upon, then the system may prevent indexing of columns from that table based on such knowledge. These kinds of tables are created and maintained by the system itself and, hence, the system can control their lifecycle and what kind of queries are executed on those tables.

A third criteria used by the data management module 132 and/or the indexing module 134 is where are the references to table columns inside a formula. For example, locations of the references within the formulas may be treated differently. For example, a mathematical operand (for example, SUM ([Expenses])) that may be found in summary rows for a particular column may be treated differently than a filter operand (for example, FILTER(Employees, "Employees [Level]>5"). Table column references in non-filter operands may benefit less from filtering as compared to filter operands. As such, table column references used inside filter clauses and conditionals and similar operands may be prioritized or identified for indexing when identified by the data management module 132 and/or the indexing module 134 analyzing the table column references in the workbook. The table column references inside non-filters operands may be ignored or deprioritized for indexing.

The data management module 132 and/or the indexing module 134 may identify and track these criteria for table columns identified in the workbook. In some embodiments, these modules may also rely on planned work to identify corresponding table columns used in filter formulas that will be applied to or used in the workbook. In some embodiments, the methods 132 and/or 134 may employ an interface that extracts filter formulas and similar operands from the workbook and aggregate such formulas and operands with cell transitions, such as formula cell creation, formula cell updates, and formula cell removal. By aligning these formulas with the cell transitions, particular table columns can be indexed or existing indices can be maintained or deleted.

In some instances, by identifying the formula information during parsing of the formulas in the workbook, the data management module 132 and/or the indexing module 134 can detect reference decrements (for example, reductions in numbers of references of the table column) before corresponding records are overwritten by formula evaluation or reevaluation. In some instances, where there may be multiple formulas in a cell, all formulas in the cell can be parsed to determine which columns to index. cell formulas may only updated or evaluated once the corresponding cell is populated with the formula, and the formula may not be parsed before the cell is populated with the formula. Similarly, expressions in the cells may not be parsed when they are created, so the data management module 132 and the indexing module 134 may need to parse such formulas and expressions when they are created, updated, and deleted.

Alternatively, or additionally, the data management module 132 and/or the indexing module 134 may identify those table columns not to index. For example, if a table column is not referenced inside the workbook itself, including stored procedures, assets and any formulas inside the workbook, the data management module 132 and/or the indexing module 134 may determine to not index the corresponding table column. Similarly, if a table without any references in the workbook exists, the modules may assume that the table is used as an append-only storage of metadata and is not used to execute any queries.

Identifying what type of index to create may be determined by the modules during formula parsing. The determination of what type or types of index to create for each table column may be dependent on operators or operands used with the respective table column and the datatype of the operands. However, not all relevant information may be available during formula parsing. For example, the formula or expression Filter(Table,"Table[Column]=A2") may be extracted to identify the operand ContextSensitiveOperand (A2) but the value of A2 may not be resolved until evaluation of the expression.

Thus, the following information will be aggregated to decide which type(s) of indices to create for each table column. As introduced above, the modules 132 and 134 may use the type of operations used in conjunction with the respective table column to determine the type of index to create for the table column. For example, in the filter expression Filter(Table1, Table1[Column1]>5), the operator is >, the table column is Table1[Column1] and the operand is 5. The identified operation may allow the data management module 132 and/or the indexing module to exclude certain types of indices from being created. For example, if the only operation(s) in the corresponding formula or expression are "=" and/or "≠", the data management module 132 and/or the indexing module do not need to create a navigable index. However, if other operations are used in the formula or expression, such as "<", "≤", ">", and "≥", the data management module 132 and/or the indexing module may create a navigable index.

In some embodiments, the information regarding what table columns warrant indexing and what types of table column indices to create is stored by the data management module 132 and/or the indexing module 134 persistently. For example, the type(s) of index created for each table column may be stored in an indexing manifest into a workbook checkpoint stored in a workbook checkpoint archive.

Once the data management module 132 and/or the indexing module 134 identify the table columns to create indices for and what types of indices to create for each table column, the data management module 132 and/or the indexing module 134 may determine when to create the corresponding indices, which may account for implementation complexity based on time constraints to maintain a user's desire to use corresponding applications and functional efficiency and usefulness.

In some embodiments, the data management module 132 and/or the indexing module 134 may continue to index table columns on workbook loading based on data stored or recorded in the indexing manifest (for example, including workbook checkpoints and the like). For subsequent workbook transactions (for example, after the workbook is initially loaded into operating memory), the data management module 132 and/or the indexing module 134 may perform maintenance on all table column indices at the end of each transaction (for example, changes or mutations to the workbook that are performed atomically). Implementation complexity may be limited because the data management module 132 and/or the indexing module 134 can incorporate most changes at a single processing point. A FinalizeTransaction step may be a phase in the transaction processing mechanism that performs finalization steps like creating any necessary indexes based on the changes from the transaction that just concluded, and re-evaluate affected formulas. For example, say assuming A1:=1 and A2:=A1+1 and in one transaction, the user updates A1 to 2, the formula for A2 must be re-evaluated to ensure consistency. This re-evaluation of formulas may occur in this FinalizeTransaction step. In another example, a FILTER formula or an expression containing a FILTER formula exists in a transaction. When concluding that transaction, the reference counts may be updated because there may be new references to existing table columns and then if a table column was referenced for the first time, new indexes on that table column might need to be created. This is performed in this FinalizeTransaction step. However, because information from both formula parsing and formula evaluation apply to generating the table column indices, the data management module 132 and/or the indexing module 134 may update indices twice: once before evaluation, based on the data gathered from formula parsing, and then again after evaluation to correct for issues based on the results of the formula evaluation.

One potential downside of this "double" updating of indices is the potential to slow down transaction processing because of the time spent updating the indices twice because this may result in write restrictions based on the updating. In some embodiments, when creating indexes based on a user mutation, the latency of index creation process itself may be underestimated. If index creation on a particular column is taking a very long time, that can degrade the experience for the current operator (when the operator creates/edits formulas). Accordingly, a threshold time can be established and if index creation takes more than the threshold time, then the index creation can be aborted and the transaction can be completed without creating the index right then. Instead, we can queue up the index creation task and perform it asynchronously.

As described above, the data management module 132 and/or the indexing module 134 may employ the data driven approach of adaptive indexing in consideration of multiple metrics that measure an effect of the data driven approach as compared to a non-adaptive indexing approach.

For example, Index Creation Count and Deletion Count values may identify a number of index creation and deletion operations, respectively. The data management module 132 and/or the indexing module 134 may identify and track these count values as part of the transaction processing collaborator. Data-driven indexing, while adaptive, is deterministic and is driven by formulas and expressions in the workbook, as described herein. So, there is no change in logic over time. However, usage-driven indexing, described in more detail below, is a temporal component because the system learns over time (for example, determines, based on usage statistics) which columns are queried more heavily than others and which ones are rarely queried, or queried at a lesser rate than others. Thus, a usage-driven index-management system can achieve better results over time. Additionally, the data management module 132 and/or the indexing module 134 may utilize an index maintenance overhead metrics, as introduced by Equation 1 below. The data management module 132 and/or the indexing module 134 generates the Index Maintenance Overhead based on an index maintenance latency value, corresponding to an amount of time required to create/delete new indices, divided by an overall transaction processing time for transactions that necessitate creation or deletion of table column indices.

$$IndexMaintenanceOverhead \cdot Write = \frac{IndexMaintenanceLatency}{JournalTransactionProcessingLatency} \quad \text{Equation 1}$$

Ideally, the index maintenance overhead value is low, where the data management module 132 and/or the indexing module 134 may detect the necessity of index creation before a table becomes large enough to detrimentally impact user experience, and so forth.

Additionally, the data management module 132 and/or the indexing module 134 may utilize a table usage metadata aggregation time metric, which is measured according to Equation 2 below. Such a formula parsing overhead time may be determined based on an analysis time required to extract relative information divided by a time required to parse a corresponding formula.

$$FormulaParsingOverhead = \frac{TokenAnalysisTime}{FormulaParsingTime} \quad \text{Equation 2}$$

In some embodiments, the data management module 132 and/or the indexing module 134 may monitor a user selectable flag or trigger to implement or enable the data driving adaptive indexing approach described herein. For example, the user (for example, the owner and/or the end user) may toggle a flag when creating and/or initializing, loading, and/or reloading a workbook to turn off or turn on the data driven adaptive indexing approach. In some embodiments, the user may toggle the flag or other trigger to apply the data driven adaptive indexing to all new workbooks in a stage. In some embodiments, changes to the toggling/triggering of the data driven adaptive indexing take effect immediately or after restored/reloading of the workbook from a checkpoint. In some embodiments, the user may be able to apply the data driven adaptive indexing on an individual workbook basis or for all workbooks, where a flag indicating a particular selection for the individual workbook may take precedence over the flag indicating a selection for all workbooks. In some embodiments, no metadata (for example, the information that is being persisted at checkpoints, etc.) relevant to the data driven adaptive indexing approach exists for the workbook when the corresponding workbook data driven indexing flag (individual workbook or all workbooks) is toggled to enable the data driven indexing. When no indexing metadata exists and the data driven approach is enabled, the data management module 132 and/or the indexing module 134 may generate the corresponding index metadata during a first evaluation after activation of the data driven approach, which might impact an initial evaluation time. In some embodiments, the data management module 132 and/or the indexing module 134 may reference a file or list to identify those table columns for which indices are created. For example, the user may use the user interface 112 to upload/provide or identify a particular list of one or more table columns for which the data management module and/or the indexing module 134 create indices. In some embodiments, such a list can be stored with checkpoint and/or initialization information. In some embodiments, the data management module 132 and/or the indexing module 134 may detect a majority datatype of a table column to be indexed and determine the type of index to create based on the majority datatype. In some embodiments, the majority datatype of the table column may enable the data management module 132 and/or the indexing module 134 to create specialized indices for some table columns.

For example, in FILTER(Tasks, "Tasks[Description] LIKE %", "<search-text>") and FILTER(Tasks, "Tasks[Points]>200") queries, the two columns [Description] and [Points] may have different types of data. For example, consider scenario where most of the data in [Description] column is plain text while the data in the [Points] columns is mostly numerical. Because of the nature of spread sheets, the data types for the data being entered into the sheet/table are not validated. So, in both columns there may be exceptions. For example, [Description] column may indeed contain some numbers and some empty cells while [Points] table may contain some empty cells and some cells with text like "N/A" or "Unknown" etc. However, if a majority datatype is tracked, the indexes that may help the most can still be identified. In this specific case, since majority data type for [Description] column is text, the systems and methods can create a suffix-tree index or a hash index, and since majority data type for [Points] column is a number, the systems and methods can create a navigable index which is better for doing range queries (like>200).

Figure 5:
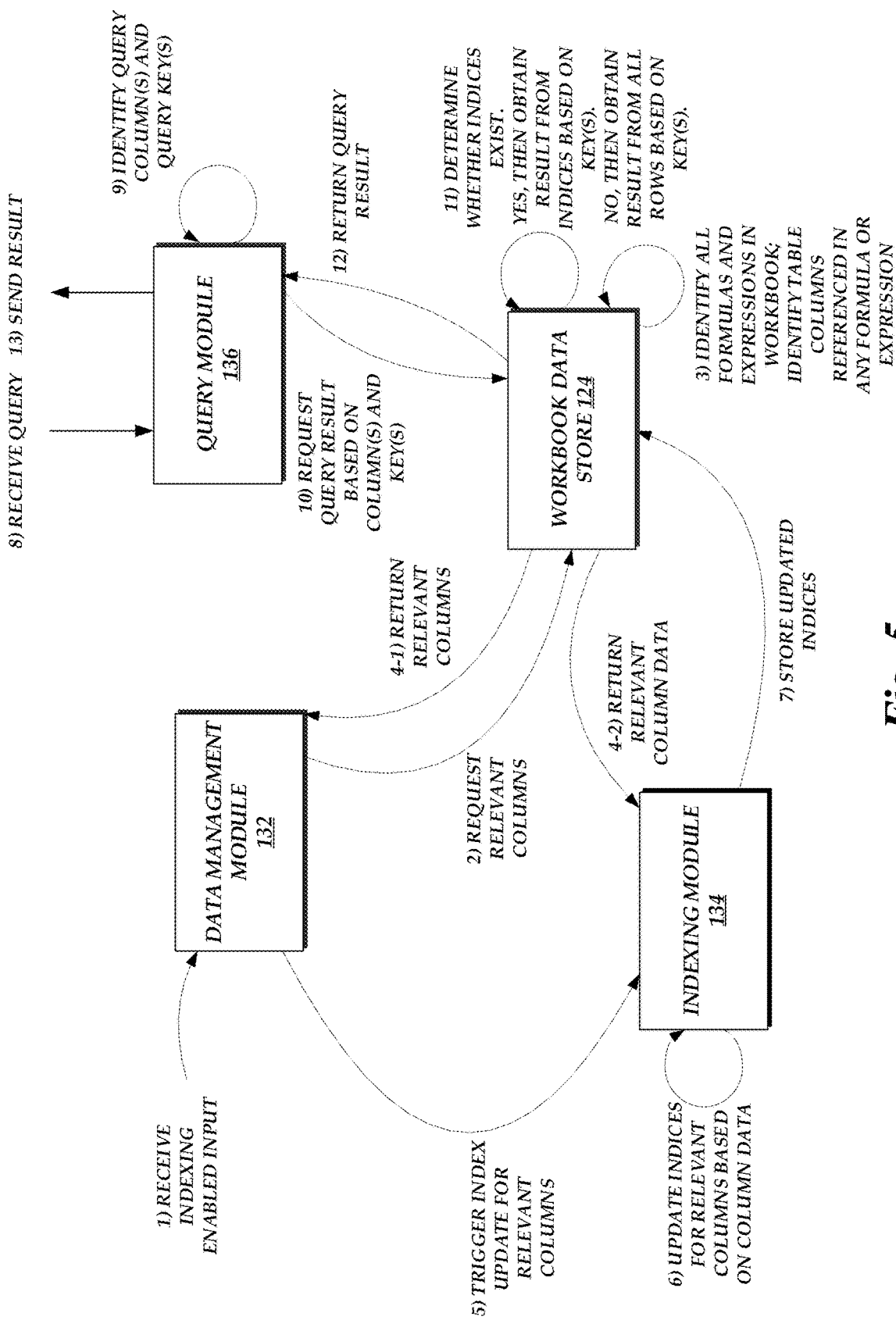
FIG. 5 is a flow diagram depicting illustrative interactions for automatically implementing a data driven, adaptive indexing scheme for a spreadsheet based workbook following receipt of a corresponding input, for example an input enabling indexing in the workbook or loading of a workbook into memory, and so forth.

With reference to FIG. 5, illustrative interactions will be described for automatically implementing a data driven, adaptive indexing scheme for a spreadsheet based workbook following receipt of a corresponding input, for example an input enabling indexing in the workbook or loading of a workbook into memory, and so forth. For purposes of FIG. 5, it can be assumed that the owner has previously established or created the workbook and corresponding spreadsheet structured data store framework such that the workbook associated with a corresponding application already exists and is accessible by the owner and users. Effectively, by the time the interactions shown in FIG. 5 occur, the owner or user is accessing the workbook query and update service 130 associated, for example with the application, using one of the client devices 102 via the network 104 to introduce data to the workbook data store 124. In some instances, at the time the interactions shown in FIG. 5 occur, the owner is initially populating the workbook data store 124 with data or adding or changing the data in the workbook data store 124. In some embodiments, one or more of the modules shown in FIG. 5 can be replaced with or substituted by any other module of the computing environment 110.

According to FIG. 5, at (1), the data management module 132 receives an input at (1), for example, from the owner or user, of the application associated with the workbook or receives the owners initial input of data for the workbook. In some embodiments, the input enabling indexing applies to more than one workbook or is specific to this workbook. In some embodiments, the input at (1) may indicate a kind or type of indexing to apply to the workbook, for example the general indexing introduced above with reference to FIGS. 3 and 4 or the data driven adaptive indexing discussed above or usage driven adaptive indexing introduced below.

Based on the received input (1), the data management module 132 may request relevant columns from the workbook data store 124. For example, if the received input (1) indicates that data driven adaptive indexing is enabled, then the data management module 132 may request, at (2), that the workbook data store 124 identify all relevant columns for which indices are to be generated. In some embodiments, the data management module 132 may be replaced by the indexing module 134, though not shown, and the indexing module 134 may generate the request (2) to the workbook data store 124.

At (3), the workbook data store 124 identifies all formulas and expressions in the workbook. For example, under the data driven adaptive indexing scheme, the workbook data store may scan or otherwise evaluate all cells in the workbook to identify any formulas or expressions that involve or relate to one of the columns in the workbook. Because the data driven adaptive indexing scheme involves creating indices in the workbook based on which columns are called by formulas and expressions within the workbook, all relevant cells (for example, all cells including formulas or expressions that call any column of the workbook) are identified, for example by the workbook data store 124 at (3). Once the workbook data store 124 identifies all cells that include such formulas or expressions, the workbook data store 124 then identifies all table columns of the workbook that are referenced by the cells' formula and/or expressions by parsing and/or evaluating the formulas in the identified cells. Thus, the workbook data store 124 may identify all (or a subset of) columns that are related to any formula or expression contained or referenced in any cell of the workbook. For example, the X most referenced columns or the columns identified above a threshold number of times may be identified. Because the number of columns that are referenced by or related to a formula or expression within the workbook is likely less than the number of all columns in the workbook, the data driven adaptive indexing scheme likely requires less overhead as compared to the general indexing scheme (when all or many columns are indexed) described above with relation to FIGS. 3 and 4 above.

At (4-1), the workbook data store 124 may return the relevant columns identified at (3) to the data management module 132. In some embodiments, the data management module 132 may operate as a central controller than organizes and/or coordinates functions of other modules in the computing environment 110. Accordingly, certain communications may be conveyed to the data management module 132 for pass through to another module. For example, when the workbook data store 124 conveys the relevant columns to the data management module 132, this communication may be used to have the data management module 132 trigger the indexing module 134 to generate indices for the identified relevant columns from (3). In some instances, instead of the data management module 132 triggering the indexing module 134 to generate indices for the identified columns, the workbook data store 124 may trigger the indexing module 134 to generate the indices for the identified columns by conveying relevant column data to the indexing module 134 (for example, at (4-2) without involving the data management module. Thus, interactions (4-1) and (4-2) may occur in the alternative or in the cumulative. When they occur in the alternative, interaction (5) between the data management module 132 and the indexing module 134 may become extraneous. When interaction (4-1) does occur, the indexing module 134 does need to receive the relevant column data from the workbook data store 124 for the columns identified in (3) in order to perform the updating and generating of indices at (6), so the interaction (4-2) may be needed when the data management module 132 triggers the indexing module 134. Thus, at (6), the indexing module 134 updates and/or generates indices for the relevant columns identified in (3) based on the column data provided for the relevant columns in (4-2). Once the indexing module 134 generates the indices at (6), the indexing module 134 stores the generated and/or updated indices in a data store, for example, the workbook data store 124, at (7). In some embodiments, the indexing module 134 generates an index for a column when the column previously did not have an index (for example, was not previously related to a formula or expression in the workbook). The indexing module 134 may update an index for a column when the column previously did have an index (for example, was previously related to a formula or expression in the workbook) but an update has been made to one of the column, a value in the column, a row in the column, or the formula or expression referencing the column.

At (8), the query module 136 receives a query, for example from the user, owner, or user interface 112, as introduced herein. At (9), the query module 136 parses the query or otherwise identifies in the query a column involved with or related to the query and a query key or operand. In some embodiments, the query may involve more than one column and/or more than one query key. The query key or operand may be a value or other information for which the query is being performed on one or more columns. At (10), the query module 136 may request that the workbook data store 124 generate a result to the query based on the identified column(s) and the query key(s).

Based on received request at (10) and the stored indices from (7), the workbook data store 124 may determine, at (11), whether an index exists in the workbook data store 124 for the column identified in the request (10). If the index does exist for the identified column, then the workbook data store 124 uses the index and the query key from the request at (10) to identify the relevant information from the index. If at (11) the workbook data store 124 determines that the query involves a column for which a corresponding index was created at (6) and stored in the workbook data store 124 at (7), the workbook data store 124 may manually identify the result from an analysis of all the rows of the identified column based on the query key. However, since such an analysis of all rows in the column will be slower than referencing a corresponding index for the column, such a query response will see an increased delay as compared to the result determined based only on the index for the column. After the workbook data store 124 obtains the result based on the index and/or column and key, the workbook data store 124 returns the query result to the query module at (12), which sends the result from (12) in response to the query from (1), for example to the requesting entity, etc.

The data driven adaptive indexing scheme may provide an efficient alternative to the general indexing scheme introduced above with a high likelihood of successful use of an index for most queries on the workbook. For example, since all (or a subset of) columns that are related to a formula or expression within the workbook are indexed in the data driven approach, there may be a fairly substantial memory and computational overhead associated with the data driven adaptive indexing scheme, as measured by one or more of the metrics described herein. For example, where there are many formulas or expressions or many columns referenced in the formulas or expressions of the workbook, the overhead may be higher than when fewer columns are referenced. However, as noted above, the data driven scheme likely involves less overhead as compared to the generate indexing approach introduced above. For example, though not shown with respect to FIG. 5, creation of the indices at (6) may involve creation of only a single type of index, for example one of the hash, tree, and/or prefix/suffix based indices, as opposed to all three, as introduced with respect to the general indexing scheme of FIGS. 3 and 4. This creation of only a single index for each column may result in less overhead, as measured by metrics herein, and simplify processing of queries because there are fewer indices to process for each column identified in the query. Thus, query resolution efficiencies may be increased with the data drive adaptive indexing scheme. However, because fewer indices are created for the workbook (i.e., only indices for those columns related to a formula or expression of the workbook), there is an increased chance that a query may require an index that does not exist, for query a column that does not have a corresponding formula or expression in the workbook itself. Thus, for a similar example involving a query for the color red in a table of crayons, the query will only benefit from data driven adaptive indexing if the workbook includes a formula or expression involving the color column for the crayon table.

Thus, FIG. 5 indicates how the data driven adaptive indexing scheme can be applied to a spreadsheet or similar unstructured data store. For example, as shown in FIG. 5, contrary to traditional databases where relevant indices are identified by programmers that create the databases, the systems and methods described herein can generate indices adaptively, based on an analysis of the formulas and expressions in the workbook for the spreadsheet or unstructured data store on demand or dynamically, allowing for changes as the data in the workbook changes. Such dynamic and adaptive creation of indices can greatly improve responsiveness to queries and similar processing demands and/or requests while improving (by reducing) overhead. However, because this data driven adaptive indexing scheme results in creation of indices based on formulas and expressions in the workbook, some queries may be on columns that are not indexed and certain metrics, for example those measuring how often certain indices are used or called, may have high values, as compared to the usage driven adaptive indexing option described below.

Usage Driven Adaptive Indexing

As introduced above, the usage driven approach for adaptive indexing involves identifying (for example, by the query module 136, the indexing module 134, and/or the data management module 132), in the workbook, what indices were used or called in previous queries and what indices are expected to be called in future queries based on various analyses, such as a historical analysis of received queries for the current workbook or for a collection or aggregate of workbooks. In some embodiments, the data management module 132 and/or the indexing module 134 may generate a list of table columns referenced in previously observed queries, predicted based on previously observed queries, or identified as commonly used (for example, the user or group tables introduced with respect to the data driven approach. The usage driven approach aims to achieve near-optimal resource utilization of indexing by adapting the set of indices created and maintained by the data management module 132 and/or the indexing module 134 based on observed query patterns in the workbook or similar workbooks.

The usage driven approach may assume that the Index Creation Overhead metric introduced herein has an acceptable value and that new transactions for index creation will not overload the journal with too many transactions. Unlike the data-driven indexing approach, the usage-driven indexing approach does not have a write transaction to rely on when creating indices. In data-driven indexing, indices can be created in a common write transaction with the changes of formulas from users. So, indices are created/updated contemporaneously with any changes. However, since the usage-driven indexing approach determines when to create an index, based on both read and write traffic patterns, the system cannot modify the workbook directly. Instead, the system may queue a request to create an index in a write queue and is applied to a workbook at some point. The time it takes to create these indices and the number of such administrative index-creation requests queued may be small enough that the time spent does not interrupt user flows. If index creation takes too long or if there are too many index creation requests being queued, then there is a chance that this process will adversely affect application performance instead of helping it because of the overheads involved in creating these indexes.

As introduced herein, the usage driven indexing may consider various metrics, including the idle index, which may identify indices that can be deleted due to low-usage (where usage is based on some concrete rules). The index hit may identify an executed query that contains a reference to a table column for which an index exists and can be utilized to optimize the query. Thus, the index hit represents a successful situation where the index helped improve query response times. The index miss metric identifies an instance when an executed query referenced a table column on which an index did not exist.

In some embodiments, the data management module 132 and/or the indexing module 134 may integrate adjusting of indices generated for the workbook based on data inside the workbook, (similar to the data driven indexing discussion above). For example, the usage driven indexing may be introduced or enabled after data driven indexing is used to create an initial set of indices for the workbook for initial observations. In some embodiments, for the usage driven approach, an initial set of indices may exist based on which the metrics above will be monitored to identify the actual indices observed from execution of queries to further optimize on the data driven approach. Furthermore, in some embodiments, the data management module 132 and/or the indexing module 134 may anticipate index misses and create a needed index (based on the anticipated miss) before a read from the corresponding query is executed. Furthermore, additional indexing strategies (for example, ML based learned indexing) may be integrated with the usage driven approaches.

To efficiently and effectively employ the usage driven adaptive indexing approach, the data management module 132 and/or the indexing module 134 may detect an index miss, decide whether to create new indices on index miss (or based on other usage statistics), determine when to create new indices, decide if an index is idle, and determine when to detect and delete idle indices.

In detecting the index miss, the data management module 132 and/or the indexing module 134 may employ different methods for detecting the misses. For example, index miss detection can involve an indexed table view or monitoring of column filter conditions to determine the type of index (for example, hash, navigable, and/or suffix) and index datatype (for example, string, comparable entity, and so forth) that will be used by the query. For each combination of table column, operator, and operand datatype that does not exist in the current index store, and is index-friendly, the data management module 132 and/or the indexing module 134 creates an index miss event for the corresponding index.

The indexing module 134 and/or the data management module 132 may decide by applying different options of analysis. In a first option, the indexing module 134 and/or the data management module 132 may create a new index based on identification of an index miss in the index miss above. The first option has various benefits, including simplicity of implementing via the indexing module 134 and/or the data management module 132. Furthermore, another benefit is that subsequent reads will be identified as an index hit because the index will have been created by the indexing module 134 and/or the data management module 132. Additionally, under the first option, the indexing module 134 and/or the data management module 132 may not need to track as many states or conditions of when to create the new index. For example, the state may comprise a number of times an index miss occurs on a specific column. In some embodiments, the state may comprise other metrics or tracked parameters regarding columns and/or indices, such as those discussed elsewhere herein. However, creating a new index based on identification of an index miss may result in a larger than otherwise latency impact on read/write operations in which the new index is created if the newly created index is for a table column that is not accessed frequently, depending on the index creation overhead metric introduced above. Furthermore, the idle index memory overhead metric may have a have higher than desired value if no subsequent reads are performed on the corresponding table column after creation of the table column. However, this option will likely improve memory usage, as a worst case scenario will not exceed memory usage of current indexing systems.

In a second option, the data management module 132 and/or the indexing module 134 may create an index for a particular table column if the modules identify n number of reads in the past t seconds and identify a table size for the table column is more than x rows. This second option, beneficially, may result in a lower idle index memory overhead metric if the table column for which the newly created index is not accessed frequently after creation of the index. Furthermore, the total latency impact from this manner of creating new indices is low if the table column is not accessed frequently, and a total latency impact is low if the table column has a small number of rows. Additionally, the indexing module 134 and/or the data management module 132 (and, accordingly, the users) can configure when to create new indices because the values of n, t, and x are configurable. However, the second options provides more states for the indexing module 134 and/or the data management module 132 to track and, for a table column that is accessed frequently, a total latency impact is multiplied by n, so the impact can be high when the value n is high. In instances where n,t,x=0), the option 2 may effectively encompass option 1.

The data management module 132 and/or the indexing module 134 may determine when to create new indices by a number of options, including (1) creating new indices by mutating both read and write workbooks and (2) updating thread safe metadata during read requests and creating the indices during write requests.

Under option (1), the data management module 132 and/or the indexing module 134 may create new indices on or during both read and write requests. For example, during read requests, the data management module 132 and/or the indexing module 134 may synchronize a corresponding value or object to allow for concurrent reads and writes. Furthermore, the data management module 132 and/or the indexing module 134 may ensure that the created index has consistent data with the workbook by performing index data management during workbook swaps. For example, two workbooks, one each of read and write, go through different states. Assuming a current version of the index present in the workbook is I, read requests may re-use indices in I1b, if available. To prevent deleting non-idle indices and to achieve consistency, the data management module 132 and/or the indexing module 134 may perform one or more checks, including: when performing the second write, do not delete the index which is present in I1b unless the corresponding column is deleted and when applying the index from metadata to I2, do not create an index for a deleted column.

Option (1) provides multiple benefits, including that any subsequent reads after the index is created will utilize the index and be optimized accordingly, so no further writes are required. However, option (1) introduces additional complexity to the operation of the computing environment 110 by mutating the read workbook and in management of locks for indices.

Under option (2), the data management module 132 and/or the indexing module 134 may first update a thread-safe metadata during read requests, where the thread-safe metadata contains information on which table column was accessed by a query and its access time (for example, when the table column was accessed) in a first phase. In some embodiments, this metadata may be stored external to the workbook but is available for in memory and maintains corresponding data for all workbooks operated by the computing environment 110 (for example, keyed by workbook identifier). Each workbook may obtain its own copy of this metadata and persist it during checkpointing of the workbook. In a second phase, during write requests, the data management module 132 and/or the indexing module 134 may read the metadata from the external storage and create the necessary indices according to the metadata. The data management module 132 and/or the indexing module 134 can further extend this approach by introducing a new transaction to create new indices. Then, the data management module 132 and/or the indexing module 134 can issue this new transaction during read requests if the data management module 132 and/or the indexing module 134 determines that an index needs to be created. Using this approach, the data management module 132 and/or the indexing module 134 reduces reliance on piggybacking on future write requests to create indices. The option (2) may be simpler for the data management module 132 and/or the indexing module 134 to implement without having to worry about locking and concurrency bugs. Furthermore, any indices created in the read workbook may be lost when the workbook is cleared from memory, for example during a host crash. For the first phase, all reads before a subsequent write request cannot use the new index. The impact is of the lack of indexing is magnified in very read-heavy, write-light workloads.

The data management module 132 and/or the indexing module 134 may decide if an index is idle based on various factors. For example, a first factor may comprise a latency cost of index miss (for example, the data management module 132 and/or the indexing module 134 may decide to keep an index longer if the latency cost is high). A second factor may comprise a memory cost of keeping the index, which may cause the data management module 132 and/or the indexing module 134 to decide a corresponding index is idle earlier if the memory cost corresponding to the index is high. A third factor comprises a time since the index was last read, based on which the data management module 132 and/or the indexing module 134 may decide the index is idle if the time since the last read exceeds a threshold value. A fourth factor may be a number of index reads in the last t seconds, where the data management module 132 and/or the indexing module 134 decides that the index is idle if there were less than a certain number of reads in the last t seconds for the corresponding table column.

Given these factors, the data management module 132 and/or the indexing module 134 may have various options and/or algorithms to optimize the decision, a subset of which is provided below. For example, for a first option, the data management module 132 and/or the indexing module 134 may determine that the index is idle if the index was not accessed in the last t seconds. This determination may be provide various benefits, including being simple to implement with the data management module 132 and/or the indexing module 134 and a total latency impact of this determination and the corresponding idle index determination is low for access patterns where there is at least one access of the index every t seconds. However, this option may result in a worst-case performance that has an index hit=0, where access pattern is one access in every t+1 seconds. However, this option may result in poor optimization for other access patterns and it does not consider an other factors (for example, making t shorter if the index memory cost is high) to reduce latency or memory cost.

In a second option, the data management module 132 and/or the indexing module 134 may determine that an index is idle if there were less than n accesses in the last t seconds and the index was created more than u seconds ago. This second option may produce a benefit of a latency impact on the same friendly access pattern as option 1 that is at most multiplied by n. Furthermore, the n and t values can be tuned to balance between memory and latency cost for the indices. However, this option 2 may generate up to n number of index misses before an corresponding index is created. Furthermore, a worst-case performance is still index hit=0, where a corresponding access pattern is n —1 accesses in every t seconds.

In some embodiments, these options can be further extended by dynamically tuning the t and n values based on the factors identified above. For example, t can be higher for a table column with a higher scan latency cost. Additionally, changing how the data management module 132 and/or the indexing module 134 decides if an index is idle will also impact a decision as to when to detect and delete idle indices.

The data management module 132 and/or the indexing module 134 may also determine when to detect and delete idle indices, as introduced above. When performing the idle index detection and deletion, the data management module 132 and/or the indexing module 134 may use metadata constructed by the usage-driven indexing. This metadata construction can occur during both read and write requests, as introduced above when the data management module 132 and/or the indexing module 134 determine when to create new indices. The data management module 132 and/or the indexing module 134 may have two options to detect and delete idle indices. In a first option, the data management module 132 and/or the indexing module 134 may detect and delete idle indices synchronously during write requests for the workbook. The data management module 132 and/or the indexing module 134 may apply this option for cases when index detection is inexpensive and the overhead for index deletion is low. The data management module 132 and/or the indexing module 134 implementing the usage driven indexing may piggy-back on the data driven indexing approach to perform index maintenance in the usage driven indexing. Furthermore, the data management module 132 and/or the indexing module 134 may identify the idle indices from metadata and drop or delete the idle indices. This option may benefit by not having to maintain separate thread pools. However, the data management module 132 and/or the indexing module 134 may not have an opportunity to delete idle indices for the workbook with no write activity.

In a second option, the data management module 132 and/or the indexing module 134 may create a separate thread pool that periodically detects idle indices for all workbooks and issues a write request to the relevant workbooks to delete the detected idle indices. The separate write request may be used because index deletion must be done on the write workbook to ensure consistent state. In some embodiments, acquiring a write lock will not work because the read workbook may have additional indices being created concurrently. The second option may provide various benefits, including being a suitable option for situations or workbooks where idle index detection is computationally expensive and because it is able to delete indices for workbooks having no write activities. However, the second option may depend on or utilize an existing separate thread pool to function appropriately.

In some embodiments, the usage driven indexing may suffer from index thrashing, which is a common problem across all adaptive indexing solutions. For usage driven indexing, index thrashing may comprise creating an index after the same index was deleted, where less than some threshold of time (e.g., t seconds) has passed from when the index was deleted and the same index was created, less than a number of reads (e.g., n reads) have occurred since the same index was deleted, and/or the index (deleted and then recreated) takes up less than x amount of memory. More generally, index thrashing may measure how well tuned the parameters for index creation and idle index detection are.

The data management module 132 and/or the indexing module 134 employing the usage driven indexing approach may monitor various metrics, including the usage driven index creation count, which is equal to the number of indices created following the usage driven approach. The data management module 132 and/or the indexing module 134 may also monitor an index miss detection time, comprising a time to detect idle indices, an index management overhead, defined as calculating the overhead in creating and deleting indices, and the index ratio, which represents a number of idle indices relative to a total number of indices.

In some embodiments, the data management module 132 and/or the indexing module 134 may monitor a user selectable flag or trigger to implement or enable the usage driving adaptive indexing approach described herein. For example, the user (for example, the owner and/or the end user) may toggle a flag when creating and/or initializing, loading, and/or reloading a workbook to turn off or turn on the usage driven adaptive indexing approach. In some embodiments, the user may toggle the flag or other trigger to apply the usage driven adaptive indexing to all new workbooks in a stage. In some embodiments, changes to the toggling/triggering of the usage driven adaptive indexing take effect immediately or after restored/reloading of the workbook from a checkpoint. In some embodiments, the user may be able to apply the usage driven adaptive indexing on an individual workbook basis or for all workbooks, where a flag indicating a particular selection for the individual workbook may take precedence over the flag indicating a selection for all workbooks. In some embodiments, no metadata (for example, information persisted at checkpoints regarding what to index when and with what types of indices) relevant to the usage driven adaptive indexing approach exists for the workbook when the corresponding workbook usage driven indexing flag (individual workbook or all workbooks) is toggled to enable the usage driven indexing. When no indexing metadata exists and the usage driven approach is enabled, the data management module 132 and/or the indexing module 134 may generate the corresponding index metadata during a first evaluation after activation of the data driven approach, which might impact an initial evaluation time. Afterwards we will create the indices and generate an optimized workbook. In some embodiments, the data management module 132 and/or the indexing module 134 may reference a file or list to identify those table columns for which indices are created. For example, the user may use the user interface 112 to upload/provide or identify a particular list of one or more table columns for which the data management module and/or the indexing module 134 create indices. In some embodiments, such a list can be stored with checkpoint and/or initialization information. In some embodiments, the data management module 132 and/or the indexing module 134 may detect a majority datatype of a table column to be indexed and determine the type of index to create based on the majority datatype. In some embodiments, the majority datatype of the table column may enable the data management module 132 and/or the indexing module 134 to create specialized indices for some table columns. For example, based on the majority data type present in table column, the system can predict what kind of queries will arrive on that column and create only those indexes. This can be considered part of data-driven indexing. Instead of relying on the formulas written by builders, the system relies on the data inside the table to predict what kind of queries will arrive.

When restoring from a workbook checkpoint, the data management module 132 and/or the indexing module 134 will utilize the index metadata present in an index manifest to rebuild the workbook's indices.

Figure 6:
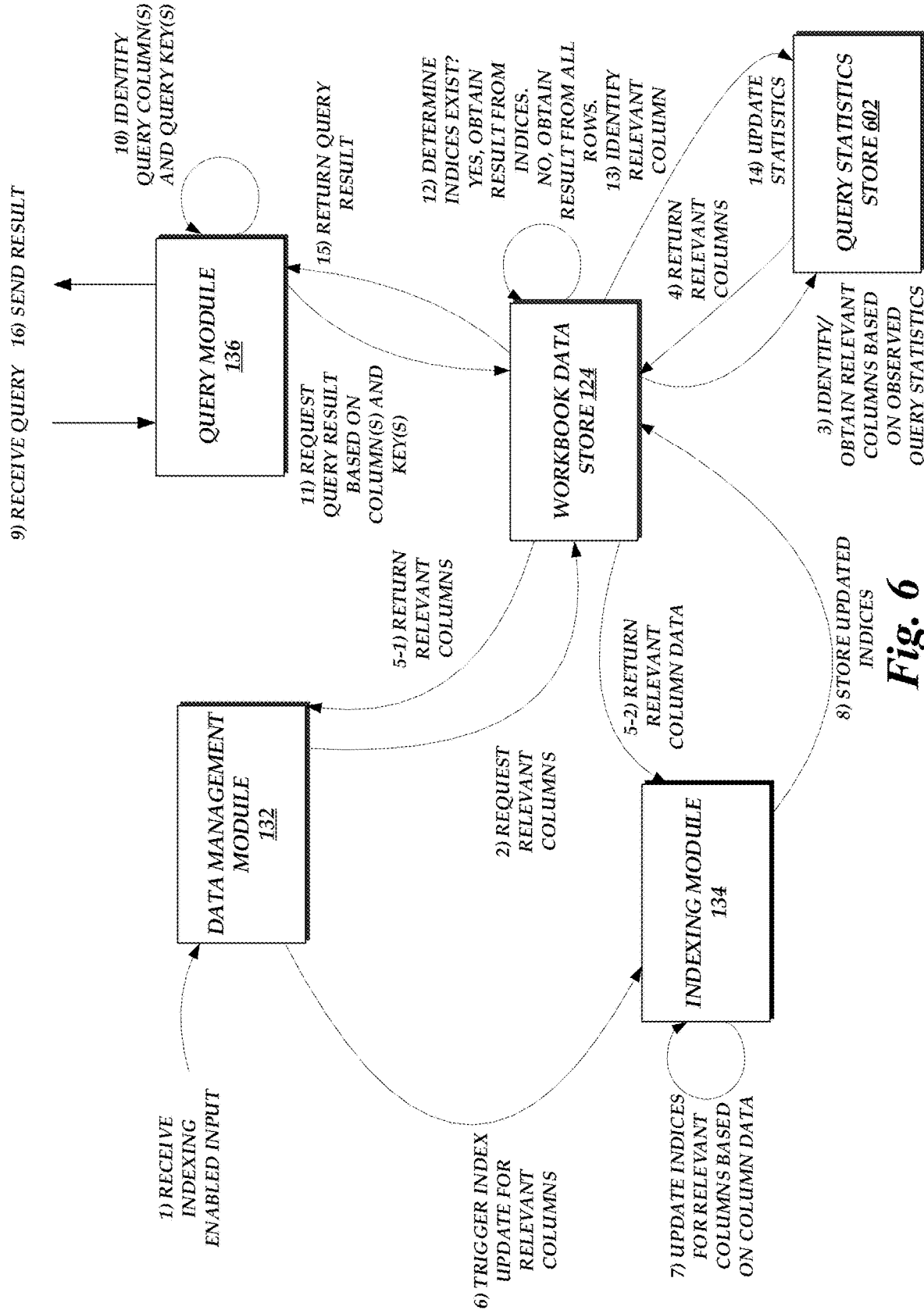
FIG. 6 is a flow diagram depicting interactions for automatically implementing the usage driven, adaptive indexing scheme for a spreadsheet based workbook following receipt of a corresponding input, for example an input enabling indexing in the workbook or loading of a workbook into memory, and so forth.

With reference to FIG. 6, illustrative interactions will be described for automatically implementing the usage driven, adaptive indexing scheme for a spreadsheet based workbook following receipt of a corresponding input, for example an input enabling indexing in the workbook or loading of a workbook into memory, and so forth. For purposes of FIG. 6, it can be assumed that the owner has previously established or created the workbook and corresponding spreadsheet structured data store framework such that the workbook associated with a corresponding application already exists and is accessible by the owner and users. Effectively, by the time the interactions shown in FIG. 6 occur, the owner or user is accessing the workbook query and update service 130, for example with the application, using one of the client devices 102 via the network 104 to introduce data to the workbook data store 124. In some instances, at the time the interactions shown in FIG. 6 occur, the owner is initially populating the workbook data store 124 with data or adding or changing the data in the workbook data store 124. In some embodiments, one or more of the modules shown in FIG. 6 can be replaced with or substituted by any other module of the computing environment 110.

According to FIG. 6, at (1), the data management module 132 receives an input at (1), for example, from the owner or user, of the application associated with the workbook or receives the owners initial input of data for the workbook. In some embodiments, the input enabling indexing applies to more than one workbook or is specific to this workbook. In some embodiments, the input at (1) may indicate a kind or type of indexing to apply to the workbook, for example the general indexing introduced above with reference to FIGS. 3 and 4, the data driven adaptive indexing discussed with reference to FIG. 5, or the usage driven adaptive indexing. With respect to FIG. 6, the interactions shown assume that previous queries were available to be observed and/or other usage parameters were collected and/or analyzed by the workbook query and update service 130.

Based on the received input (1), the data management module 132 may request relevant columns from the workbook data store 124. For example, if the received input (1) indicates that data driven adaptive indexing is enabled, then the data management module 132 may request, at (2), that the workbook data store 124 identify all relevant columns for which indices are to be generated under the usage based adaptive indexing scheme.

In some instances (not shown), the workbook data store 124 identifies the relevant columns. In some embodiments, the workbook data store 124 may identify the relevant columns based on observed queries, for example queries observed on the workbook for a period of item or queries observed on all workbooks over a period of time. In some embodiments, the workbook data store 124 may identify relevant columns based on a predicted column list, which identifies columns that are determined to be often referenced (for example, columns for workspace contacts and/or workspace groups introduced above). Thus, in some embodiments, the workbook data store 124 may identify relevant columns based on observed trends and make predictions regarding relevant columns based thereon. In some embodiments, the workbook data store 124 may determine relevant columns based on one or more metrics, for example determining that a current or previous query resulted in an index miss (where there query is on a column that is not indexed) and adding that column to a list or identification of relevant columns based on the metric value. In some embodiments, though not shown in FIG. 6, the workbook data store 124 or indexing module 134 may generate a new index on demand any time an index miss is detected. Alternatively, or additionally, the new index may be created on demand after a threshold number of reads occur on a column within a threshold amount of time. For example, under the usage driven adaptive indexing scheme, the workbook data store 124 may store a list of indices to create or may create indices on demand when threshold criteria are met. When the indices to create are stored in a list or identified in the workbook data store 124, the workbook data store 124 may identify the relevant columns. Because the number of columns that meet the metric and/or usage thresholds required before indices are created is likely less than the number of all columns in the workbook, the usage driven adaptive indexing scheme likely includes less overhead as compared to the general indexing scheme described above with relation to FIGS. 3 and 4 above. In some embodiments, the usage driven indexing can limit the number of indexes permitted or otherwise manipulate the usage parameters based on various factors, including available resources and the like. Furthermore, the number of columns that meet the metric and/or usage thresholds required before indices are created is likely less than the number of columns being referred to in the workbook, so the usage driven adaptive indexing scheme likely includes less overhead as compared to the data driven adaptive indexing scheme described above with relation to FIG. 5 above. As shown in FIG. 6, at (3) the workbook data store 124 requests, from an optional query statistics store 602 that stores, for example, the list of indices to create or columns identified in previous queries, the relevant columns for which indices should be created. The query statistics store 602 may return, at (4), the relevant columns for which indices are to be created. In some embodiments, the query statistics store 602 may store various information regarding the query statistics or parameters and may perform various modeling. In some instances, the data management module 132 may create a new index any time a column for which an index does not exist is identified in the received query. However, this may be a naïve approach that could result in creation of an index that is only used once before it is deleted. Thus, the query statistics store 602 may store various statistics or metrics for the columns and/or indices described herein.

At (5-1), the workbook data store 124 may return the relevant columns identified at (4) to the data management module 132. In some embodiments, the data management module 132 may operate as a central controller than organizes and/or coordinates functions of other modules in the computing environment 110. Accordingly, certain communications may be conveyed to the data management module 132 for pass through to another module. For example, when the workbook data store 124 conveys the relevant columns to the data management module 132, this communication may be used to have the data management module 132 trigger the indexing module 134 to generate indices for the identified relevant columns from (4). In some instances, instead of the data management module 132 triggering the indexing module 134 to generate indices for the identified columns, the workbook data store 124 may trigger the indexing module 134 to generate the indices for the identified columns by conveying relevant column data to the indexing module 134 (for example, at (5-2) without involving the data management module 132. Thus, interactions (5-1) and (5-2) may occur in the alternative or in the cumulative. When they occur in the alternative, interaction (6) between the data management module 132 and the indexing module 134 may become extraneous. When interaction (5-1) does occur, the indexing module 134 does need to receive the relevant column data from the workbook data store 124 for the columns identified in (4) in order to perform the updating and generating of indices at (7), so the interaction (5-2) may be needed when the data management module 132 triggers the indexing module 134. Thus, at (7), the indexing module 134 updates and/or generates indices for the relevant columns identified in (4) based on the column data provided for the relevant columns in (5-2). Once the indexing module 134 generates the indices at (7), the indexing module 134 stores the generated and/or updated indices in a data store, for example, the workbook data store 124, at (8). In some embodiments, the indexing module 134 generates an index for a column when the column previously did not have an index (for example, was not previously related to a formula or expression in the workbook). The indexing module 134 may update an index for a column when the column previously did have an index (for example, was previously determined to have usage that exceeded a threshold value or one or more index misses) but an update has been made to one of the column, a value in the column, a row in the column, or the formula or expression referencing the column.

At (9), the query module 136 receives a query, for example from the user, owner, or user interface 112, as described herein. At (10), the query module 136 parses the query or otherwise identifies in the query the column involved with or related to the query and the query key or operand. In some embodiments, the query may involve more than one column and/or more than one query key. The query key or operand may be the value or other information for which the query is being performed on one or more columns. At (11), the query module 136 may request that the workbook data store 124 generate a result to the query based on the identified column(s) and the query key(s).

Based on received request at (11) and the stored indices from (8), the workbook data store 124 may determine, at (12), whether an index exists in the workbook data store 124 for the column identified in the request (11). If the index does exist for the identified column, then the workbook data store 124 uses the index and the query key from the request at (11) to identify the relevant information from the index. If at (12) the workbook data store 124 determines that the query involves a column for which a corresponding index was created at (7) and stored in the workbook data store 124 at (8) (i.e., that the query results in an index miss), the workbook data store 124 may manually identify the result from an analysis of all the rows of the identified column based on the query key. However, since such an analysis of all rows in the column will be slower than referencing a corresponding index for the column, such a query response will see an increased delay as compared to the result determined based only on the index for the column. Furthermore, if the query results in the index miss, the workbook data store 124 may identify, at (13), the column identified in (11) as being a relevant column and trigger (for example, via (5-1) and/or (5-2)) index generation for the column identified in (11). In some embodiments, this index creation may occur concurrently with the query so that the index can be used to identify the result to query. In some embodiments, In some embodiments, the index creation following (13) may occur after the query result is identified manually. In some embodiments, the identifying at (13) may result in the column identified in (10) being added to an observed or predicted list, for example in the interaction (14), where the query statistics store 602 is updated with an identified query information or data. After the workbook data store 124 obtains the result based on the index and/or column and key at (12), the workbook data store 124 returns the query result to the query module at (15), which sends the result from (15) in response to the query from (8), for example to the requesting entity, etc. at (16). In some instances, (14) is optional or only occurs when an index miss occurs.

The usage driven adaptive indexing scheme may provide an efficient alternative to both the general indexing scheme and the data driven adaptive indexing scheme introduced above with a high likelihood of successful use of an index generated based on previous query and/or analysis or dynamically created based on query and/or usage demand on the workbook. For example, since only columns that are related to a previously observed formula or expression within a received query or otherwise predicted are indexed, there may be a less substantial memory and computational overhead associated with the usage driven adaptive indexing scheme as compared to the data driven scheme, as measured by one or more of the metrics described herein. Thus, as noted above, the usage driven scheme likely involves less overhead as compared to both the generate indexing approach and the data driven scheme introduced above. For example, though not shown with respect to FIG. 6, creation of the indices at (6) may involve creation of only a single type of index, for example one of the hash, tree, and/or prefix/suffix based indices, as opposed to all three, as introduced with respect to the general indexing scheme of FIGS. 3 and 4. This creation of only a single index for each column may result in less overhead, as measured by metrics herein, and simplify processing of queries because there are fewer indices to process for each column identified in the query. Thus, query resolution efficiencies may be increased with the usage drive adaptive indexing scheme. However, because fewer indices are created for the workbook (i.e., only indices for those columns related to a formula or expression of the workbook), there is an increased chance that a new or subsequent query may require an index that does not exist, for query a column that does not have a corresponding formula or expression in the workbook itself. Thus, for a similar example involving a query for the color red in a table of crayons, the query may only benefit from usage driven adaptive indexing if the workbook previously executed a formula or expression involving the color column for the crayon table.

Thus, FIG. 6 indicates how the usage driven adaptive indexing scheme can be applied to a spreadsheet or similar unstructured data store. For example, as shown in FIG. 6, contrary to traditional databases where relevant indices are identified by programmers that create the databases, the systems and methods described herein can generate indices adaptively, based on an analysis of query and/or column usage in the workbook for the spreadsheet or unstructured data store on demand or dynamically, allowing for changes as the data in and/or demands on the workbook changes. Such dynamic and adaptive creation of indices can greatly improve responsiveness to queries and similar processing demands and/or requests while improving (by reducing) overhead. However, because this usage driven adaptive indexing scheme results in creation of indices based on usage and observations in the workbook, some queries may be on columns that are not often indexed or certain columns may not be indexed when queried, and certain metrics, for example those measuring how often certain indices are used or called, may have high values. Though not shown in FIG. 6, one or more options may exist for removing indices that are not used often enough, for example, based on a threshold metric.

Figure 7:
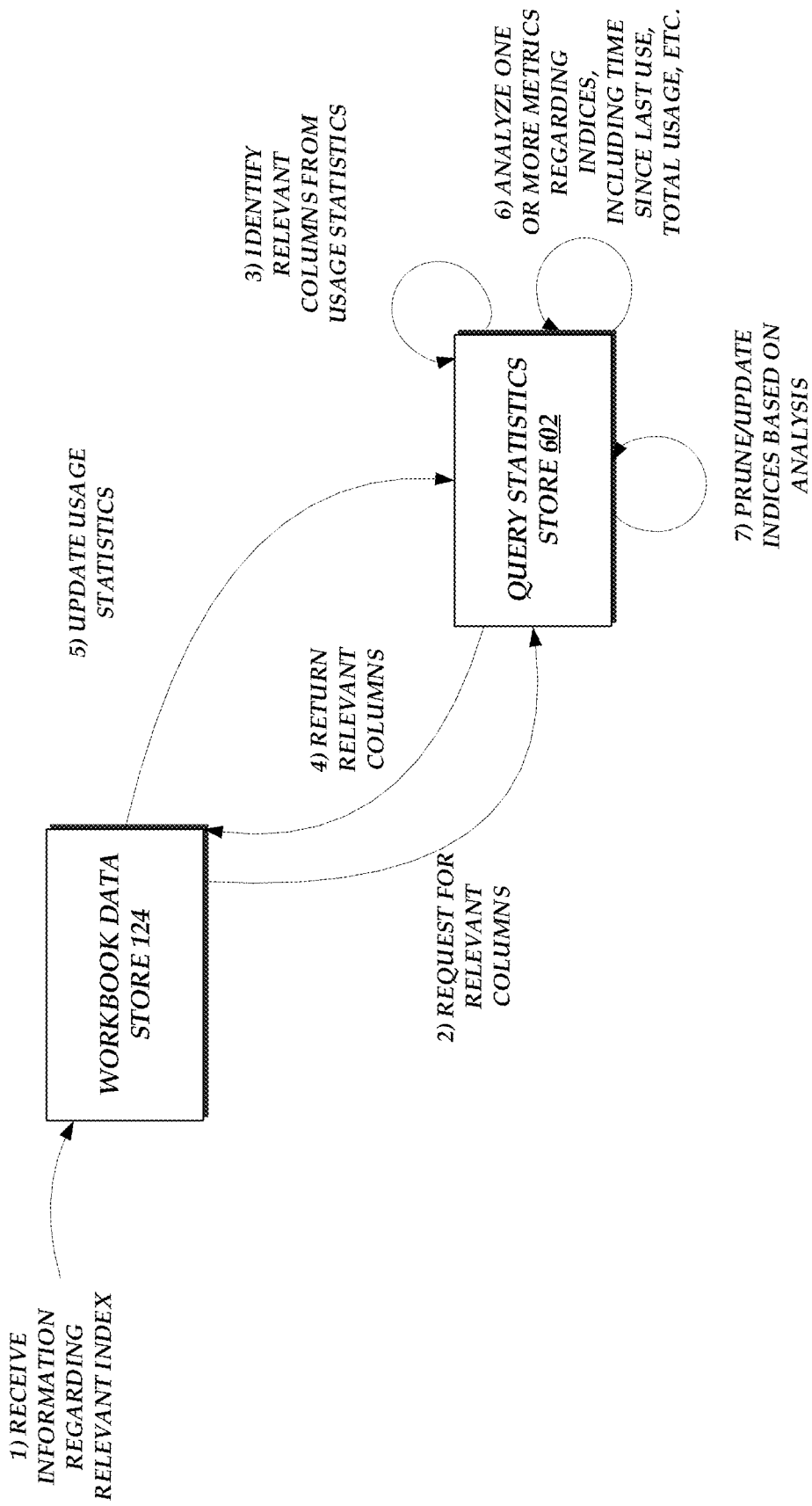
FIG. 7 is a flow diagram depicting interactions for managing usage parameters.

With reference to FIG. 7, illustrative interactions will be described for utilizing query statistics stored in a query statistics store 602. For purposes of FIG. 7, it can be assumed that the owner has previously established or created the workbook and corresponding spreadsheet structured data store framework such that the workbook associated with a corresponding application already exists and is accessible by the owner and users. For example, the usage driven adaptive indexing approach may begin with the data driven approach, general indexing approach, or no indexing implemented. For example, when the data driven or general indexing approach are implemented, then the usage driven approach may reduce a number of indices that exist. On the other hand, if the usage driven approach starts with no indexing, then the usage driven approach may generate new indexes. Effectively, by the time the interactions shown in FIG. 7 occur, the owner or user is accessing the workbook query and update service 130, for example with the application, using one of the client devices 102 via the network 104 to introduce data to the workbook data store 124 and/or present queries to the workbook. In some embodiments, one or more of the modules shown in FIG. 7 can be replaced with or substituted by any other module of the computing environment 110.

According to FIG. 7, at (1), the workbook data store 124 receives an input of information regarding relevant columns. This input may comprise a request or a query on the workbook. In some embodiments, the data management module 132 receives an input at (1), for example, from the owner or user, of the application associated with the workbook. The input may be any input or signal received relating to the queries or indexing is enabled in the workbook. At (2), the workbook data store 124 request relevant columns from the query Q4FCstatistics store 602. The request for relevant columns at (2) may comprise any request for columns or information for processing. After receiving the request at (2), the query statistics store 602 may identify, at (3), relevant columns based on the usage statistics. For example, if the indexing is being enabled, the query statistics store 602 may identify which columns need to be indexed based on query statistics, which may include identification of which columns were queried. Based on such information, the query statistics store 602 may return relevant columns (for example, columns to be indexed) at (4). At (5), the workbook data store 124 may provide an update of usage statistics to the query statistics store 602. For example, at (5), the update may comprise an indication of what columns were referenced in a received query or were otherwise utilized. Based on such updates, the query statistics store 602 may analyze one or more metrics regarding the columns and indices. For example, the query statistics store 602 may maintain, at (6), metrics, such as overhead, last usage, number of uses, and so forth, for each column and/or index in the workbook. Based on the analysis of usage, the query statistics store 602 may, at (7), prune or update indices based on the analysis. In some instances, the query statistics store 602 may perform the pruning and/or updates itself or communicate such a need to the workbook data store 124 or other components.

Optimizing Linked Columns

In some embodiments, the workbook query and update service 130 may execute queries, formulas, or expressions on data that does not explicitly exist in the workbook as its own cell stored in the workbook data store 124. Certain formulas existing within and applying to columns in the spreadsheet or similar workbook may include operators that are dereferenced, for example filter functions that are key dereferenced. For example, in a filter having the form Filter (Tasks, "Tasks[Assignee][Location]=Vancouver"), the filter key in a first table is Task[Assignee] and it is dereferenced on a [Location] column in at least one second table. The workbook query and update service 130 may use such a filter to perform data retrieval from multiple tables. Therefore, such a filter may operate as a multiple-table join, but based on indexing techniques described herein. Traditional multi-table join operations combine columns from one or more tables, for example, in a relational database or data structure. Joins may be used when retrieving data from multiple tables in databases connected using foreign key constraints. However, such multi-table joins do not exist as such in spreadsheets and similarly unstructured data stores and workbooks.

For example, the traditional database comprises a first table, the "Orders" table, that includes the following columns:
 OrderID
 CustomerID
 OrderDate The traditional database also comprises a second table, the "Customers" table having the following columns:
 CustomerID
 CustomerName
 ContactName
 Country In traditional multi-table joins, in order to retrieve all orders for a given customer called "John Doe", a query on the workbook may recite:
 SELECT Orders.OrderID, Orders.OrderDate
 FROM Customers,
 INNER JOIN Orders ON Orders.CustomerID=Customers.CustomerID
 WHERE Customers.CustomerName="John Doe";

In the traditional databases, efficient support for this kind of query relies on an index for the "CustomerID" column in both the Orders and Customers tables and a foreign key constraint connecting the two columns.

However, in the unstructured workbook embodiments described herein, the unstructured workbooks and the corresponding workbook systems may be unable to understand some syntax and commands, and the users (for example, the owners and end users of the workbooks) generally lack the technical expertise to write such queries for tables in the unstructured workbook. Instead, the workbook query and update service 130 may support a formula or expression (for example, a filter formula as introduced above) that can represent the table join example identified above. For example, a key dereferenced filter syntax that corresponds to the traditional multi-table join described above is:
 FILTER(Orders, "Orders[Customer][Customer Name]=%", "John Doe")

In such a dereferenced filter syntax, the Orders[Customer] column may be formatted as a customized datatype that links to the Customers table. Thus, the Orders[Customer] portion of the filter formula is the filter key in the Orders table that is dereferenced on a [CustomerName] column in the Customers table. By using such an embedded link methodology, the workbook query and update service 130 may effectively link the Orders table to the Customers table in a "joined" manner. This structured link enables the workbook query and update service 130 to express multi-table joins via, for example, row links (for example, links in rows of the Orders table that point to a column in the Customers table) that provide a dereferencing mechanism unique to the spreadsheet workbook (and the corresponding spreadsheet engine). Such syntax and functionality is not available in existing spreadsheet workbooks and corresponding engines and systems.

Evaluation of such embedded or connected filters may be computationally expensive, especially if the evaluation of the filter results in a sequential scan of all rows in the corresponding table(s). Furthermore, indexing mechanisms as described herein may not reduce computational costs because the example embedded or connected links access the CustomerName column on the Customers table while filtering the Customer column of the Orders table. No index exists for such a situation.

The workbook query and update service 130 may efficiently evaluate such queries involving dereferenced values or embedded or connected links and produce reliable results within a reasonable time frame (for example, a few hundreds of milliseconds at most), even when the tables involved with or referenced within the embedded or connected links have thousands or millions of rows. For example, the data management module 132 and/or the filtering module 138 may maintain the linking between the connected tables without requiring the linked or connected table to materialize or include foreign key columns corresponding thereto.

More specifically, the workbook query and update service 130 may parse the filter expression Filter(Orders, "Orders [Customer][CustomerName]=%", "John Doe") and determine, as introduced above, that the filter expression is joining the Orders and Customers tables. The workbook query and update service 130 may dynamically create a virtual attribute/column having the formula of the linked table value "=[Customer][CustomerName]" in the Orders table. The workbook query and update service 130 may further create an index for this virtual column after evaluating the formula "=[Customer][CustomerName]" for or based on each row of the Orders table. Thus, the data workbook query and update service 130 may create the index for the virtual attribute/column "in" the Orders table based on the embedded or connected link or table and not for the Customers table.

When the corresponding formula is evaluated as a query, the workbook query and update service 130 may effectively rewrite the query to employ the virtual attribute, for example as Filter(Orders, "Order[_Generated_Customer_Name_ Attr]=%", "John Doe"), where "_Generated_Customer_ name_Attr" is a generated virtual attribute and not a real physical column in the workbook. As data in the Orders or Customers tables change, the workbook query and update service 130 may ensure that the index on the virtual attributes "table column" is maintained or kept up-to-date. Such maintenance can be attained using a graph-based recalculation mechanism.

For similar functions or formulas that can implement such dereferenced syntax, the workbook query and update service 130 may use indices to optimize corresponding query times. For example, the workbook query and update service 130 can use virtual columns or attributes and virtual column indices, as introduced above, to improve query response times for such dereferenced and complex formulas. Furthermore, one or more recalculation mechanisms, such as graph recalculation, can be used to maintain the virtual indices on data change and mutation. In some instances, the workbook query and update service 130 may create a materialized index, for example a virtual column index (VCI) representing the index for a virtual column (VC) with respect to a dereferenced formula, for example, based on adaptive indexing functionality and processes.

Improving query responsiveness of such dereferenced formulas may begin with identification of such formula and corresponding syntax. For example, the workbook query and update service 130 may identify and/or detect the existence of a formula having such a dereferenced syntax as introduced above. For example, when the user enters the dereferenced formula syntax of Filter(Tasks, "Tasks[Assignee][Location]=US") into a cell or a received query includes such a formula syntax, the workbook query and update service 130 may detect the syntax and identify or recognize that the dereferenced syntax, for example the filter key "Tasks[Assignee] [Location]", requires additional processing. The workbook query and update service 130 may apply this additional processing by leveraging existing infrastructure for adaptive indexing. For example, the workbook query and update service 130 may perform adaptive indexing based on an analysis of corresponding queries, and on the detection of a corresponding column, for example a filtering column, the workbook query and update service 130 may create a corresponding index for the column. The workbook query and update service 130 may apply similar logic to dereferenced formulas.

For example, once the workbook query and update service 130 identifies a dereferenced clause in a dereferenced formula syntax, the workbook query and update service 130 may apply similar logic used to create indices for columns, as introduced above, to create VCIs on or for dereferenced clauses. In some instances, the VCI indexes information in the corresponding VC by effectively evaluating the corresponding dereferenced clause for the dereferenced formula. For example, for each row in the VCI, using the Filter(Tasks, "Tasks[Assignee][Location]=US") example introduced above, the workbook query and update service 130 may evaluate=[Assignee][Location] to get a terminal value to index for each row of the Assignee column in the Tasks table. Such processing by the workbook query and update service 130 may be similar to column indexing logic, where the workbook query and update service 130 analyzes values of each cell in a table column to gather values to index. Once the workbook query and update service 130 creates the VCI, whenever the workbook query and update service 130 evaluates the dereferenced formula with the similar syntax, the workbook query and update service 130 can query this VCI, thereby reaping indexing performance benefits for dereferenced formulas.

In order to optimize utilize recalculation mechanisms to maintain the VCI, the workbook query and update service 130 may extract dependencies while processing the adaptive indexing lifecycle. For example, the workbook query and update service 130 may generate dependency information for the VC and/or VCI and generate corresponding dependencies and/or dependency information.

More specifically, for queries and formulas that may utilize VCs and/or VCIs to improve query performance, the workbook query and update service 130 may recognize corresponding dereferenced clauses in dereferenced formula syntax to identify the dereferenced formula so that the workbook query and update service 130 can perform VCI creation/deletion appropriately. For example, when the dereferenced formula is a filter formula query, the workbook query and update service 130 may check or parse the query to identify or detect dereferences. If the workbook query and update service 130 determines that the formula does include a dereferenced clause, then the workbook query and update service 130 may determine if a VC and/or VCI needs to be created for the dereferenced clause, and do so as appropriate. The workbook query and update service 130 may then apply the query to the newly created VCI. Thus, the workbook query and update service 130 may determine that the received formula is a dereferenced formula and that there is a corresponding VCI, and execute the dereferenced clause on the VCI instead of performing a scan of the corresponding table(s) or columns. The workbook query and update service 130 may also extract dependencies for use in maintaining the VCI.

Figures 8A, 8B:
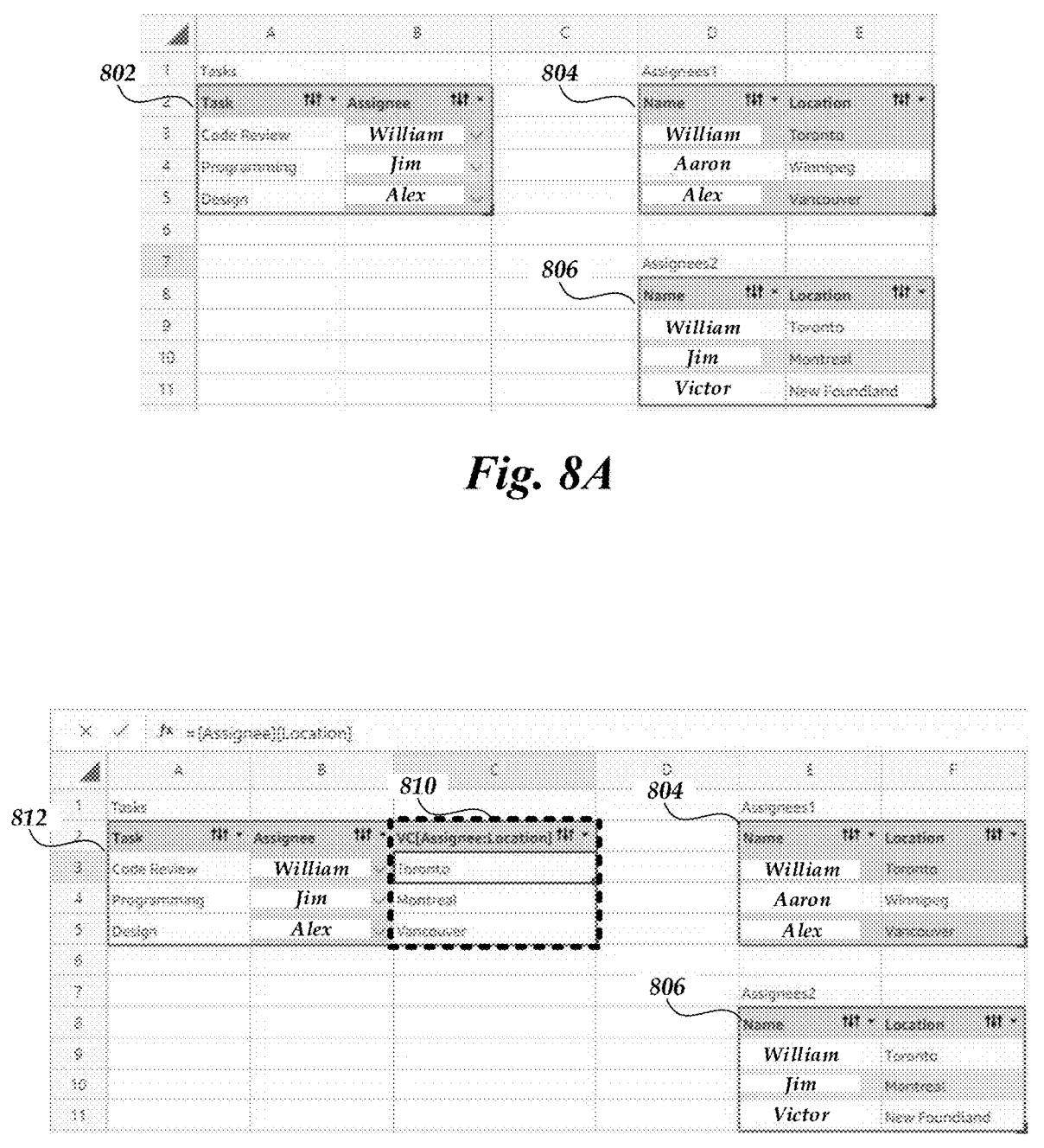

For example, FIGS. 8A and 8B show representations of tables in the spreadsheet data store of the workbook in FIG. 1. The FIG. 8A representation includes three tables, a Tasks table 802, an Assignees1 table 804, and an Assignees2 table 806. The FIG. 8B representation also includes three tables, an updated Tasks table 812, the Assignees1 table 804, and the Assignees2 table 806. The systems and methods, for example via the workbook query and update service 130, receive a query including the formula, the formula comprising: Filter(Tasks, "Tasks[Assignee][Location]=Vancouver"). The workbook query and update service 130 may parse and recognize this formula as a dereferenced formula and create a VCI 810 on the Tasks table 802 (the VCI shown in the Tasks table 812 of FIG. 8B) with an identifier Tasks[Assignee→Location]. FIG. 8B shows the Tasks table 812, Assignees1 table 804, and Assignees2 table 806, including the values and/or references included in the VCI 810. The column VCI 810 is shown in bold outline/highlighting to represent that it is inaccessible to the user of the workbook environment 110.

The results of the processing of the VCI 810 as shown in Tasks[Assignee:Location] of the Tasks table 812 are:
Toronto→(the result of following William RowLink to Assignee1's Location)
Montreal→(the result of following Jim RowLink to Assignee2's Location)
Vancouver→(the result of following Alex RowLink to Assignee1's Location)

Illustratively, when the query formula of Filter(Tasks, "Tasks[Assignee][Location]=Vancouver"). is evaluated by the workbook query and update service 130, a query translation may identify the Tasks[Assignee→Location] in the clause and execute the query against the newly created VCI (representatively shown in the Tasks table above), thereby providing indexing benefits to query responses. Once the VCI has been created, the recalculation mechanisms can be used to maintain the VCIs. Accordingly, the entirety of Filter(Tasks, "Tasks[Assignee][Location]=Vancouver") is the filter formula or expression. The portion "Tasks[Assignee][Location]" may represent the portion of the formula that is being searched for in the first table, the "Tasks" table. In other words, the "Tasks[Assignee][Location]" is the information or attribute of the "Tasks" table that is being searched on. This identification of the portion being searched on may be representative or indicative of the hops or jumps to the new table from the table initially being searched. "Vancouver" is the search key, or the term that is being searched for as part of the Filter formula.

Figure 9A:
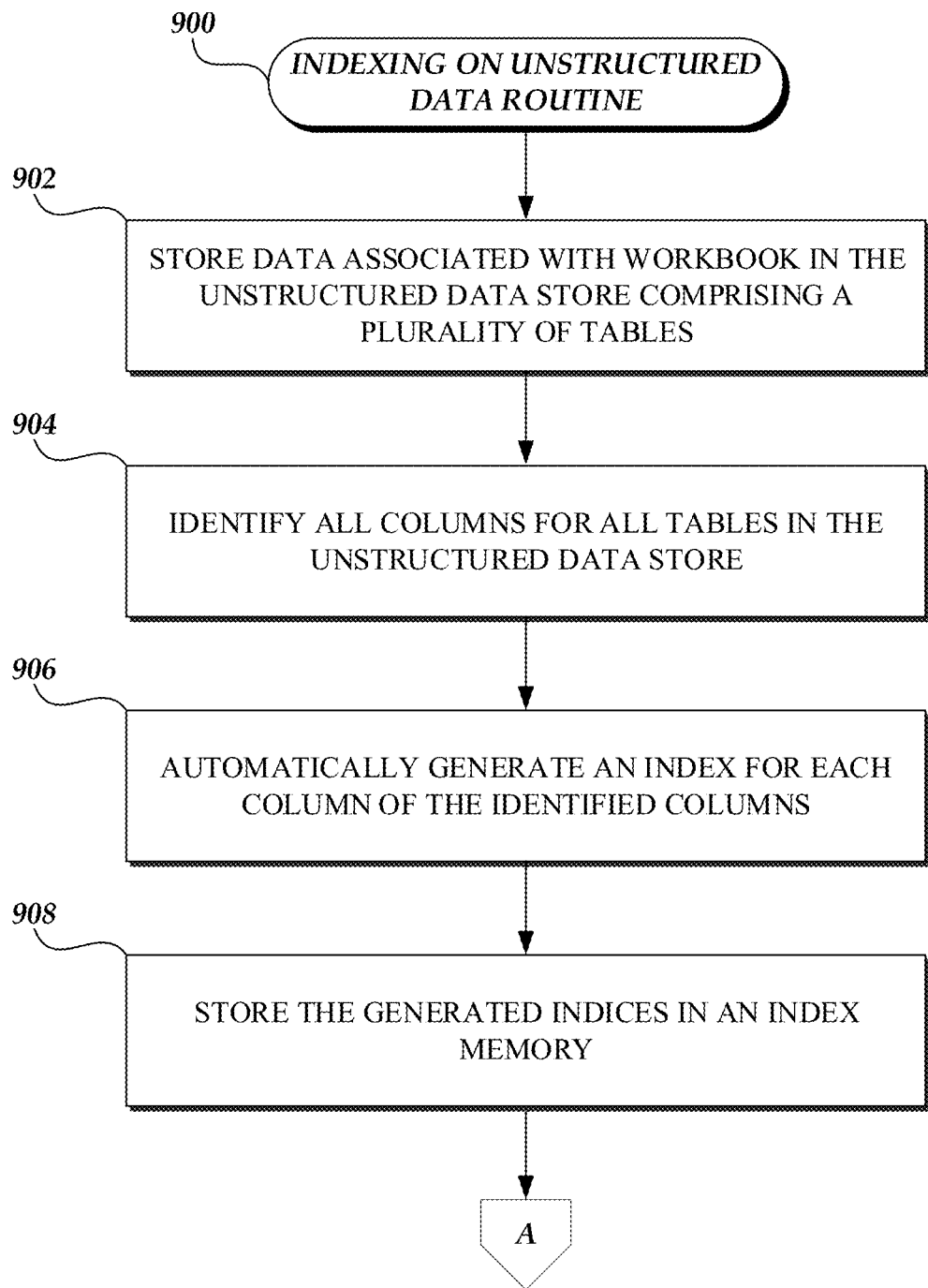
FIGS. 9A and 9B show a flow chart depicting an illustrative routine for generating and implementing an indexing strategy on an unstructured data store in a workbook with the application system of FIG. 1.
Figure 9B:
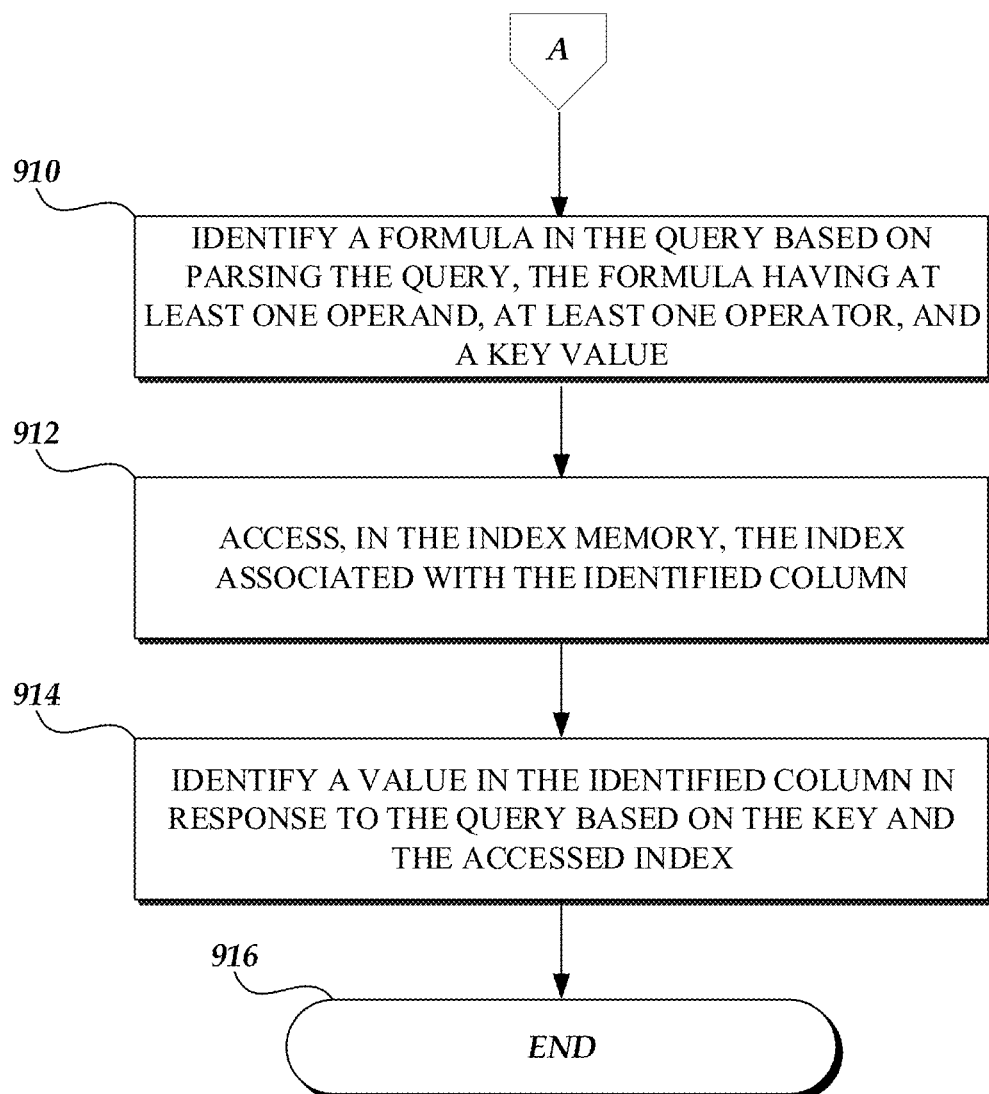
Figure 9C:
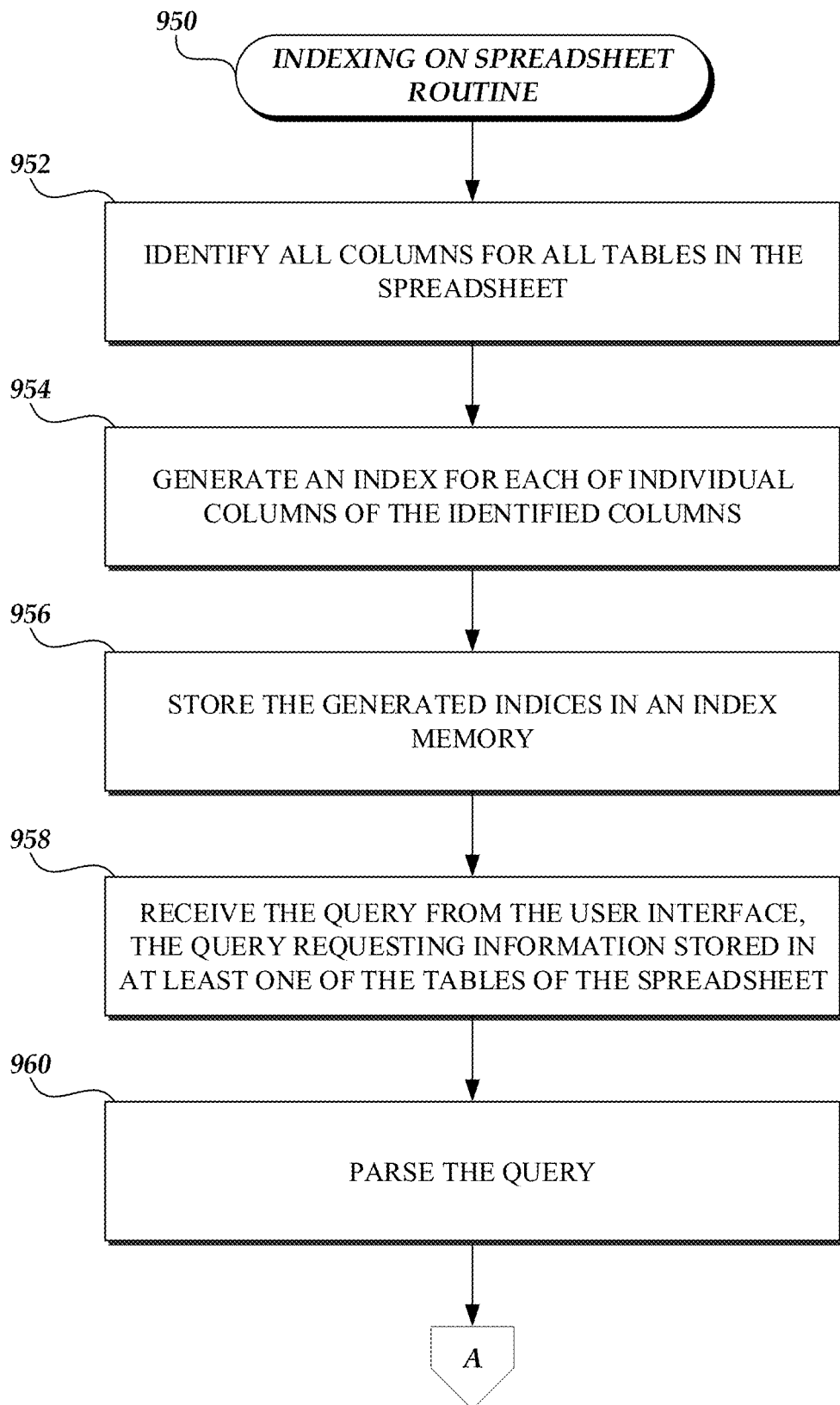
FIGS. 9C and 9D show a flow chart depicting an illustrative routine for generating and implementing an indexing strategy on a spreadsheet data store in a workbook with the application system of FIG. 1.
Figure 9D:
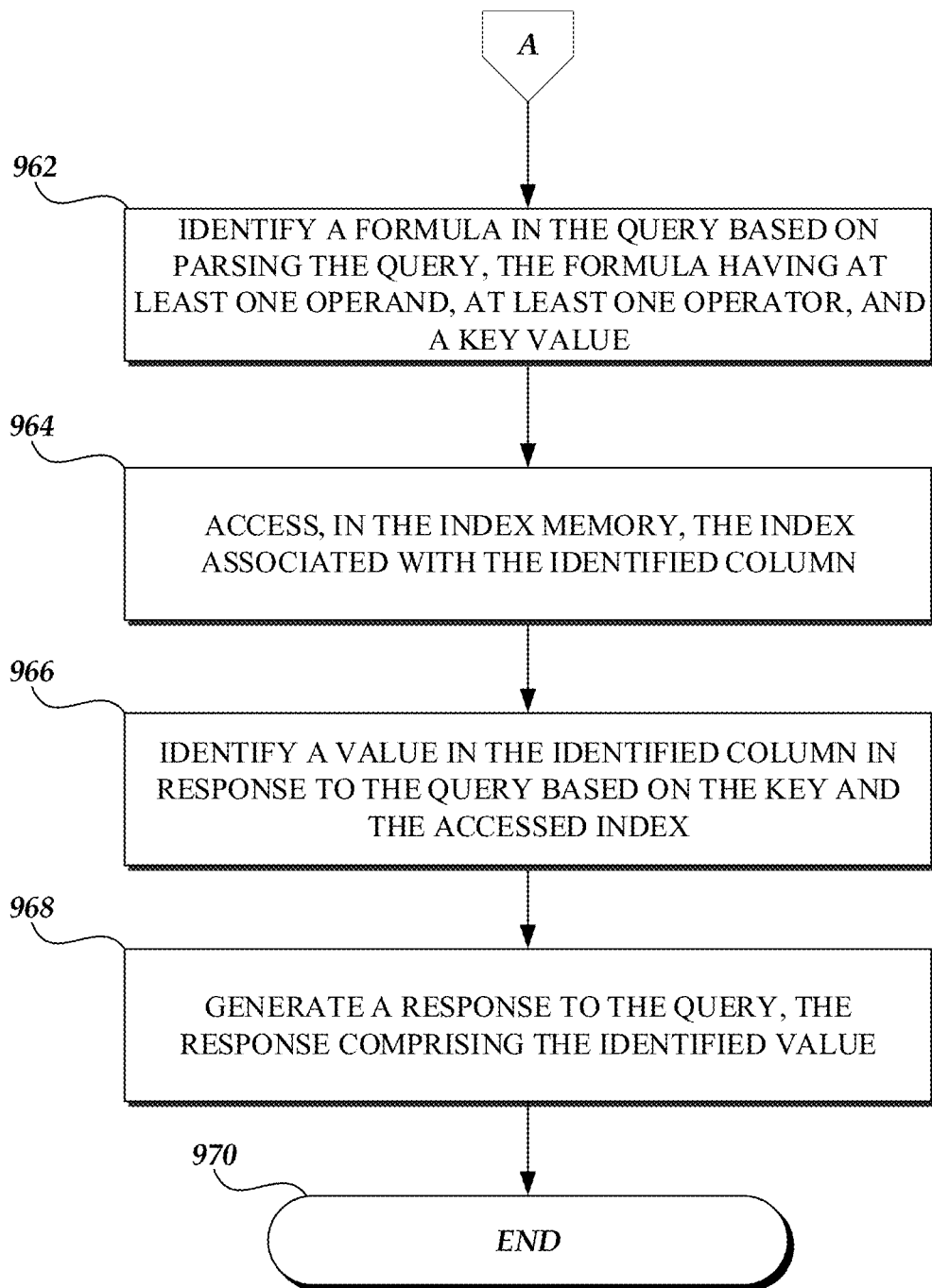

A flowchart providing an example of a method for creating or implementing indexing in a spreadsheet or unstructured workbook, as described with respect to FIGS. 3 and 4 above, is provided in FIGS. 9A-9B and FIGS. 9C-9D, respectively. FIGS. 9A-9B provide the method for implementing indexing in an unstructured workbook for queries received or embedded within the unstructured workbook. FIGS. 9C-9D provide the method for implementing the indexing in a spreadsheet workbook and responding to an query received via the user interface 112. FIGS. 9A and 9B show a flow chart depicting an illustrative routine for generating and implementing an indexing strategy on an unstructured data store in a workbook with the application system of FIG. 1. The routine 900 may be carried out, for example, by the computing environment 110. In some instances, the steps or blocks of the routine 900 may occur in the sequential order presented below and in FIGS. 9A-9B or in a non-sequential order.

The routine 900 begins at block 902, where the computing environment 110 (e.g., the workbook system 120, the workbook data store 124, the data management module 132, and/or the indexing module 134) store data associated with a workbook in an unstructured data store, the unstructured data store comprising a plurality of tables. Illustratively, the block 902 may correspond to interaction (1) of FIG. 3. The stored data may comprise new data being added to the workbook or updates to existing data in the workbook. This data may result in a change to the structure of the workbook, to a value of a cell in the workbook, or to a formula for one of the cells in the workbook. In some embodiments, the data may only change a subset of the data or cells in the workbook. Accordingly, at block 902, the data management module 132 (or similar component in the computing environment 110) may analyze the data to determine which one or more cells of the workbook are updated based on the input data. This may involve identifying what data is being added to or deleted from the workbook and further determining (for example, from evaluating dependency information and/or lists for related data and/or cells) how those changes impact other cells. Based on the identified cells, the routine 900 proceeds to block 904.

Thereafter, at block 904, the computing environment 110 (e.g., the data management module 132, the user interface 112, and/or other components of the computing environment 110) identifies all (or a subset of) columns for all (or a subset of) tables in the unstructured data store. In some embodiments, at its most basic and broadest level of application, the computing environment 110 identifies all columns for all tables so that indices for the indexing feature can be created for all columns, as described herein. In some embodiments, the computing environment 110 identifies a subset of the columns for a subset of the tables. Illustratively, the block 904 may correspond to interaction (2) of FIG. 3.

Thereafter, at block 906, the computing environment 110 (e.g., the workbook system 120) automatically generates an index for each column (or individual columns) of the identified columns. In some embodiments, generating the index for each column comprises requesting and/or obtaining data for the respective column from the workbook data store 124. In some instances, one or more generated indices has a hybrid datatype and comprises at least one custom relational comparison operator equation. For example, a generated index may index information for a column that includes cells having string values, integer values, real number values, and the like, and the hybrid datatype may include relational statements that equate the different datatypes forming the hybrid datatype. For example, when the hybrid datatype comprises integer and string values, the hybrid datatype may include statements, scripts, and the like to enable like integer and string values (for example, integer value "1" with string value "1") to be equated. Illustratively, the block 906 may correspond to interactions (6) and (7) of FIG. 3.

Thereafter, at block 908, the generated indices are stored in an index memory (for example, the workbook data store 124), for example by the computing environment 110 (e.g., the workbook update and query service 130). Illustratively, the block 908 may correspond to interaction (8) of FIG. 3.

At block 910, the computing environment 110 identifies a formula or expression in the query, for example based on parsing the query. The identified formula or expression may comprise at least one operand, operator, and/or a key value. The at least one operand may identify a relevant column in the table or workbook, for example the column in which the key value is to be identified, and the key value may be the item to be searched for with the query. Thus, parsing the query corresponds to identifying the columns relevant to the query. Illustratively, the block 910 may correspond to interaction (2) of FIG. 4.

At block 912, the computing environment 110 access relevant indices in the corresponding data store (for example, the workbook data store 124) for the identified columns in the query. In some embodiments, identifying the relevant indices for the identified columns may be done by a different component of the computing environment 110 than the identifying of columns relevant to the query. Illustratively, the block 912 may correspond to one or more of interactions (3)-(7) of FIG. 4.

At block 914, the computing environment 110 identifies a value in the identified column in response to the query based on the key and the accessed index from block 916. Identifying the value may comprise searching the accessed index for the key value. Illustratively, the block 914 may correspond to interaction (8) of FIG. 4. The routine 900 ends at block 916.

FIGS. 9C and 9D show a flow chart depicting an illustrative routine 950 for generating and implementing an indexing strategy on a spreadsheet data store in a workbook with the application system of FIG. 1. The routine 950 may be carried out, for example, by the computing environment 110. In some instances, the steps or blocks of the routine 950 may occur in the sequential order presented below and in FIGS. 9C-9D or in a non-sequential order.

The routine 950 begins at block 952, where the computing environment 110 (e.g., the workbook system 120, the workbook data store 124, the data management module 132, and/or the indexing module 134) identify all columns for all tables in the spreadsheet. Illustratively, the block 952 may correspond to interaction (2) of FIG. 3. In some instances, the identification of columns may be limited to a subset of tables and/or columns in the spreadsheet such that less than all columns are indexed. In some instances, the user may select which columns to index. As discussed above with reference to block 906 of FIG. 9A, at its most basic level, the computing environment 110 may identify all columns for all tables so that indices for the indexing feature can be created for all columns, as described herein. This may simplify decision making for indexing but sacrifice overhead for the indexing.

Thereafter, at block 954, the computing environment 110 (e.g., the workbook system 120) automatically generates an index for each of individual columns of the identified columns. In some embodiments, the index has a hybrid datatype and equates datatypes that form the hybrid datatype. For example, the generated index may index information for a column that includes cells having string values, integer values, real number values, and the like, and the hybrid datatype may include relational statements that equate the different datatypes forming the hybrid datatype. Illustratively, the block 954 may correspond to the block 908 of FIG. 9A, which may correspond to interactions (6) and (7) of FIG. 3.

Thereafter, at block 956, the generated indices are stored in an index memory (for example, the workbook data store 124), for example by the computing environment 110 (e.g., the workbook update and query service 130). Illustratively, the block 956 may correspond to interaction (8) of FIG. 3.

At block 958, the computing environment 110 receives the query from the user interface 112. In some embodiments, the query requests information stored in at least one of the tables of the spreadsheet. At block 960, the computing environment 110 parses the query, which may comprise, at block 962, identifying a formula or expression in the query. The identified formula or expression may comprise at least one operand, operator, and/or a key value. The at least one operand may identify a relevant column in the table or workbook, for example the column in which the key value is to be identified, and the key value may be the item to be searched for with the query. Thus, parsing the query corresponds to identifying the columns relevant to the query. Illustratively, the blocks 958-962 may correspond to interactions (1) and (2) of FIG. 4.

At block 964, the computing environment 110 access relevant indices in the corresponding data store (for example, the workbook data store 124) for the identified columns in the query received at block 962. In some embodiments, identifying the relevant indices for the identified columns may be done by a different component of the computing environment 110 than the identifying of columns relevant to the query. Illustratively, the block 964 may correspond to one or more of interactions (3)-(7) of FIG. 4.

At block 966, the computing environment 110 identifies a value in the identified column in response to the query based on the key and the accessed index from block 964. Identifying the value may comprise searching the accessed index for the key value. Illustratively, the block 966 may correspond to interaction (8) of FIG. 4.

At block 968, the computing environment 110 generates a response to the query, where the response comprises the identified value from block 966. In some embodiments, the block 968 corresponds to the interaction (9) of FIG. 4. The routine 950 terminates at block 970.

In some embodiments, further to the routine 900 above, the hybrid datatype may represent a plurality of datatypes and comprises a number of comparators configured to compare a value of a first datatype of the plurality of datatypes to values of each other datatype of the plurality of datatypes under one or more constraints. In some instances, the plurality of datatypes comprises the first datatype and a second datatype and wherein the number of comparators comprises a first comparator configured to compare values of the first datatype with values of the second datatype and determine whether the first value is equal to the second value. In some instances of routine 900, generating the index for each of individual columns of the identified columns comprises generating each of a hashed based index, a tree based index, and a prefix or suffix tree index for the individual column.

Furthermore, routine 900 may further comprise (1) identifying an update to the unstructured data store, (2) identifying one or more of the identified columns updated based on the update to the data store, and (3) updating the index for each of the one or more updated columns. In some instances, the update to the unstructured data store comprises at least one of an update to a value in cell in a table column of one of the plurality of tables, an addition or deletion of a row in one of the plurality of tables, or recalculation of a formula in a cell of a table column of one of the plurality of tables.

Figure 10A:
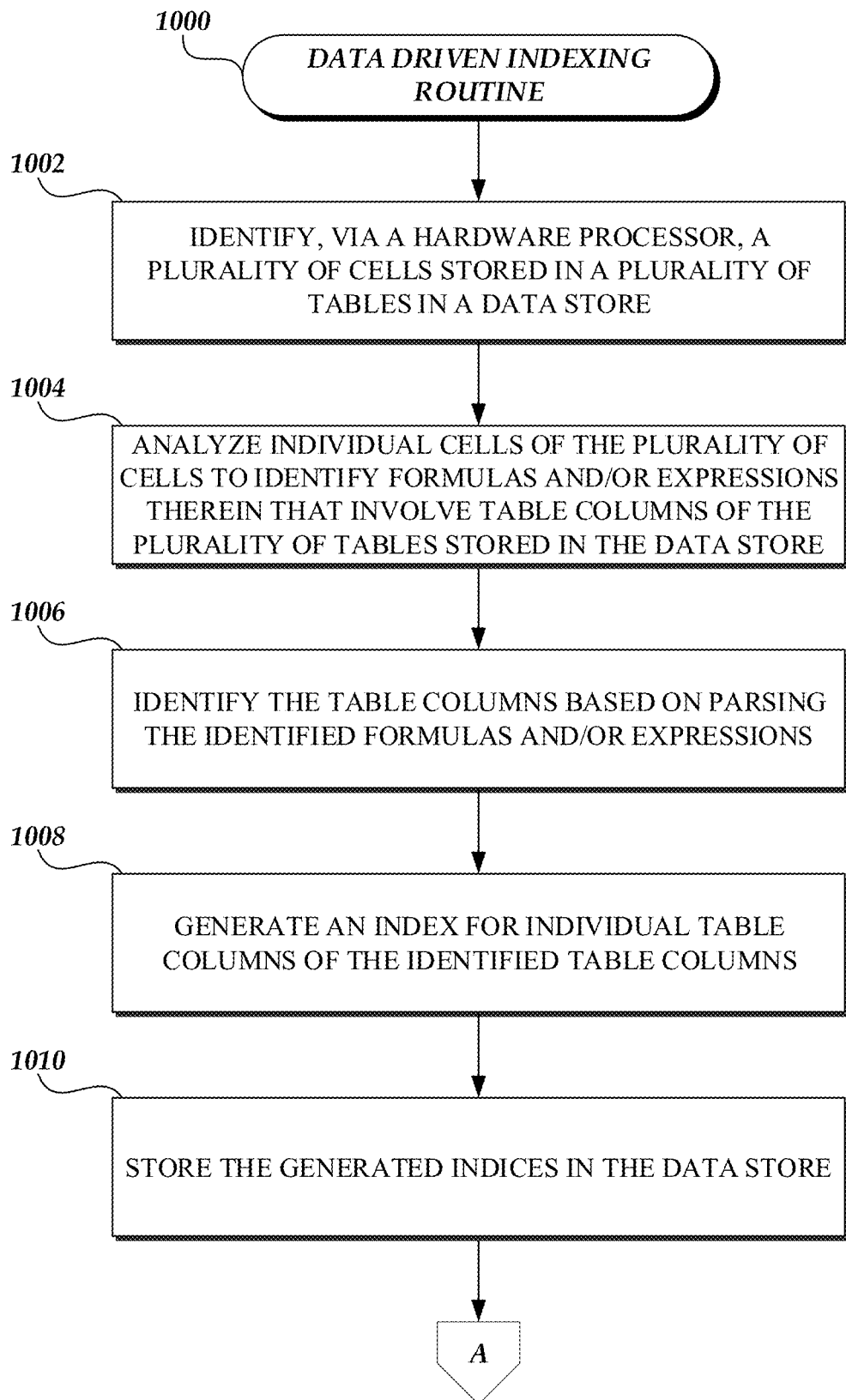
FIGS. 10A and 10B show a flow chart depicting an illustrative routine for generating and implementing a data driven indexing strategy on a data store in a workbook with the application system of FIG. 1.
Figure 10B:
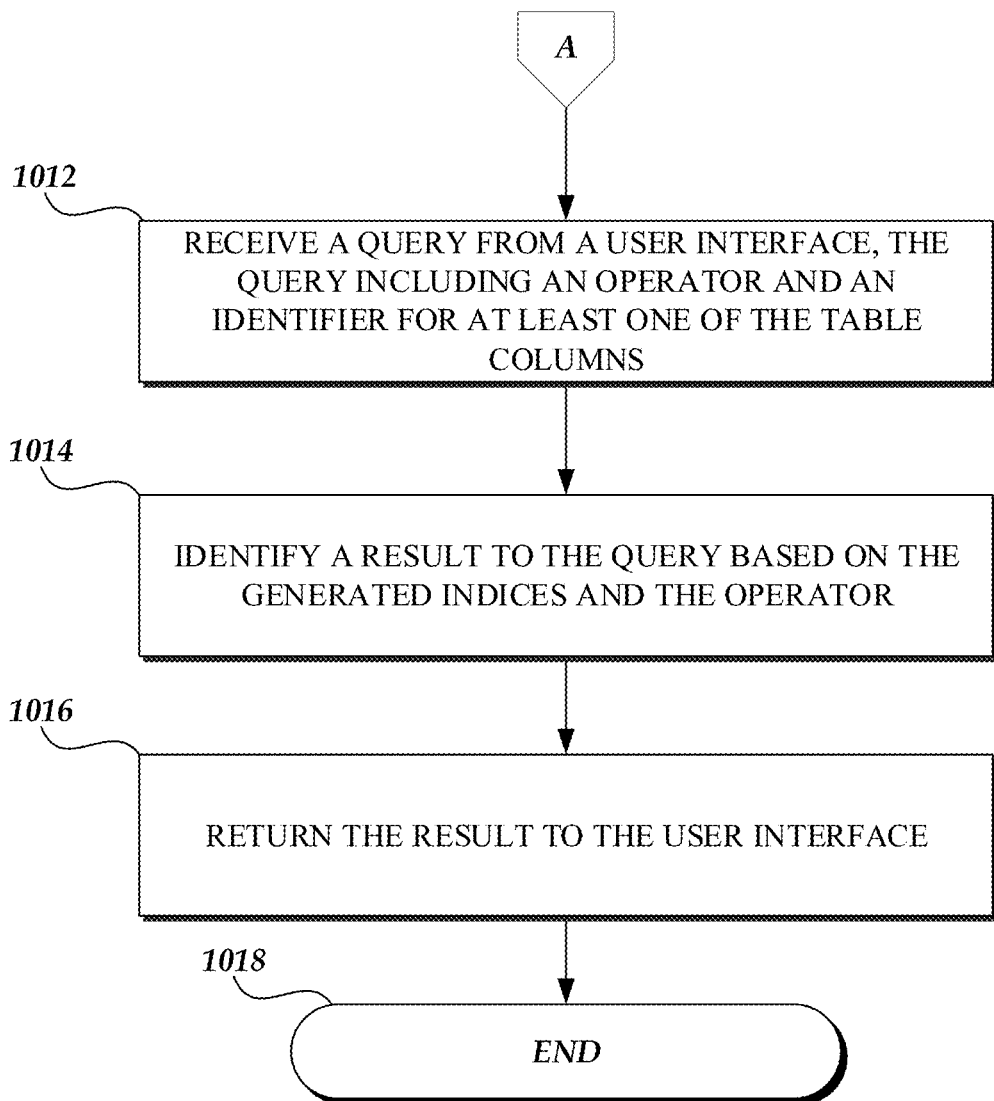

A flowchart providing an example of a method for creating or implementing indexing in a spreadsheet or unstructured workbook using the data driven approach, as described with respect to FIG. 5 above, is provided in FIGS. 10A and 10B. FIGS. 10A and 10B show a flow chart depicting an illustrative routine 1000 for generating and implementing a data driven indexing strategy on a data store in a workbook with the application system of FIG. 1. The routine 1000 may be carried out, for example, by the computing environment 110. In some instances, the steps or blocks of the routine 1000 may occur in the sequential order presented below and in FIGS. 10A-10B or in a non-sequential order (not described herein).

The routine 1000 begins at block 1002, where the computing environment 110 (e.g., the workbook system 120, the workbook data store 124, the data management module 132, and/or the indexing module 134) identify a plurality of cells stored in a plurality of tables in a data store. The identification of the plurality of cells may comprise identification of all cells in the workbook. This may be because under the data driven indexing approach, all columns that are referenced in a formula or expression in one of the cells of the workbook are indexed. In some instances, only a subset of the identified columns are indexed, for example based on the number of times columns are referenced in the spreadsheet and so forth. Thus, at block 1004, the computing environment 110 (e.g., the workbook system 120, the workbook data store 124, the data management module 132, and/or the indexing module 134) analyze individual cells of the plurality of cells to identify formulas and/or expressions therein that involve table columns of the plurality of tables stored in the workbook data store 124. Illustratively, block 1004 may correspond to interaction (2) and/or (3) of FIG. 5. Based on the identified cells and formulas, the routine 1000 proceeds to block 1006.

Thereafter, at block 1006, the computing environment 110 (e.g., the data management module 132, the user interface 112, and/or other components of the computing environment 110) identifies the table columns based on parsing the identified formulas and/or expressions. In some embodiments, identifying the table columns is further based on evaluating the identified formulas and/or expressions. Illustratively, the block 1006 may correspond to interaction (3) of FIG. 5.

Thereafter, at block 1008, any of the components of the computing environment 110 (e.g., the workbook system 120) automatically and/or dynamically generates an index for individual table columns of the identified table columns. In some embodiments, generating the index for each identified table column comprises requesting and/or obtaining data for the respective column from the workbook data store 124. In some instances, one or more generated indices has a hybrid datatype and comprises at least one custom relational comparison operator equation. For example, a generated index may index information for a column that includes cells having string values, integer values, real number values, and the like, and the hybrid datatype may include relational statements that equate the different datatypes forming the hybrid datatype. For example, when the hybrid datatype comprises integer and string values, the hybrid datatype may include statements, scripts, and the like to enable like integer and string values (for example, integer value "1" with string value "1") to be equated. Illustratively, the block 1008 may correspond to interactions (4)-(6) of FIG. 5.

Thereafter, at block 1010, the generated indices are stored in an index memory (for example, the workbook data store 124), for example by the computing environment 110 (e.g., the workbook update and query service 130). Illustratively, the block 1010 may correspond to interaction (7) of FIG. 5.

At block 1012, the computing environment 110 receives a query from a user interface, the query including an operator and an identifier for at least one of the table columns. In some instances, receiving the query further comprises parsing the query. Parsing the query may comprise identifying a formula or expression in the query. The identified formula or expression may comprise at least one operand, operator, and/or a key value. The at least one operand may identify a relevant column in the table or workbook, for example the column in which the key value is to be identified, and the key value may be the item to be searched for with the query. Thus, parsing the query corresponds to identifying the columns relevant to the query. Illustratively, the block 1012 may correspond to interaction (8) of FIG. 5.

At block 1016, the computing environment 110 identifies a result to the query based on the generated indices and the operator (for example, the workbook data store 124) for the identified columns in the query received at block 1014. In some embodiments, identifying the relevant indices for the identified columns may be done by a different component of the computing environment 110 than the identifying of columns and/or receiving of the query. Illustratively, the block 1016 may correspond to one or more of interactions (9)-(12) of FIG. 5.

At block 1016, the computing environment 110 returns a response to the query, where the response comprises the identified value from block 1014. In some embodiments, the block 1014 corresponds to the interaction (13) of FIG. 5. The routine 1000 ends at block 1018.

In some instances, further to the routine 1000 described above, the table columns are further identified based on one or more of a quantity of references to the table columns that exist in the identified at least one formula or expression or the operator applied to the table columns. In some instances, the routine 1000 further comprises identifying an excluded table column based on the one or more of a determination that the excluded table column is not involved with any identified formula and/or expression in the workbook. In some instances, generating the index for each of individual columns of the identified columns comprises generating one of a hashed based index, a tree based index, or a prefix or suffix tree index for each of the individual columns or generating each of the hashed based index, the tree based index, and the prefix or suffix tree index for each of the individual columns. Additionally, wherein generating one of a hashed based index, a tree based index, or a prefix or suffix tree index for each of the individual columns comprises determining which of the hashed based index, the tree based index, or the prefix or suffix tree index to generate based on one or more of a datatype of the corresponding table column or a type of operator used the corresponding query. In some instances, the routine 1000 further comprises generating the hashed based index for the individual columns having equality or inequality operators. In some instances, the routine 1000 further comprises loading data into the workbook at least partially concurrently with generating the index for individual table columns of the identified table columns.

Additionally, the routine 1000 can further comprise (1) determining that the at least one of the table columns identified in the query has an index stored in the data store associated therewith and (2) identifying the index associated with the at least one of the table columns identified in the query, where the result to the query is further identified based on the identified index.

Figure 11A:
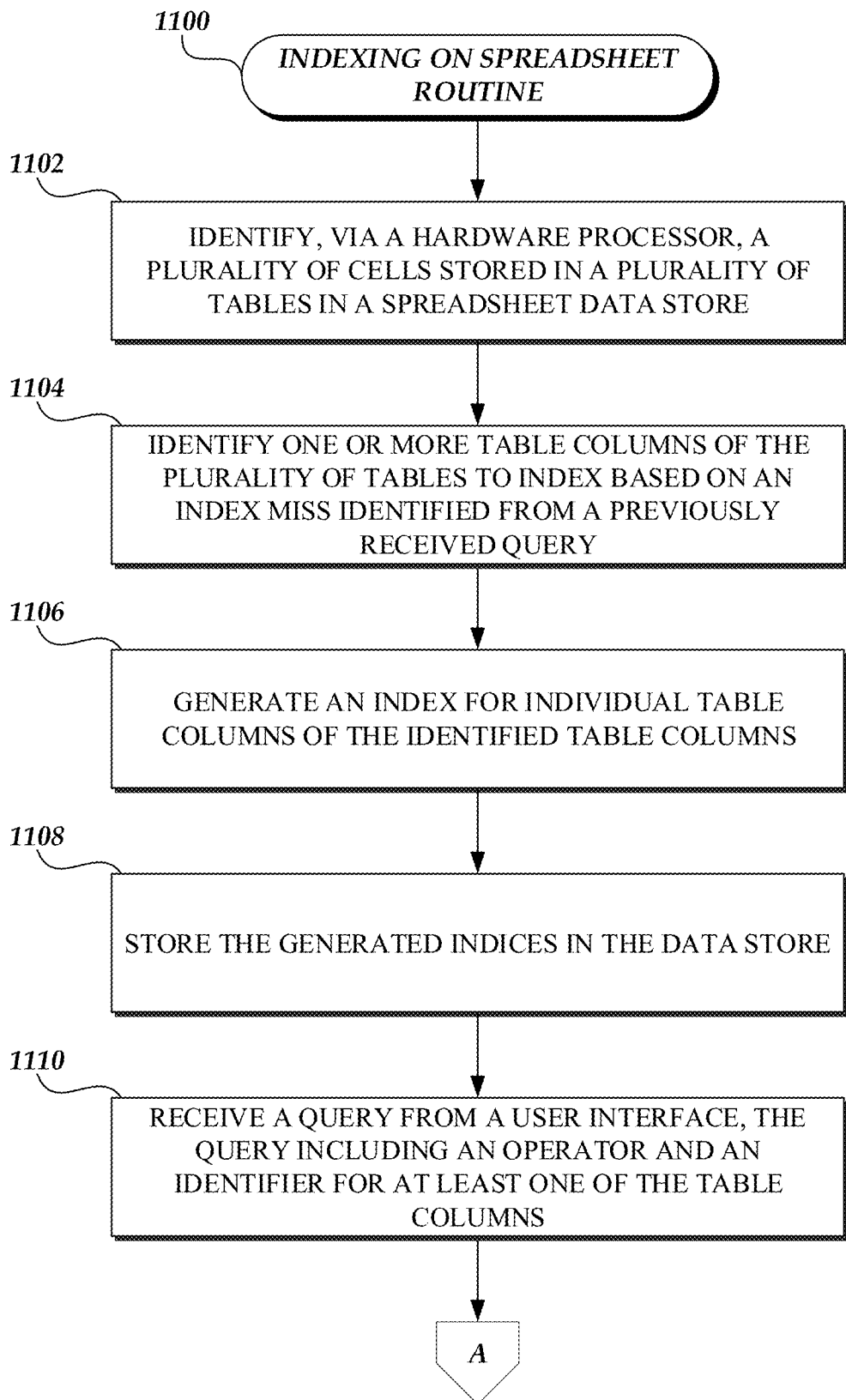
FIGS. 11A and 11B show a flow chart depicting an illustrative routine for generating and implementing a usage driven indexing strategy on a data store in a workbook with the application system of FIG. 1.
Figure 11B:
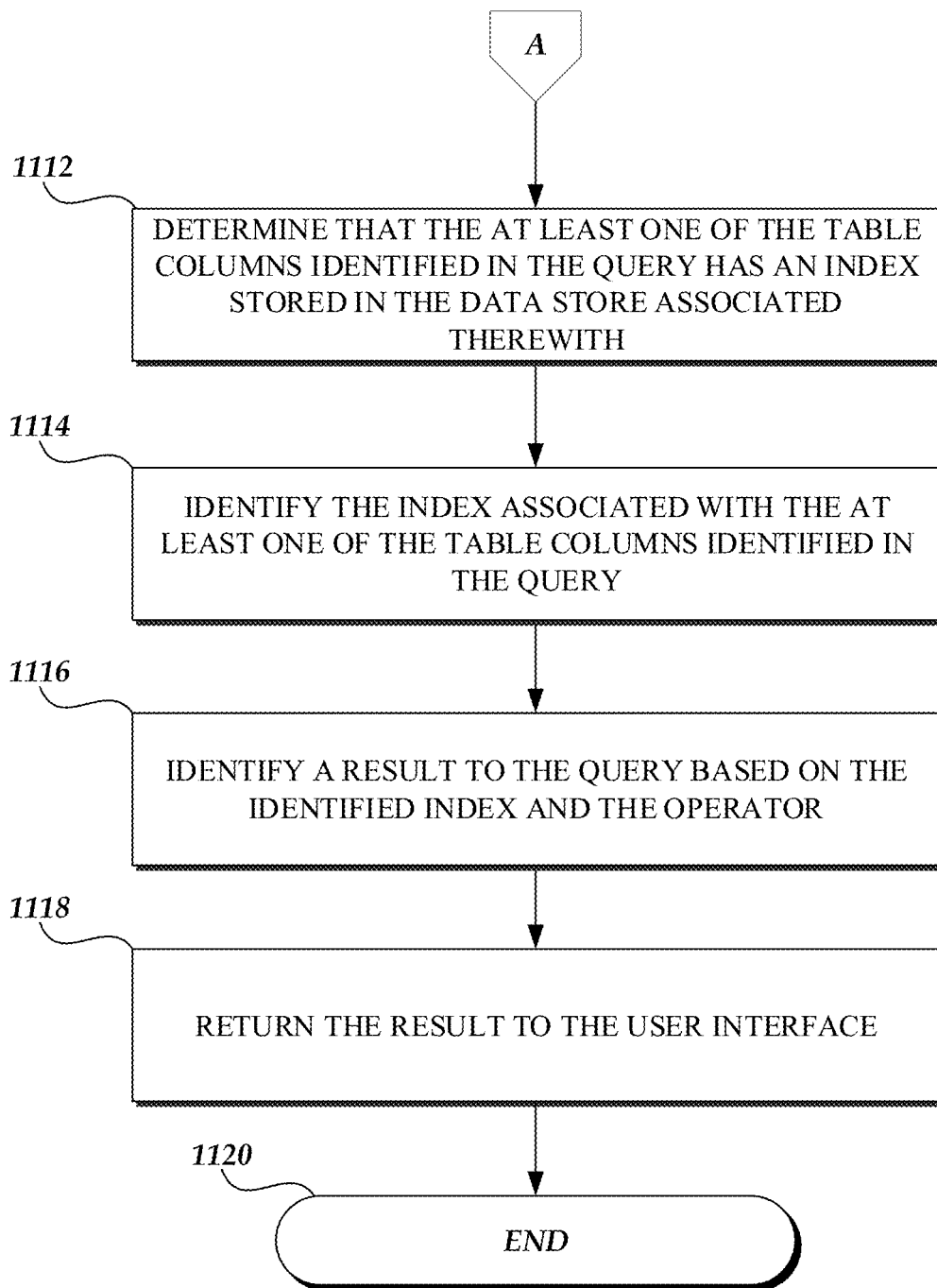

A flowchart providing an example of a method for creating or implementing indexing in a spreadsheet or unstructured workbook using the usage driven approach, as described with respect to FIG. 6 above, is provided in FIGS. 11A and 11B. FIGS. 11A and 11B show a flow chart depicting an illustrative routine 1100 for generating and implementing a usage driven indexing strategy on a data store in a workbook with the application system of FIG. 1. The routine 1100 may be carried out, for example, by the computing environment 110. In some instances, the steps or blocks of the routine 1100 may occur in the sequential order presented below and in FIGS. 11A-11B or in a non-sequential order (not described herein).

The routine 1100 begins at block 1102, where the computing environment 110 (e.g., the workbook system 120, the workbook data store 124, the data management module 132, and/or the indexing module 134) identifies a plurality of cells stored in a plurality of tables in a spreadsheet data store. The identification of the plurality of cells may comprise identification of all cells in the workbook. At block 1104, the computing environment 110 (e.g., the workbook system 120, the workbook data store 124, the data management module 132, and/or the indexing module 134) identifies one or more table columns of the plurality of tables to index based on an index miss (or other usage statistics) identified from a previously received query. For example, the computing environment 110 may identify when an index miss occurs (or based on usage statistics), meaning when a query is received involving a column for which an index does not exist. In some instances, after such a query is received, the computing environment 110 uses routine 1100 to identify the appropriate table columns to index so that that query that resulted in the index miss (or based on usage statistics) can be appropriately queried based on an index. This may be done while the query is still pending or after the query was responded to based on an analysis of the columns without the corresponding index. Illustratively, block 1104 may correspond to interaction (2) and/or (3) of FIG. 6. Based on the identified columns, the routine 1100 proceeds to block 1106.

Thereafter, at block 1106, the computing environment 110 (e.g., the data management module 132, the user interface 112, and/or other components of the computing environment 110) automatically and/or dynamically generates an index for individual table columns of the identified table columns. In some embodiments, generating the index for each identified table column comprises requesting and/or obtaining data for the respective column from the workbook data store 124. In some instances, one or more generated indices has a hybrid datatype and comprises at least one custom relational comparison operator equation. For example, a generated index may index information for a column that includes cells having string values, integer values, real number values, and the like, and the hybrid datatype may include relational statements that equate the different datatypes forming the hybrid datatype. For example, when the hybrid datatype comprises integer and string values, the hybrid datatype may include statements, scripts, and the like to enable like integer and string values (for example, integer value "1" with string value "1") to be equated. Illustratively, the block 1106 may correspond to interactions (4)-(6) of FIG. 6.

Thereafter, at block 1108, the generated indices are stored in an index memory (for example, the workbook data store 124), for example by the computing environment 110 (e.g., the workbook update and query service 130). Illustratively, the block 1108 may correspond to interaction (7) of FIG. 6.

At block 1110, the computing environment 110 receives a query from a user interface, the query including an operator and an identifier for at least one of the table columns. In some instances, receiving the query further comprises parsing and/or evaluating the query. Parsing the query may comprise identifying and evaluating a formula or expression in the query. The identified formula or expression may comprise at least one operand, operator, and/or a key value. The at least one operand may identify a relevant column in the table or workbook, for example the column in which the key value is to be identified, and the key value may be the item to be searched for with the query. Thus, parsing the query corresponds to identifying the columns relevant to the query. Illustratively, the block 1110 may correspond to one or more of interactions (8) and (9) of FIG. 6.

At block 1112, the computing environment 110 determines that the at least one of the table columns identified in the query has an index stored in the data store associated therewith (for example, the workbook data store 124) for the identified columns in the query received at block 1104. Illustratively, the block 1112 corresponds to one or more of interactions (10-11) of FIG. 6.

At block 1114, the computing environment 110 identifies the index associated with the at least one of the table columns identified in the query. In some embodiments, identifying the relevant indices for the identified columns may be done by a different component of the computing environment 110 than the identifying of columns and/or receiving of the query.

At block 1116, the computing environment 110 identifies a result to the query based on the identified index and the operator. In some embodiments, at block 1118, the computing environment 110 returns a response to the query, where the response comprises the identified value from block 1116. In some embodiments, the blocks 1116 and 1118 correspond to the interaction (13) and (14) of FIG. 6. The routine 1100 ends at block 1120.

Further to the route 1100 as shown in FIGS. 11A-11B, generating the index for the individual table columns of the identified one or more table columns may comprise (1) identifying a number of reads on the table columns identified in the previously received query for which an index did not exist exceeds a first threshold, (2) identifying that the number of reads on the table columns identified in the previously received query occurred over a period of time exceeding a second threshold, and (3) generating the index for the individual tables columns of the table columns identified in the previously received query based on the number of reads exceeding the first threshold and the period of time exceeding the second threshold. Additionally, the routine 1100 can further comprise deleting an idle index from the data store based on one or more of a latency cost of a potential index miss if the idle index is deleted, a memory cost associated with maintaining the idle index, a time since a previously received query identifying a table column associated with the idle index, or a number of reads of the idle index over a duration. In some instances, the idle index is deleted from the data store during a write operation on the workbook. Furthermore, the write operation on the workbook may comprise a write operation across a plurality of workbooks to delete idle indices from individual workbooks of the plurality of workbooks.

In some instances, the routine 1100 further comprises determining that at least one of the generated indices stored in the data store was previously deleted from the data store and that less than a threshold duration has passed since the at least one of the generated indices was previously deleted and less than a threshold number of reads of the corresponding table column have occurred since the at least one of the generated indices was previously deleted. Sometimes, generating the index for of the individual columns of the identified columns comprises one of a hashed based index, a tree based index, or a prefix or suffix tree index. Furthermore, the routine 1100 may further comprising (1) identifying an update to the data store, (2) identifying one or more of the identified columns updated based on the update to the data store, and updating the index for each of the one or more updated columns.

In some instances, the routine 1100 comprises generating the index for individual table columns further based on identification of the usage parameter for each of the individual columns exceeding a threshold value. In some instances, the usage parameter comprises, for each individual column, a number of times that the individual column was previously identified and no corresponding index existed.

Figure 12:
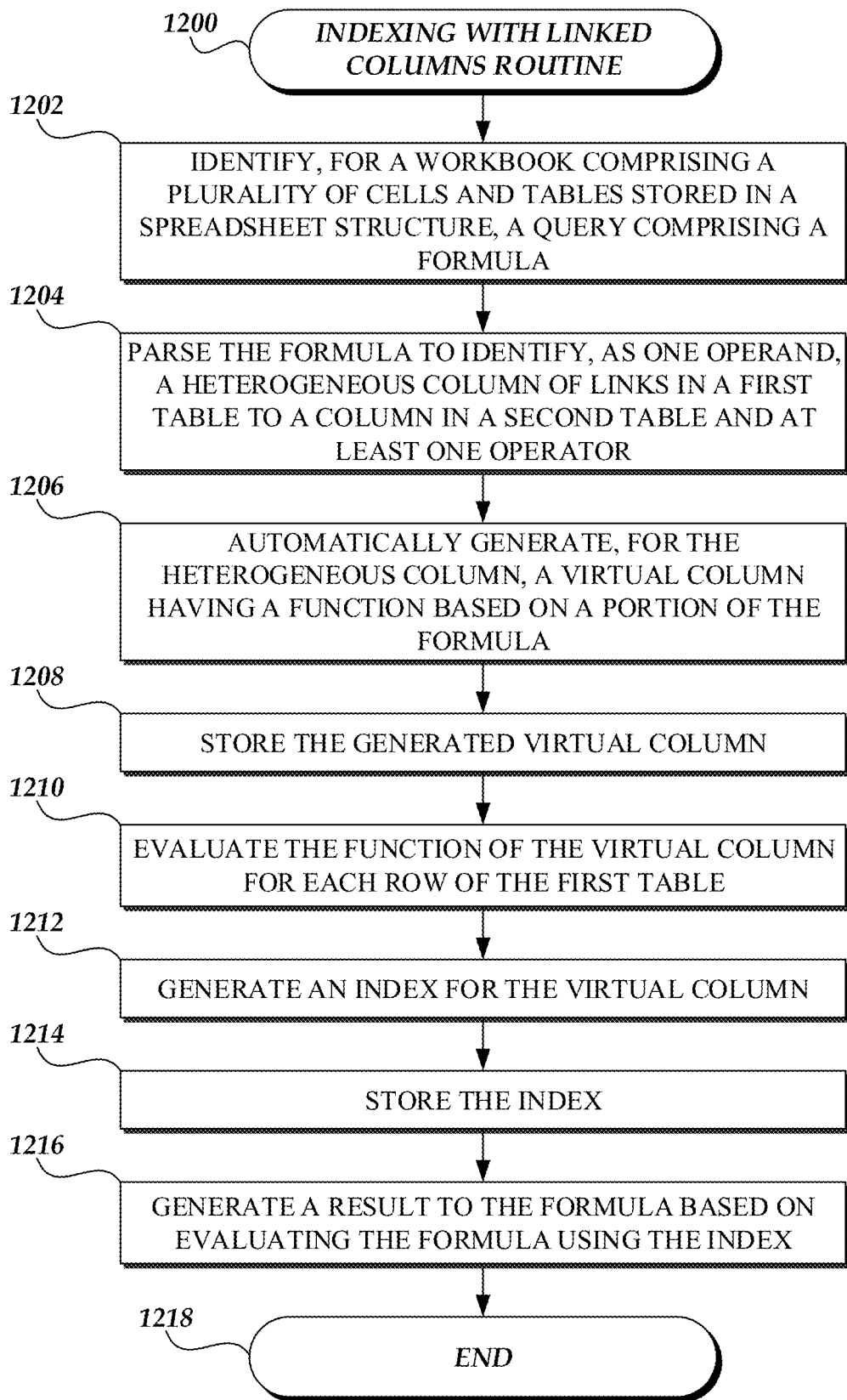
FIG. 12 shows a flow chart depicting an illustrative routine for generating and implementing a usage driven indexing strategy on a data store in a workbook with the application system of FIG. 1.

A flowchart providing an example of a method for creating or implementing virtual column indexing in a spreadsheet or unstructured workbook, as described with respect to FIGS. 8A and 8B above, is provided in FIG. 12. FIG. 12 is a flow chart depicting an illustrative routine 1200 for generating and implementing a usage driven indexing strategy on a data store in a workbook with the application system of FIG. 1. The routine 1200 may be carried out, for example, by the computing environment 110. In some instances, the steps or blocks of the routine 1200 may occur in the sequential order presented below and in FIG. 12 or in a non-sequential order (not described herein).

The routine 1200 begins at block 1102, where the computing environment 110 (e.g., the workbook system 120, the workbook data store 124, the data management module 132, and/or the indexing module 134) identifies, for the workbook comprising a plurality of cells and tables stored in a spreadsheet structure, a query comprising a formula. The query may be received via the user interface 112 or embedded in a cell or the like. The cells and tables of the workbook may be stored in a data store of the workbook, for example the workbook data store 124. The identification of the query may comprise scanning and/or parsing all cells in the workbook. At block 1204, the computing environment 110 (e.g., the workbook system 120, the workbook data store 124, the data management module 132, and/or the indexing module 134) parses the formula to identify, as one operand, a heterogeneous column of links in a first table of the plurality of tables to a column in a second table of the plurality of tables and at least one operator. The column may be heterogeneous when the column comprises links to columns with a particular name but in different tables. This heterogeneous column may be an operand in a formula and/or expression. For example, the computing environment 110 may identify that the formula includes a column that includes rowlinks or pointers or links to another column. In some embodiments, the other column is in another table or multiple other tables, where each row can point to different tables. As described above, the column of links may each point to the same titled or named column in different named tables. In some instances, the operator is a filter or similar function or evaluation.

At block 1206, the computing environment 110 (e.g., the workbook system 120, the workbook data store 124, the data management module 132, and/or the indexing module 134, and so forth) automatically generates a virtual column for the heterogeneous column. In some embodiments, the virtual column is "virtual" because it is not a column with which the user can interact. For example, the user cannot access the virtual column to access, store, or manipulate information therein. In some embodiments, the virtual column is generated having a function for each row of the virtual column based on a portion of the formula of the cell. Thus, the virtual column, as treated by the computing environment 110, is handled like any other column. In some embodiments, the virtual column is created as a column of the first table. An example of how the first table, second table, column of links, and virtual column are integrated is shown with respect to FIGS. 7A and 7B. At block 1208, the virtual column is stored, for example as a column of the first table, in the workbook data store 124 or another data store.

At block 1210, the computing environment 110 (e.g., the workbook system 120, the workbook data store 124, the data management module 132, and/or the indexing module 134, and so forth) evaluate the function of the virtual column for each row of the first table. This effectively populates the virtual column with the data corresponding to the linked column of the second table.

At block 1212, the computing environment 110 (e.g., the data management module 132, the user interface 112, and/or other components of the computing environment 110) automatically and/or dynamically generates an index for the virtual column. In some instances, the generated index is a virtual index that cannot be manipulated by the individual. In some embodiments, the virtual index may be a general index of the virtual column, thereby providing indexing advantages to even the virtual columns. In some embodiments, generating the virtual index comprises requesting and/or obtaining data for the respective virtual column. In some instances, one or more generated virtual indices has a hybrid datatype and comprises at least one custom relational comparison operator equation (as described elsewhere herein) or comprises a single datatype.

Thereafter, at block 1214, the generated virtual index is stored in an index memory (for example, the workbook data store 124) or in a dynamic memory, for example by the computing environment 110 (e.g., the workbook update and query service 130).

At block 1216, the computing environment 110 the computing environment 110 (e.g., the workbook system 120, the workbook data store 124, the data management module 132, and/or the indexing module 134, and so forth) evaluate the formula based on the virtual index to generate a result to the formula. In some embodiments, at block 1216, the computing environment 110 also returns a response to the query, where the response comprises the identified value from block 1216. Effectively, evaluating the formula based on the index corresponds to identifying the linked value via the virtual column based on the formula and the virtual index. The routine 1200 ends at block 1218.

In some embodiments, the tables comprise a first table and a second table, wherein the first table comprises a column, referenced by the formula, formatted such that rows in the column comprises a link to the second table. In some embodiments, though not shown in FIG. 12, the method 1200 may comprise storing the virtual column in a memory separate from the data store and storing the index for the virtual column in the memory. For example, the memory circuit may be external to the workbook data store. In some instances, the method 1200 further comprises detecting a change to one or more of the formula, results of evaluating the function of the virtual column for each row of the first table, and/or dependent mutations related to the formula and updating the index based on a recalculation mechanism. In some embodiments, the formula is a filter key dereference formula. Additionally, the portion of the formula comprises a filter dereference for the formula. Alternatively, or additionally, the filter dereference formula implements a multi-table join between the multiple tables. In some embodiments, the virtual column cannot be directly accessed by the user such that the user cannot read or write values in the virtual column and wherein the index cannot be directly accessed by the user such that the user cannot read or write values in the index. In some instances, generating the result comprises generating a first result in a first time and generating a second result in a second time. For example, the first time can comprise a time to (1) generate and store the virtual column, (2) generate and store the index for the virtual column, and (3) evaluate the formula based on the index to generate the first result. The second time can comprise a time to evaluate the formula based on the index to generate the second result, and the first time is longer than the second time.

Metrics

As introduced herein, various metrics may be used to measure performance of the computing environment 110. Certain metrics may be more or less relevant to different indexing approaches.

Idle Index Memory Overhead: All indices require storage or memory overhead corresponding to an amount of storage or memory required to store the indices. An idle index is an index on a table column that has not seen usage in the last n queries on any table in a particular workbook. The Idle Index Memory Overhead corresponds to memory used to store the idle indices, where the idle indices are indices that have not been used over a given number (n) of queries, wherein n may be defined, for example, empirically. The systems and methods herein may optionally or selectively operate to minimize the Idle Index Memory Overhead. In some embodiments, the Idle Index Memory Overhead value may be considered in usage based adaptive indexing strategies. As shown in Equation 3 below, the Idle Index Memory Overhead may be defined by an amount of memory occupied by the number n of idle indices divided by a size in memory of the workbook itself:

$$IdleIndexMemoryOverhead = \frac{\text{Memory occupied by idle indices}}{\text{Overall workbook size in memory}} \quad \text{Equation 3}$$

Index Memory Cost: As introduced above, indices require space in memory of the indices themselves. When the storage or memory space for all indices is compared to the storage or memory space for the workbook as a whole, the result is the Index Memory Cost. The systems and methods herein may optionally and/or selectively minimize the Index Memory Cost, which can be used to track efficiency of indices with respect to the workbook. In some instances, the Index Memory Cost may vary based on size changes of the workbook (for example, when data is added and/or manipulated in the workbook) as the workbook and corresponding application(s) are used. In some embodiments, the Index Memory Cost may be considered in data driven adaptive indexing strategies. As shown in Equation 4 below, the Index Memory Cost may be defined by an amount of memory occupied by all indices divided by a size in memory of the workbook itself:

$$IndexMemoryCost = \frac{\text{Memory occupied by indices}}{\text{Overall workbook size in memory}} \quad \text{Equation 4}$$

Idle Index Compute Overhead: Each index utilized by a workbook system requires an amount of computing time to populate the index. The total amount of time required to populate and/or update all idle indices may define the Idle Index Compute Overhead, which refers to the time required to populate and/or update indices that have not been used in a number n queries, as introduced above. Thus, the Idle Index Compute Overhead refers to an amount of compute resources (for example, time, bandwidth, and so forth) spent on populating or updating the idle indices. In some embodiments, the Idle Index Compute Overhead may be considered in usage based adaptive indexing strategies. As shown in Equation 5 below, the Idle Index Compute Overhead may be defined by an amount of time spent populating and/or updating idle indices divided by a time spent in a writing operation.

$$IdleIndexComputeOverhead = \frac{\text{Time spent in updating idle indices}}{\text{Time spent in write operation}} \quad \text{Equation 5}$$

Index Compute Cost: As introduced above, each index utilized by a workbook system requires an amount of compute time to populate the index. The total amount of time required to populate and/or update all indices may define the Index Compute Cost, which refers to the time required to populate and/or update all of the indices in the workbook. Thus, the Index Compute Cost refers to an amount of compute resources (for example, time, bandwidth, and so forth) spent on populating or updating the indices. In some instances, the Index Compute Cost may vary based on size changes of the workbook (for example, when data is added and/or manipulated in the workbook) as the workbook and corresponding application(s) are used. In some embodiments, the Index Compute Cost may be considered in data and/or usage based adaptive indexing strategies. As shown in Equation 6 below, the Index Compute Cost may be defined by an amount of time spent populating and/or updating all indices divided by a time spent in a write operation.

$$IndexComputeCost = \frac{\text{Time spent in updating indices}}{\text{Time spent in write operation}} \quad \text{Equation 6}$$

Baseline Index Creation Time: As introduced above, indices must be create in memory for the workbook before they can be populated and/or updated. Such creating of individual indices involves time and compute resources and may be dependent on a type of the index being created, a size of the table column to which the index refers, and cardinality of the data being indexed. In some embodiments, the index type may comprise a hash index, a tree (or navigable) index, and a suffix tree index. Each index type may have its own Baseline Index Creation Time, as shown in Equations 7.1-7.3 below, where each creation time comprises low, medium, and high cardinality values and correspond to a time required to create a corresponding index having 1000 rows in the corresponding column. In some embodiments, the Baseline Index Creation Time can be scaled based on an actual number of rows. For example, when the column being indexed has 10000 rows, then the calculated Baseline Index Creation Time may be scaled by 10 to estimate the creation time for the 10000 row index. In some instances, the Baseline Index Creation Time is an average value. In some instances, the low, medium and high cardinalities represent the number of unique values in the column as a proportion of the size of the column with proportions of, for example, 0.1 (low), 0.5 (medium), and 1.0 (high) respectively.

In some embodiments, the Baseline Index Creation Time is not a real-time metric and instead a benchmark metric. The Baseline Index Creation Time may be measured to understand how long it takes to create an index for a table of a particular size. A time to load an index may be proportional to the size of the corresponding table because the index creation time indicates how long it takes to create the index when loading the index. In some embodiments, the Baseline Index Creation Time may be considered in data and/or usage based adaptive indexing strategies. As shown in Equations 7.1-7.3 below, the Index Compute Cost may be defined by the amount of time to create the corresponding index given 1000 rows and one of three cardinality values.

$$\text{IndexCreationTime.Hash.[Low|Medium|High]} = \text{Time spent in creating a hash index on a column of data with 1000 rows} \quad \text{Equation 7.1}$$

$$\text{IndexCreationTime.Navigable.[Low|Medium|High]} = \text{Time spent in creating a navigable (or tree) index on a column of data with 1000 rows} \quad \text{Equation 7.2}$$

$$\text{IndexCreationTime.SuffixTree.[Low|Medium|High]} = \text{Time spent in creating a suffix tree index on a column of data with 1000 rows} \quad \text{Equation 7.3}$$

Index Maintenance Overhead: Maintenance of an index may comprise creation and/or deletion of the index. The Index Maintenance Overhead metric may compare the maintenance time to the time to read or write the corresponding table. Specifically, three metrics may exist for Index Maintenance Overhead: In some embodiments, the Index Maintenance Overhead may be amortized over many operations. For example, if indices are created or deleted in a separate processing thread from corresponding operations, then the workbook system may incur the Index Maintenance Overhead once and create multiple indices at once. In some embodiments, the Index Maintenance Overhead may be considered in data and/or usage based adaptive indexing strategies. As shown in Equations 8.1-8.3 below, the Index Maintenance Overhead may be defined by the amount of time spent creating and/or deleting indices divided by an overall time for a particular operation (for example, read operation, write operation, and deserialization operation).

$$IndexMaintenanceOverhead \cdot \text{Read} = \frac{\text{Time spent in creating/deleting indices}}{\text{Overall time for read operation in compute}} \quad \text{Equation 8.1}$$

-continued $$IndexMaintenanceOverhead \cdot Write = \frac{\text{Time spent in creating/deleting indices}}{\text{Overall time for write operation in compute}} \quad \text{Equation 8.2}$$

$$IndexMaintenanceOverhead \cdot Deser = \frac{\text{Time spent in creating/deleting indices}}{\text{Overall time deserialization in compute}} \quad \text{Equation 8.3}$$

Index Maintenance Overhead on Queries: Because the Index Maintenance Overhead introduced above relates to general maintenance times of indices, that metric may not capture gains in query evaluation time. More specifically, the Index Maintenance Overhead itself may not correspond to the net gains provided by the indices, for example, the computational and efficiency gains from the application of the indices. Instead, the Index Maintenance Overhead on Queries may identify this relationship and identify the overall benefit of the indices, as measured in time. In some embodiments, the Index Maintenance Overhead on Queries may be considered in data and/or usage based adaptive indexing strategies. As shown in Equation 9 below, the Index Maintenance Overhead on Queries may be defined by a difference in an amount of time spent creating an index and evaluating a corresponding query and time spent evaluating the query without the index.

$t_1$=Time spent in creating an index and evaluating the query $t_2$=Time spent in evaluating the query without the index $$IndexCreationOverhead \cdot Query = \frac{(t_1 - t_2)}{t_2} * 100 \quad \text{Equation 9}$$

Index Hit/Miss Ratio: The benefit of an index is dependent on how often the index can be or is used. The Index Hit/Miss Ratio measures a proportion of read queries where at least one table column identified in the queries has a corresponding index in the workbook based on a comparison operator used in the query. In some embodiments, the Index Hit/Miss Ratio may be considered in data and/or usage based adaptive indexing strategies. As shown in Equation 10 below, the Index Hit/Miss Ratio may be defined by an instance when a table identified in the query includes a corresponding index as compared to when the table identified in the query does not include the corresponding index.

IndexHitRatio=Avg(0 if all referred table columns lack the right index, 1 if at least one referred table column have the right indices)
IndexMissRatio=1−IndexHitRatio    Equation 10

Engine Query Cost: In some embodiments, the Index Hit/Miss Ratio does not provide a full representation of the benefit because the hit/miss ratio does not account for expense of the index relative to available indices. For example, if one of the table columns referenced in the received query has the necessary indices, the query might still be expensive depending on how the query is constructed and what kind of indices are available on the other table columns used in the query. Thus, the hit/miss ratio does not indicate whether created indices provide acceptable performance as related to corresponding applications. The Engine Query Cost may correspond to an integer between 1 and $2^{32}-1$, and an average of the Engine Query Cost the workbook may indicate how much indices help improve performance for the workbook. In some instances, this value can be used to select the index with the lowest cost, when more than one index supporting the query exists for the same attribute.

In some embodiments, the systems and methods herein may generate and apply indices relative to queries and corresponding tables in the workspace based on the metrics above. For example, the systems and methods may minimize the Idle Index Memory Overhead, Idle Index Compute Overhead, and Index Creation Overhead values above. The systems and methods may also keep Index Hit Ratio close to "1" and minimize the CQ Engine Query Cost. By incorporating these metrics, benefits and results of indices applied to the workbook can be measured and quantified.

Additional Considerations

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for implementing an indexing scheme on a spreadsheet of a workbook, the system comprising:
  a data store storing data associated with the workbook, wherein the data is stored in the spreadsheet, the spreadsheet comprising a plurality of tables;
  one or more processors configured to execute instructions stored in a non-transitory computer-readable memory to:
    cause display of a user interface configured to provide a user access to the data store and the data stored therein, wherein the user interface receives queries for the spreadsheet;
    generate an index for a column of a table of the plurality of tables, wherein the index has a hybrid datatype that equates disparate datatypes included in the column, and wherein the hybrid datatype is associated with a number of comparators configured to equate the disparate datatypes by comparing a value of a first datatype of the disparate datatypes to values of each other datatype of the disparate datatypes under one or more constraints;
    store the index in an index memory;
    receive a query via the user interface, the query requesting information stored in the table;
    identify a formula in the query by parsing the query, the formula having at least one operand, at least one operator, and a key value, wherein the at least one operand identifies the column and the key value identifies an item being queried for in the column;
    identify a value in the column based on the key value and the index stored in the index memory; and
    generate a response to the query, the response comprising the identified value.

2. The system of claim 1, wherein the disparate datatypes comprise a second datatype and wherein the number of comparators comprises a first comparator configured to compare a first value of the first datatype with a second value of the second datatype and determine whether the first value is equal to the second value under the one or more constraints.

3. The system of claim 1, wherein to generate the index for the column, the one or more processors are configured to generate one or more of a hashed based index, a tree based index, or a prefix or suffix tree index.

4. The system of claim 1, wherein the one or more processors are further configured to execute instructions stored in the non-transitory computer-readable memory to:
  identify an update to the data store;
  identify that the column is updated based on the update to the data store; and
  update the index for the column.

5. The system of claim 4, wherein the update to the data store comprises at least one of an update to a value in a cell in the column of one of the plurality of tables, an addition or deletion of a row in one of the plurality of tables, or recalculation of a formula in a cell of the column.

6. The system of claim 4, wherein the one or more processors are configured to update the index for the column synchronously with the update to the data store.

7. The system of claim 1, wherein the one or more processors are configured to execute instructions stored in the non-transitory computer-readable memory to receive an input enabling indexing in the workbook and wherein the index is generated based on the input enabling indexing in the workbook.

8. The system of claim 1, wherein the one or more processors are further configured to execute instructions stored in the non-transitory computer-readable memory to rebuild the generated index from a stored checkpoint when the workbook is reloaded into a working memory.

9. The system of claim 1, wherein the one or more processors are further configured to execute instructions stored in the non-transitory computer-readable memory to enable or disable indexing based on monitoring one or more metrics.

10. A method of implementing an indexing scheme on an unstructured data store, the method comprising:
  storing data associated with a workbook in the unstructured data store, the unstructured data store comprising a table;
  identifying a column for the table in the unstructured data store;
  generating an index for the column, wherein the index generated for at least one column has a hybrid datatype and comprises a custom relational comparison operator equation, and wherein the hybrid datatype is associated with a number of comparators configured to equate disparate datatypes by comparing a value of a first datatype of the disparate datatypes to values of each other datatype of the disparate datatypes under one or more constraints;
  storing the generated index in an index memory;
  identifying a formula applied to the workbook, the formula having an operand, an operator, and a key value, wherein the operand identifies the at least one column and the key value identifies an item being queried in the at least one column;
  accessing, in the index memory, the index associated with the at least one column; and
  identifying a value in the at least one column in response to the formula based on the key value and the index.

11. The method of claim 10, wherein the disparate datatypes comprise a second datatype and wherein the number of comparators comprises a first comparator configured to compare a first value of the first datatype with a second value of the second datatype and determine whether the first value is equal to the second value.

12. The method of claim 10, wherein generating the index for the column comprises generating one or more of a hashed based index, a tree based index, or a prefix or suffix tree index for the column.

13. The method of claim 10, further comprising:
  identifying an update to the unstructured data store;
  identifying that the column has been-updated based on the update to the unstructured data store; and
  updating the index.

14. The method of claim 13, wherein the update to the unstructured data store comprises at least one of an update to a value in a cell in the column, an addition or deletion of a row in the table, or recalculation of a formula in a cell of the column.

15. A system for implementing an indexing scheme to respond to queries on a spreadsheet of a workbook, the system comprising:

a data store storing data associated with the workbook, wherein the data is stored in the spreadsheet, the spreadsheet comprising a table;
one or more processors configured to execute instructions stored in a non-transitory computer-readable memory to:
provide a user interface enabling a user to submit queries to the spreadsheet;
generate an index for a column of the table, wherein the index has a hybrid datatype and comprises at least one custom relational comparison operator equation, wherein the hybrid datatype is associated with a number of comparators configured to equate disparate datatypes by comparing a value of a first datatype of the disparate datatypes to values of each other datatype of the disparate datatypes under one or more constraints;
store the index in an index memory; and
generate a response to a received query using the index.

16. The system of claim 15, wherein the disparate datatypes comprises a second datatype and wherein the number of comparators comprises a first comparator configured to compare a first value of the first datatype with a second value of the second datatype and determine whether the first value is equal to the second value.

17. The system of claim 16, wherein to generate the index for the column, the one or more processors are configured to generate one or more of a hashed based index, a tree based index, or a prefix or suffix tree index for the column.

18. The system of claim 15, wherein the one or more processors is further configured to execute instructions stored in the non-transitory computer-readable memory to:
identify an update to the column; and
update the index for the column.

19. The system of claim 18, wherein the update to the column comprises at least one of an update to a value in a cell in the column, an addition or deletion of a row the table, or recalculation of a formula in a cell of the column.

* * * * *